United States Patent
Yamauchi et al.

(10) Patent No.: US 8,310,638 B2
(45) Date of Patent: Nov. 13, 2012

(54) PIXEL CIRCUIT AND DISPLAY APPARATUS

(75) Inventors: Yoshimitsu Yamauchi, Osaka (JP);
Naoki Ueda, Osaka (JP); Fumiki Nakano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/504,609

(22) PCT Filed: Jul. 22, 2010

(86) PCT No.: PCT/JP2010/062317
§ 371 (c)(1),
(2), (4) Date: Apr. 27, 2012

(87) PCT Pub. No.: WO2011/052272
PCT Pub. Date: May 5, 2011

(65) Prior Publication Data
US 2012/0212521 A1    Aug. 23, 2012

(30) Foreign Application Priority Data

Oct. 29, 2009 (JP) ................................. 2009-248964
Apr. 15, 2010 (JP) ................................. 2010-094029

(51) Int. Cl.
*G02F 1/1337* (2006.01)
(52) U.S. Cl. ............ 349/130; 349/56; 349/84; 349/122; 349/123; 349/139
(58) Field of Classification Search .................... 349/56, 349/84, 122, 123, 130, 139, 143
See application file for complete search history.

(56) References Cited

U.S. PATENT DOCUMENTS 7,893,896 B2 * 2/2011 Choi ............................... 345/82
(Continued)

FOREIGN PATENT DOCUMENTS

EP         1 654 723 B1      1/2008
(Continued)

OTHER PUBLICATIONS

International Search Report (ISR) issued in PCT/JP2010/062317 mailed in Aug. 2010.

*Primary Examiner* — Jennifer Doan
(74) *Attorney, Agent, or Firm* — Chen Yoshimura LLP

(57) ABSTRACT

Disclosed is a display device that can achieve a reduction of power consumption without deteriorating the aperture ratio. A liquid crystal capacitance element (Clc) is formed by being sandwiched between a pixel electrode (20) and an opposite electrode (80). The pixel electrode (20), one end of a first switching circuit (22), one end of a second switching circuit (23), and the first terminal of a second transistor (T2) form an internal node (N1). The other end of the first switching circuit (22) and the other end of the second switching circuit (23) are connected to a source line (SL). The second switching circuit (23) includes a series circuit of a transistor (T1) and a diode (D1), and an output node (N2) is formed of the control terminal of the transistor (T1), the second terminal of the transistor (T2), and one end of a boost capacitance element (Cbst). The other end of the boost capacitance element (Cbst) is connected to a boost line (BST), and the control terminal of the transistor (T2) is connected to a reference line (REF). The diode (D1) has a rectifying function in the direction to the internal node (N1) from the source line (SL).

28 Claims, 35 Drawing Sheets

U.S. PATENT DOCUMENTS

| | | |
|---|---|---|
| 7,928,533 B2 * | 4/2011 | Zheng et al. .................. 257/551 |
| 2004/0130544 A1 | 7/2004 | Sun |
| 2006/0232577 A1 | 10/2006 | Edwards et al. |
| 2008/0136795 A1 * | 6/2008 | Numao et al. ................ 345/204 |

FOREIGN PATENT DOCUMENTS

| | | |
|---|---|---|
| JP | 61-69283 A | 4/1986 |
| JP | 61-74481 A | 4/1986 |
| JP | 2004-212924 A | 7/2004 |
| JP | 2005-18088 A | 1/2005 |
| JP | 2006-343563 A | 12/2006 |
| JP | 2007-502068 A | 2/2007 |
| JP | 2007-334224 A | 12/2007 |
| WO | 2005/015532 A1 | 2/2005 |

* cited by examiner

PIXEL CIRCUIT AND DISPLAY APPARATUS

TECHNICAL FIELD

The present invention relates to a pixel circuit and a display device equipped with the same, and more particularly to an active matrix type display device.

BACKGROUND ART

Generally, portable devices such as mobile phones and portable gaming devices employ liquid crystal display devices as display units thereof. Because mobile phones and the like are battery-powered, and low power consumption is strongly demanded, information that needs to be displayed constantly such as a time clock or a battery level is displayed on a reflective sub-panel. In recent years, there has been a demand for performing both a normal display with a full-color display and a reflective constant display in a single main panel.

FIG. 35 shows an equivalent circuit of a pixel circuit of a typical active matrix type liquid crystal display device. FIG. 36 shows a circuit arrangement example of an active matrix type liquid crystal display device with m×n pixels. Both m and n are integers of 2 or greater.

As shown in FIG. 36, switching elements made of thin film transistors (TFTs) are provided at respective intersections of "m" number of source lines SL1, SL2, . . . , SLm and "n" number of scanning lines GL1, GL2, . . . , GLn. In FIG. 35, the respective source lines SL1, SL2, . . . , SLm are represented by source lines SL. Similarly, the respective scanning lines GL1, GL2, . . . , GLn are represented by scanning lines GL.

As shown in FIG. 35, a liquid crystal capacitance element Clc and an auxiliary capacitance element Cs are connected in parallel through a TFT. The liquid crystal capacitance element Clc is made of a laminated structure that includes a pixel electrode 20, an opposite electrode 80, and a liquid crystal layer sandwiched therebetween. The opposite electrode is also referred to as a common electrode.

In FIG. 36, only TFTs and pixel electrodes (black rectangular portions) are illustrated in the respective pixel circuits for simplification.

The auxiliary capacitance Cs has one end (one electrode) connected to the pixel electrode 20, and the other end (the other electrode) connected to an auxiliary capacitance line CSL so as to stabilize a pixel data voltage maintained in the pixel electrode 20. The auxiliary capacitance Cs is provided so as to suppress a change in electrical capacitance of the liquid crystal capacitance element Clc between a black display and a white display, which occurs due to a leakage current of the TFT and dielectric constant anisotropy of liquid crystal molecules. It can also prevent the pixel data voltage held by the pixel electrode from changing due to a voltage change and the like caused by a parasitic capacitance between the pixel electrode and neighboring wiring lines. By sequentially controlling a voltage applied to the scanning lines, TFTs connected to a particular scanning line are turned on, and for every scanning line, voltages that correspond to pixel data are supplied to the respective source lines, and are written in the corresponding pixel electrodes.

In the normal display mode with full-color display, even when a displayed image is a still image, the same display content is repeatedly written in the same pixel in every frame. By refreshing the voltage of the pixel data held by the pixel electrode in this way, the change in pixel data voltage is minimized, thereby ensuring a high-quality display of a still image.

The power consumption for driving a liquid crystal display device is mostly accounted for by the power used by a source driver to drive source lines, and is substantially represented by a relational expression shown in Formula 1 below. In Formula 1, P is power consumption, "f" is a refresh rate (the number of refresh operations for one frame executed per unit time), C is a load capacitance driven by the source driver, V is a driving voltage of the source driver, "n" is the number of the scanning lines, and "m" is the number of the source lines, respectively. The refresh operation refers to an operation of applying voltages to pixel electrodes through source lines while maintaining display content.

$$P \propto f \cdot C \cdot V^2 \cdot n \cdot m \qquad \text{Formula 1}$$

On the other hand, in the constant display, because the display content is a still image, the pixel data voltage does not necessarily have to be refreshed for every single frame. Therefore, in order to further reduce the power consumption of the liquid crystal display device, the refresh frequency could be reduced in the constant display. However, when the refresh frequency is reduced, the pixel data voltage held by the pixel electrode is changed due to the leakage current of the TFT. This voltage change causes the display brightness (liquid crystal transmittance) of each pixel to change, which is observed as flickering. Also, because the average potential in each frame period is lowered, degradation of the display quality such as an insufficient contrast may occur.

As a technique to solve the problem of the display quality degradation caused by the reduced refresh frequency in the constant display of still images, such as the battery level, the clock display, and the like, and to reduce the power consumption at the same time, a configuration described in Patent Document 1 below has been disclosed, for example. The configuration disclosed in Patent Document 1 is capable of performing both a transmissive liquid crystal display and a reflective liquid crystal display. Further, pixel circuits in a pixel region that can perform the reflective liquid crystal display are provided with memory units, respectively. This memory unit stores a voltage signal indicative of information to be displayed in the reflective liquid crystal display section. When the reflective liquid crystal display is performed, the pixel circuit draws the voltage stored in the memory unit, thereby displaying information corresponding to the voltage.

In Patent Document 1, the memory unit is SRAM that allows the voltage signal to be stored statically. This eliminates the need for the refresh operation, and therefore, maintenance of display quality and reduction in power consumption can be achieved at the same time.

RELATED ART DOCUMENTS

Patent Documents
  Patent Document 1: Japanese Patent Application Laid-Open Publication No. 2007-334224

SUMMARY OF THE INVENTION

Problems to be Solved by the Invention

However, when the above-mentioned configuration is employed in the liquid crystal display device that is used for mobile phones or the like, the memory unit for storing pixel data needs to be provided for each pixel or each pixel group, in addition to the auxiliary capacitance element for holding a voltage of each pixel data as analog information in the normal operation. This increases the number of elements and the number of signal lines formed in an array substrate (active matrix substrate) that constitutes a display section in the liquid crystal display device, thereby lowering the aperture ratio in the transmissive mode. If polarity reversal driver circuits are provided together with the memory units so as to perform AC-driving of the liquid crystals, the aperture ratio is further reduced. As described, when the aperture ratio is reduced by the increase in the number of elements and the number of signal lines, the brightness of a display image in the normal display mode is lowered.

The above-mentioned constant display mode is configured to display in two gradation levels only, but there also exists a need for a constant display mode that is capable of multi-color display. However, if the conventional configuration is employed to achieve such a display mode, the required number of memory units is inevitably increased, causing the number of elements and the number of signal lines to be further increased.

The present invention was made in view of the above-mentioned problems, and an object of the present invention is to provide a pixel circuit and a display device that use less power and that can prevent deterioration of liquid crystals and degradation of display quality without reducing the aperture ratio, and more particularly, to enable the refresh operation even in the display mode that is capable of multi-color display without increasing the number of elements and the number of signal lines.

Means for Solving the Problems

In order to achieve the above-mentioned objects, a pixel circuit according to the present invention includes: a display element unit that includes a unit display element; an internal node constituting a part of the display element unit, the internal node holding a pixel data voltage applied to the display element unit; a first switching circuit that transfers the pixel data voltage supplied by a data signal line to the internal node through at least a prescribed switching element; a second switching circuit that transfers the pixel data voltage supplied by the data signal line to the internal node without passing through the prescribed switching element; and a control circuit that holds, at one end of a first capacitance element, a prescribed voltage corresponding to the pixel data voltage held by the internal node, the control circuit controlling a conducting and non-conducting state of the second switching circuit, wherein the second switching circuit includes a series circuit of a first transistor element and a diode element, the first transistor element having a first terminal, a second terminal, and a control terminal that controls electrical continuity between the first and second terminals, wherein the control circuit includes a series circuit of a second transistor element and the first capacitance element, the second transistor element having a first terminal, a second terminal, and a control terminal that controls electrical continuity between the first and second terminals, wherein respective one ends of the first and second switching circuits are connected to the data signal line, wherein respective other ends of the first and second switching circuits and the first terminal of the second transistor element are connected to the internal node, wherein the diode element serves as a rectifier in a direction from the data signal line to the internal node, wherein the control terminal of the first transistor element, the second terminal of the second transistor element, and the one end of the first capacitance element are connected to each other, forming an output node of the control circuit, wherein the control terminal of the second transistor element is connected to a first control line, and wherein another end of the first capacitance element is connected to a second control line.

The prescribed switching element is a third transistor element that has a first terminal, a second terminal, and a control terminal that controls electrical continuity between the first and second terminals, and wherein the control terminal of the third transistor element is connected to a scanning signal line.

The second switching circuit may also include a series circuit of the first transistor element, the diode element, and a fourth transistor element that has a first terminal, a second terminal, and a control terminal that controls electrical continuity between the first and second terminals, and the control terminal may be connected to a second control line. Alternatively, the control terminal may be connected to a third control line that is different from the second control line.

In the above-mentioned configuration, the first switching circuit may also include a series circuit of the fourth transistor element in the second switching circuit and the prescribed switching element. Alternatively, it may include a series circuit of a fifth transistor element having a control terminal thereof connected to the control terminal of the fourth transistor element in the second switching circuit, and the prescribed switching element.

In addition to the respective configurations above, the pixel circuit according to the present invention further includes a second capacitance element having one end connected to the internal node, and the other end connected to a fourth control line or a prescribed fixed voltage line.

A display device according to the present invention includes a pixel circuit array in which a plurality of pixel circuits described above are arranged in a row direction and a column direction, respectively, wherein the data signal line is provided in each column, wherein the pixel circuits arranged in a same column have respective one ends of the first switching circuits thereof connected to the same data signal line, wherein the pixel circuits arranged in a same row or in a same column have the respective control terminals of the second transistor elements thereof connected to the same first control line, wherein the pixel circuits arranged in the same row or in the same column have the respective other ends of the first capacitance elements connected to the same second control line, and wherein the display device further comprises a data signal line driver circuit for driving the data signal lines individually, and a control line driver circuit for driving the first and second control lines individually.

In addition to the above-mentioned features, the display device according to the present invention has a configuration where the prescribed switching element is the third transistor element that has a first terminal, a second terminal, and a control terminal that controls electrical continuity between the first and second terminals, and the control terminal thereof is connected to the scanning signal line, wherein the scanning signal line is arranged in each row, wherein the pixel circuits arranged in the same row are connected to the same scanning signal line, and wherein the display device further comprises a scanning signal line driver circuit for driving each scanning signal line individually.

When the second switching circuit includes a series circuit of the first transistor element, the diode element, and the fourth transistor element that has a first terminal, a second terminal, and a control terminal that controls electrical continuity between the first and second terminals, in the pixel circuits arranged in the same row or the same column, the control terminals of the fourth transistor elements may be connected to the same second control line. Alternatively, the control terminals of the fourth transistor elements may be connected to the same third control line. In this case, the third control line is controlled by the control line driver circuit.

Further, in the above-mentioned configuration, the first switching circuit may also include a series circuit of the fourth transistor element in the second switching circuit and the third transistor element. Alternatively, it may include a series circuit of the fifth transistor element having the control terminal thereof connected to the control terminal of the fourth transistor element in the second switching circuit, and the third transistor element.

In addition to the above-mentioned features, in the display device according to the present invention, when a writing operation to write the pixel data in the respective pixel circuits arranged in one selected row is performed, the scanning signal line driver circuit applies a prescribed selected row voltage to the scanning signal line of the selected row so as to turn on the third transistor elements arranged in the selected row, and applies a prescribed non-selected row voltage to the scanning signal lines of non-selected rows so as to turn off the third transistor elements arranged in the non-selected rows, and the data signal line driver circuit applies, to the respective data signal lines, data voltages corresponding to the pixel data that are to be written in the pixel circuits in the respective columns of the selected row, respectively.

It is preferable that, in the writing operation, the control line driver circuit applies a prescribed voltage that turns on the second transistor element to the first control line.

In the display device according to the present invention, when a writing operation for writing the pixel data in the respective pixel circuits arranged in one selected row is performed, the scanning signal line driver circuit applies a prescribed selected row voltage to the scanning signal line of the selected row so as to turn on the third transistor elements arranged in the selected row, and applies a prescribed non-selected row voltage to the scanning signal lines of non-selected rows so as to turn off the third transistor elements arranged in the non-selected rows, the control line driver circuit applies, to the second control line of the selected row, a prescribed select voltage that turns on the fourth transistor element, and applies, to the second control line of the non-selected rows, a prescribed non-select voltage that turns off the fourth transistor element, and the data signal line driver circuit applies, to the respective data signal lines, data voltages that correspond to the pixel data that are to be written in the pixel circuits in the respective columns of the selected row, respectively.

When the pixel circuit has a configuration where the control terminal of the fourth transistor element is connected to the third control line, the control line driver circuit may apply the select voltage to the third control line of the selected row, and apply the non-select voltage to the third control lines of the non-selected rows.

In the display device according to the present invention, the internal node of each pixel circuit in the pixel circuit array is configured to be capable of holding one voltage state among a plurality of voltage states that are mutually different to achieve a multi-gradation display. In a self-refresh operation that activates the second switching circuits and the control circuits in a plurality of pixel circuits so as to simultaneously compensate voltage changes in the internal nodes thereof, the display device performs a refresh operation for the pixel circuits that have the internal node in a voltage state of a target gradation level as follows: the scanning signal line driver circuit applies a prescribed voltage to the scanning signal lines connected to all of the pixel circuits in the pixel circuit array so as to turn the third transistor elements off; the data signal line driver circuit applies a refresh input voltage to the data signal lines, the refresh input voltage being a sum of a refresh target voltage and a prescribed first adjusting voltage, the refresh target voltage corresponding to a voltage state of a target gradation level for which the refresh operation is performed, the prescribed first adjusting voltage corresponding to a turn-on voltage of the second switching circuit; and the control line driver circuit applies a boost voltage of a prescribed amplitude to the second control line while applying a refresh reference voltage to the first control line so as to change a voltage of the output node by capacitance-coupling through the first capacitance element, the refresh reference voltage being a sum of a refresh isolation voltage and a prescribed second adjusting voltage, the refresh isolation voltage being defined by an intermediate voltage between a voltage state that is one level lower than the target gradation level and a voltage state of the target gradation level, the prescribed second adjusting voltage corresponding to a threshold voltage of the control circuit between the first control line and the internal node, so that: when the voltage state of the internal node is higher than the refresh target voltage, the diode element becomes reverse-biased in a direction from the data signal line to the internal node, thereby breaking electrical continuity between the data signal line and the internal node, when the voltage state of the internal node is lower than the refresh isolation voltage, the potential change of the output node by the application of the boost voltage is suppressed, and the first transistor element is turned off, thereby breaking the electrical continuity between the data signal line and the internal node, and when the voltage state of the internal node is at least the refresh isolation voltage and no more than the refresh target voltage, the diode element becomes forward-biased in a direction from the data signal line to the internal node, and the potential change in the output node is not suppressed, which turns the first transistor element on, thereby providing the refresh target voltage to the internal node.

Alternatively, when the first switching circuit of the pixel circuit includes the fourth transistor element or the fifth transistor element, the display device performs the refresh operation for the pixel circuits that have the internal node in the voltage state of the target gradation as follows: the control line driver circuit applies a boost voltage of a prescribed amplitude to the second control line while applying, to the third control line, a prescribed voltage that turns on the fourth transistor element so as to change a voltage of the output node by capacitance-coupling through the first capacitance element.

In this case, it is also preferable to apply a prescribed voltage to the third control line after applying the refresh reference voltage to the first control line and applying the boost voltage to the second control line.

In addition to the above-mentioned configuration, the display device is configured such that the refresh operation is sequentially performed for the pixel circuits that respectively have the internal nodes in voltage states of different gradation levels by repeatedly conducting the following operation while changing values of the refresh input voltage and the refresh isolation voltage each time: applying the boost voltage to the second control line while turning the third transistor element off, and applying the refresh input voltage and the refresh reference voltage to the date signal line and the first control line, respectively.

In this case, the display device can be configured to apply the boost voltage while changing values of the refresh input voltage and the refresh isolation voltage a certain number of times that is one less than the number of gradation levels, the number of gradation levels being the number of voltage states that can be held by the internal node of each pixel circuit in the pixel circuit array.

In addition to the above-mentioned configurations, in the display device according to the present invention, after a completion of a refresh step that includes the operation of repeatedly conducting an operation of turning the third transistor element off, applying the refresh input voltage and the refresh reference voltage to the date signal line and the first control line, respectively, and applying the boost voltage to the second control line, while changing values of the refresh input voltage and the refresh isolation voltage each time, the display device performs a stand-by step in which: the data signal line driver circuit applies a voltage that corresponds to a smallest value of a voltage state that can be held by the internal node to the data signal line; and the control line driver circuit applies a voltage that can turn on the second transistor regardless of the voltage state of the internal node to the first control line at least for a certain period of time, instead of applying the boost voltage to the second control line.

In this case, it is preferable that the refresh step be performed again after performing the stand-by step for a period of time that is at least ten times as long as that of the refresh step.

In the above-mentioned configuration, the first adjusting voltage is preferably a turn-on voltage of the diode element, and the second adjusting voltage is preferably a threshold voltage of the second transistor element.

Alternatively, according to the present invention, in the self-refresh operation, a refresh operation is sequentially performed for the pixel circuits that include the internal nodes in voltage states of different gradation levels as follows: setting a first gradation level as the target gradation and applying the boost voltage to the second control line while applying the refresh input voltage and the refresh reference voltage to the data signal line and the first control line, respectively; and while continuously applying the boost voltage, setting a second gradation level that is one level higher than the first gradation level as the target gradation level, changing the refresh reference voltage applied to the first control line, and thereafter changing the refresh input voltage applied to the data signal line.

When there exists a gradation that is even higher than the second gradation level, after a completion of the refresh operation for the second gradation level, the display device repeats the refresh operation for the higher gradation level by performing, while continuously applying the boost voltage, setting the target gradation level to a gradation level that is one level higher than the second gradation level, changing the refresh reference voltage applied to the first control line, and thereafter changing the refresh input voltage applied to the data signal line.

In the above-mentioned method, when the control terminals of the fourth transistor elements are connected to the same third control line, in addition to applying the boost voltage to the second control line, a prescribed voltage that turns on the fourth transistor elements may also be applied to the third control line. In this case, after the target gradation is changed to the second gradation, the boost voltage is continuously applied to the second control line, and the prescribed voltage that turns on the fourth transistor elements is continuously applied to the third control lines.

When there exists a gradation level that is even higher than the second gradation level, after a completion of the refresh operation for the second gradation level, the display device repeats the refresh operation for the higher gradation level by performing, while continuously applying the boost voltage and the prescribed voltage that turns the fourth transistor element on, setting the target gradation level to a gradation level that is one level higher than the second gradation level, changing the refresh reference voltage applied to the first control line, and thereafter changing the refresh input voltage applied to the data signal line.

By performing the self-refresh operation in the above-mentioned method, the refresh operations for different gradation levels can be performed while reducing the number of times the boost voltage needs to be changed, thereby achieving the further reduction in power consumption.

EFFECTS OF THE INVENTION

According to the configuration of the present invention, in addition to a normal writing operation, an operation (self-refresh operation) to restore an absolute value of a voltage applied across both ends of the display element unit to the value provided by the last writing operation without performing the writing operation can be performed. According to the present invention, in particular, among a plurality of pixel circuits, only the pixel circuits that have the internal nodes that need to be restored to a voltage state of a target gradation can be automatically refreshed with a single application of a pulse voltage. This enables a self-refresh operation under the circumstances where the internal nodes hold voltage states of multiple different levels.

When a plurality of pixel circuits are arranged, the normal writing operation is generally performed for every row. Therefore, it is necessary to drive the driver circuit as many times as the number of rows in the pixel circuit array at a maximum.

According to the pixel circuit of the present invention, by performing the self-refresh operation, a group of pixels among the plurality of arrayed pixels, which hold the same voltage state, can be refreshed at once. This makes it possible to significantly reduce the number of times that the driver circuit needs to be driven from a start to a finish of the refresh operation, resulting in the reduction in power consumption.

The present invention also differs from the conventional technology in that it is no longer necessary to provide memory units such as SRAMs in the pixel circuits, and therefore, the significant reduction in the aperture ratio is avoided.

DETAILED DESCRIPTION OF EMBODIMENTS

Figure 35:
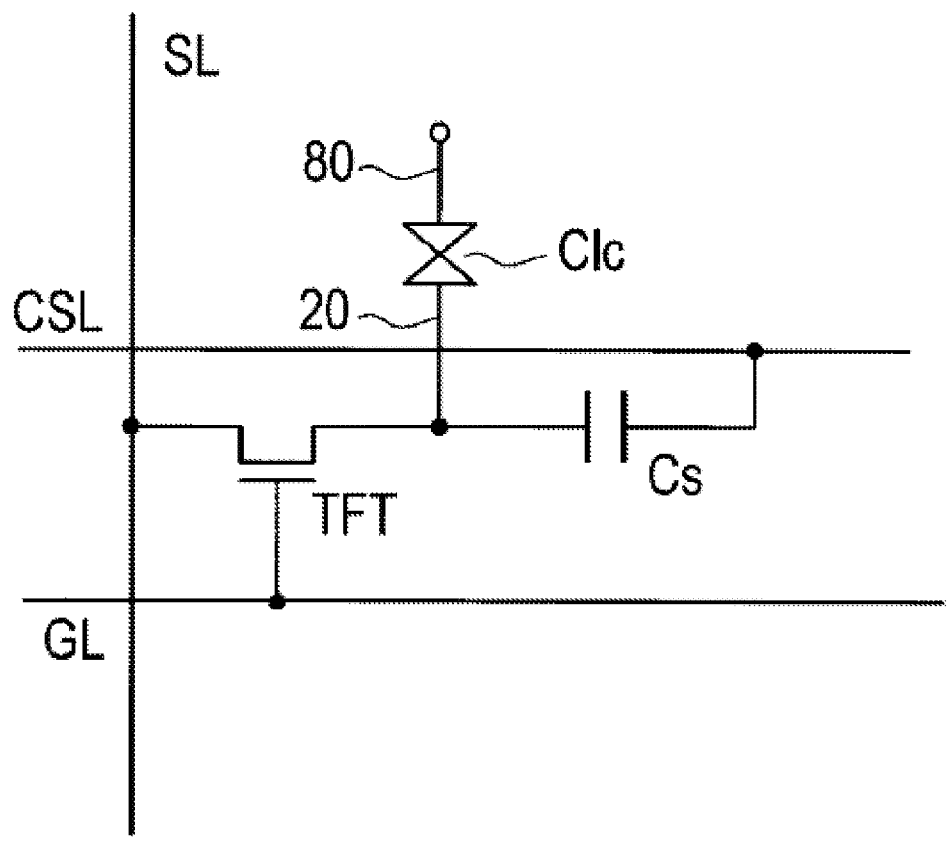
FIG. 35 is an equivalent circuit diagram of a pixel circuit of a typical active matrix type liquid crystal display device.
Figure 36:
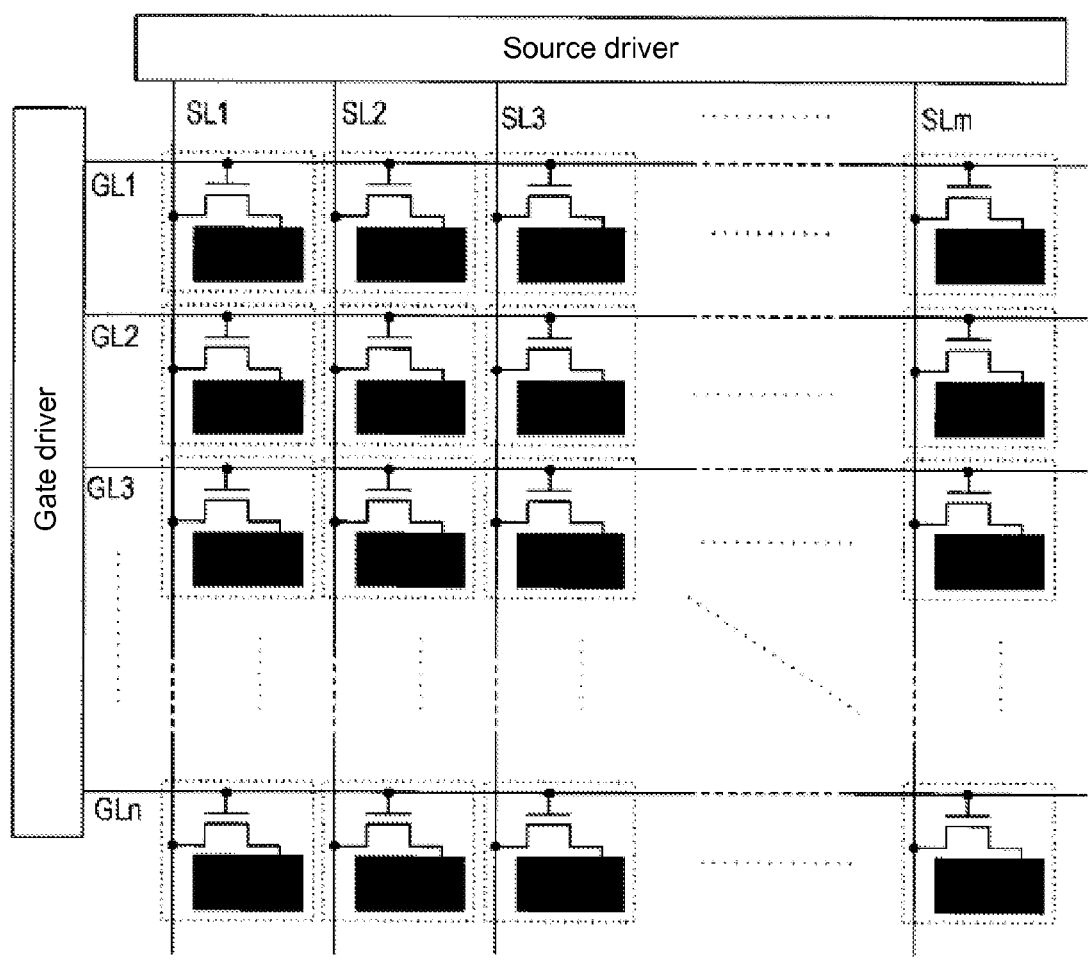
FIG. 36 is a block diagram showing a circuit arrangement example of an active matrix type liquid crystal display device having m×n pixels.

Respective embodiments of a pixel circuit and a display device of the present invention will be explained below with reference to figures. The same reference characters are given to the same constituting elements as those in FIGS. 35 and 36.

Embodiment 1

In Embodiment 1, configurations of a display device of the present invention (hereinafter simply referred to as "the display device") and of a pixel circuit of the present invention (hereinafter simply referred to as "the pixel circuit") will be explained.

Display Device

Figure 1:
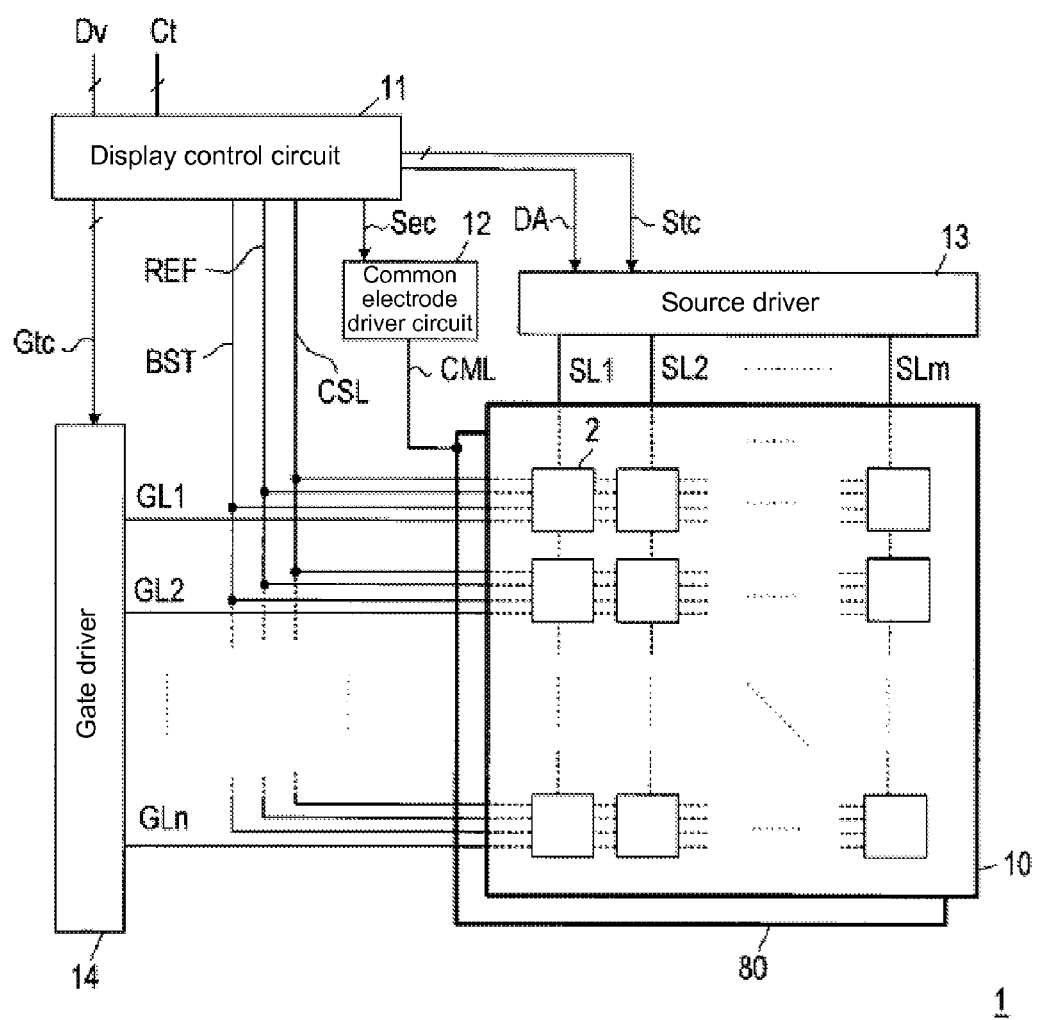
FIG. 1 is a block diagram showing an example of a schematic configuration of a display device of the present invention.

FIG. 1 shows a schematic configuration of a display device 1. The display device 1 includes an active matrix substrate 10, an opposite electrode 80, a display control circuit 11, an opposite electrode driver circuit 12, a source driver 13, a gate driver 14, and various signal lines that will be later described. On the active matrix substrate 10, a plurality of pixel circuits 2 are arranged in the row and column directions, respectively, thereby forming a pixel circuit array.

In FIG. 1, in order to avoid making the figure complicated, the pixel circuits 2 are shown as blocks. In the figure, the active matrix substrate 10 is shown to be on top of the opposite electrode 80 for convenience in order to clearly show that the various signal lines are formed on the active matrix substrate 10.

In this embodiment, the display device 1 is configured to be capable of performing a screen display in two display modes, which are a normal display mode and a constant display mode, through the same pixel circuits 2. In the normal display mode, a moving image or a still image is displayed in a full-color display, and the transmissive liquid crystal display that employs a backlight is utilized. On the other hand, in the constant display mode of this embodiment, each pixel circuit is configured to display a plurality of gradation levels, which are three gradation levels or more, and three adjacent pixel circuits 2 are respectively assigned to three primary colors (R, G, and B). When the number of gradation levels is three, 27 colors are displayed, and in a case of four gradation levels, 64 colors are displayed, for example. However, the number of gradation levels is configured to be less than that of the normal display mode.

Further, in the constant display mode, it is possible to increase the number of display colors through the area gradation by further combining a plurality of sets of the three adjacent pixel circuits. The constant display mode of this embodiment is a technology that can be employed for either the transmissive liquid crystal display or the reflective liquid crystal display.

In explanations below, for convenience, the smallest display unit corresponding to a single pixel circuit 2 is referred to as a "pixel," and "pixel data" written in the respective pixel circuits is gradation data of the respective three primary colors (R, G, and B) when the color display is performed with these three colors. In case of displaying not only the three primary colors, but also other colors by including brightness data of multiple gradation levels, the brightness data is also included in the pixel data.

Figure 2:
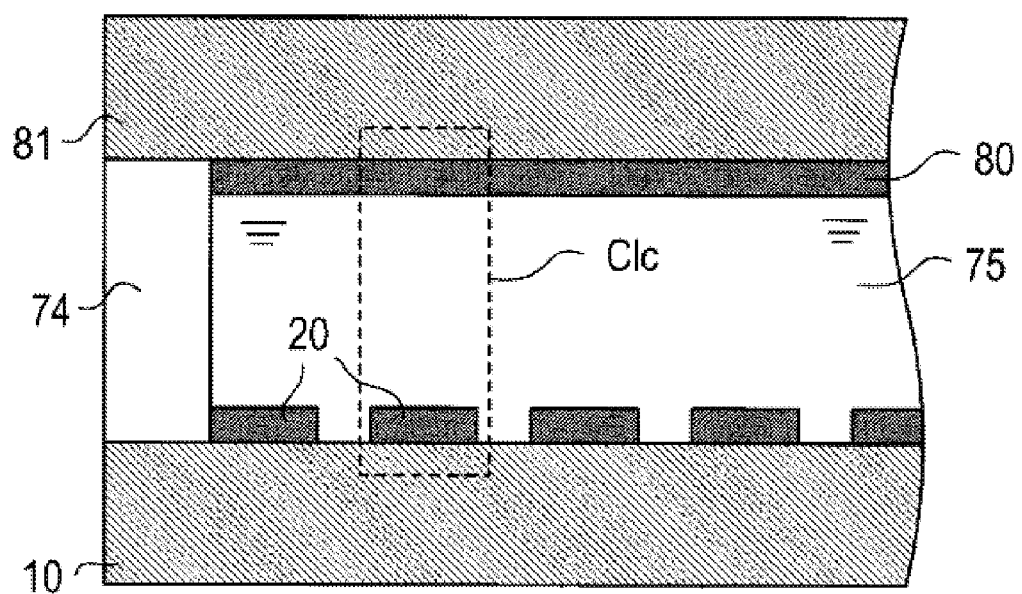
FIG. 2 is a schematic structural diagram showing a partial cross-section of a liquid crystal display device.

FIG. 2 is a cross-sectional structure diagram schematically showing a relationship between the active matrix substrate 10 and the opposite electrode 80. The figure shows a structure of a display element unit 21 (see FIG. 4) that is a constituting element of the pixel circuit 2. The active matrix substrate 10 is a light-transmissive transparent substrate, and is made of glass or plastic, for example.

As shown in FIG. 1, the pixel circuits 2 including the respective signal lines are formed on the active matrix substrate 10. FIG. 2 shows a pixel electrode 20 as a representative of constituting elements of the pixel circuit 2. The pixel electrode 20 is made of a light-transmissive transparent conductive material such as ITO (indium tin oxide).

A light-transmissive opposite substrate 81 is disposed so as to face the active matrix substrate 10, and a liquid crystal layer 75 is interposed between the two substrates. On the outer surfaces of the two substrates, polarizers (not shown) are bonded.

The liquid crystal layer 75 is sealed by a sealing material 74 at the periphery of the two substrates. On the opposite substrate 81, the opposite electrode 80 that is made of a light-transmissive transparent conductive material such as ITO is formed so as to face the pixel electrode 20. This opposite electrode 80 is formed as a single film that covers the surface of the opposite substrate 81 almost entirely. A unit liquid crystal display element Clc (see FIG. 4) is formed by one pixel electrode 20, the opposite electrode 80, and the liquid crystal layer 75 sandwiched therebetween.

A backlight device (not shown) is arranged on a rear surface side of the active matrix substrate 10 so as to emit light in a direction from the active matrix substrate 10 toward the opposite substrate 81.

As shown in FIG. 1, on the active matrix substrate 10, a plurality of signal lines are formed in the vertical and horizontal directions. A plurality of pixel circuits 2 are arranged in a matrix so as to be disposed at respective intersections of "m" number of source lines (SL1, SL2, . . . , SLm) that extend in the vertical direction (column direction) and "n" number of gate lines (GL1, GL2, . . . , GLn) that extend in the horizontal direction (row direction). Both "m" and "n" are integers of two or greater. The respective source lines are represented by "source lines SL," and the respective gate lines are represented by "gate lines GL."

The source lines SL correspond to "data signal lines," and the gate lines GL correspond to "scanning signal lines." A source driver 13 corresponds to a "data signal line driver circuit," and a gate driver 14 corresponds to a "scanning signal line driver circuit." An opposite electrode driver circuit 12 corresponds to an "opposite electrode voltage supply circuit," and a part of a display control circuit 11 corresponds to a "control line driver circuit."

FIG. 1 illustrates the display control circuit 11 and the opposite electrode driver circuit 12 so as to be disposed independently and separately from the source driver 13 and the gate driver 14, respectively. However, a configuration where the display control circuit 11 and the opposite electrode driver circuit 12 are included in these drivers is also possible.

Figure 3:
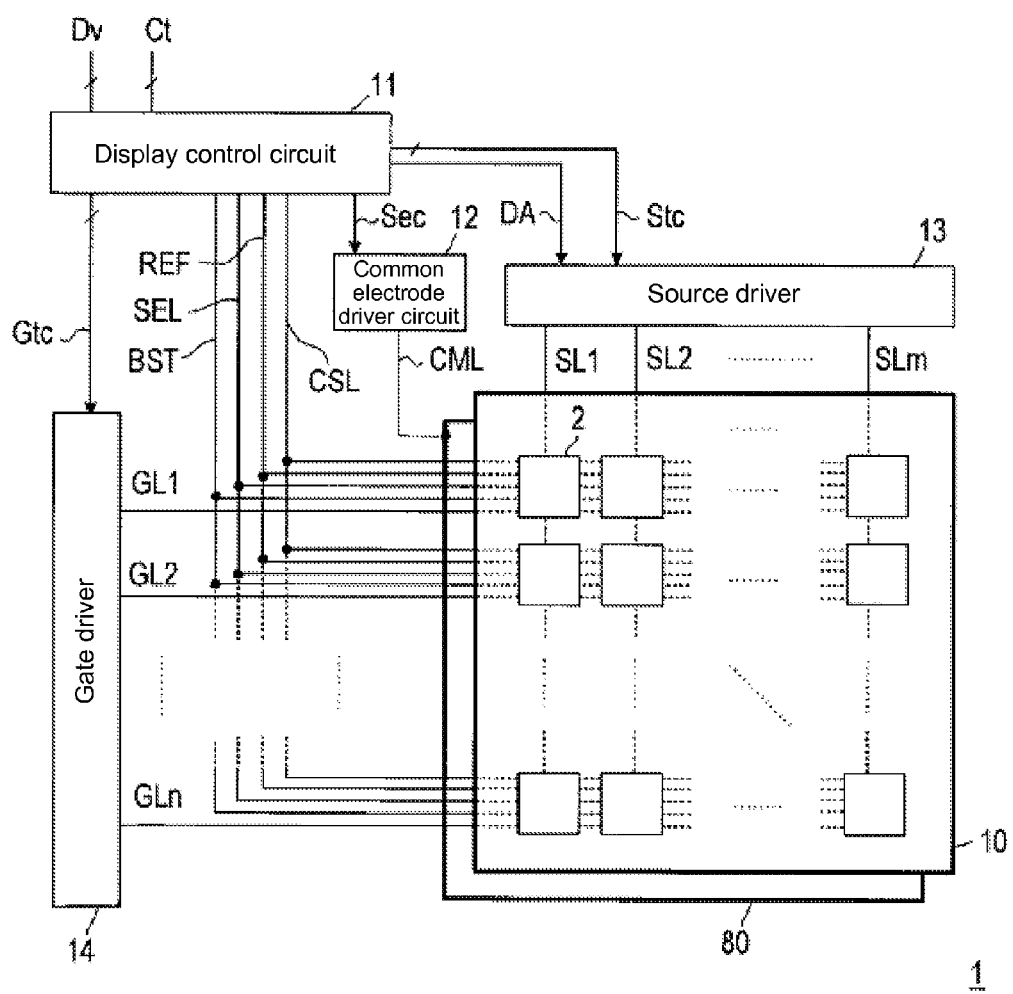
FIG. 3 is a block diagram showing an example of a schematic configuration of a display device of the present invention.

In this embodiment, in addition to the source lines SL and the gate lines GL, reference lines REF, auxiliary capacitance lines CSL, and boost lines BST are provided as signal lines for driving the pixel circuits 2. An example of another configuration is a configuration where select lines SEL are further provided. FIG. 3 shows a configuration of the display device in such a case.

The reference lines REF, the boost lines BST, and the select lines SEL correspond to "first control lines," "second control lines," and "third control lines," respectively, and are driven by the display control circuit 11. The auxiliary capacitance lines CSL correspond to "fourth control lines," or "fixed voltage lines," and are driven by the display control circuit 11, for example.

In FIGS. 1 and 3, the reference lines REF, the boost lines BST, and the auxiliary capacitance lines CSL are respectively provided in the respective rows so as to be extended in the row direction. These wiring lines in the respective rows are respectively connected and unified in a peripheral section of the pixel circuit array, but a configuration where the wiring lines in the respective rows are driven individually so that common voltages can be applied in accordance with an operation mode is also possible. These wiring lines may also be arranged in the respective columns so as to be extended in the column direction. Generally, each reference line REF, each boost line BST, and each auxiliary capacitance line CSL are configured to be commonly used by a plurality of pixel circuits 2, respectively. When the select lines SEL are further provided, they may be arranged in the same manner as the boost lines BST.

The display control circuit 11 is a circuit that controls respective writing operations in the normal display mode and in the constant display mode and a self-refresh operation in the constant display mode, which will be later described.

In the writing operation, the display control circuit 11 receives a data signal Dv and a timing signal Ct indicative of an image that is to be displayed from an external signal source, and based on these signals Dv and Ct, generates: a digital image signal DA and a data timing control signal Stc that are to be provided to the source driver 13; a scanning timing control signal Gtc that is to be provided to the gate driver 14; an opposite voltage control signal Sec that is to be provided to the opposite electrode driver circuit 12; and respective signal voltages that are to be applied to the reference line REF, the boost line BST, the auxiliary capacitance line CSL, and to the select line SEL, if provided, respectively, as signals that are used to display the image in the display element unit 21 (see FIG. 4) of the pixel circuit array.

The source driver 13 is a circuit that is controlled by the display control circuit 11 to apply a source signal of a prescribed voltage amplitude to each source line SL at a prescribed timing in the writing operation and in the self-refresh operation.

In the writing operation, based on the digital image signal DA and the data timing control signal Stc, the source driver 13 generates voltages, as determined relative to the voltage level of the opposite voltage Vcom, that correspond to pixel values for one display line, which are represented by the digital signal DA, in every horizontal period (also referred to as a "1H period"). The voltages generated here are source signals Sc1, Sc2, . . . , Scm. These voltages correspond to multiple gradation levels in both the normal display mode and the constant display mode, but in this embodiment, the constant display mode is configured to have a fewer number of gradation levels, and the voltages thereof are for three gradation levels (three values), for example. These source signals are applied to the corresponding source lines SL1, SL2, . . . , SLm.

In the self-refresh operation, the source driver 13 is controlled by the display control circuit 11 to simultaneously apply the same voltage to all of the source lines SL that are connected to target pixel circuits 2 (the details will be given below).

The gate driver 14 is a circuit that is controlled by the display control circuit 11 to apply a gate signal of a prescribed voltage amplitude to each gate line GL at a prescribed timing in the writing operation and in the self-refresh operation. This gate driver 14 may be formed on the active matrix substrate 10 together with the pixel circuits 2.

In the writing operation, based on the scanning timing control signal Gtc, the gate driver 14 sequentially selects the gate lines GL1, GL2, . . . , GLn, one line at a time during each period that approximates the horizontal period, in each frame period of the digital image signal DA so that the source signals Sc1, Sc2, . . . , Scm are written in the respective pixel circuits 2.

In the self-refresh operation, the gate driver 14 is controlled by the display control circuit 11 to simultaneously apply the same voltage to all of the gate lines GL connected to target pixel circuits 2 (the details will be given below).

The opposite electrode driver circuit 12 applies the opposite voltage Vcom to the opposite electrode 80 through the opposite electrode wiring line CML. In this embodiment, the opposite electrode driver circuit 12 alternately switches the output between a prescribed high level (5V) and a prescribed low level (0V) in the normal display mode and in the constant display mode to output the opposite voltage Vcom. The above-mentioned operation for driving the opposite electrode 80 with the opposite voltage Vcom alternating between the high level and the low level is referred to as "opposite AC driving."

With the "opposite AC driving" in the normal display mode, the opposite voltage Vcom is switched between the high level and the low level for every horizontal period and for every frame period. That is, in one frame period, the polarity of the voltage applied between the opposite electrode 80 and the pixel electrode 20 differs between two successive horizontal periods. For the same horizontal period, the polarity of the voltage applied between the opposite electrode 80 and the pixel electrode 20 differs between two successive frame periods.

On the other hand, in the constant display mode, the same voltage level is maintained during one frame period, but between two successive writing operations, the polarity of the voltage applied between the opposite electrode 80 and the pixel electrode 20 is changed.

The polarity reversal operation is necessary to prevent the display screen burn-in (surface burn-in) that occurs when a voltage of the same polarity is continuously applied between the opposite electrode 80 and the pixel electrode 20. However, by employing the "opposite AC driving," the amplitude of the voltage applied to the pixel electrode 20 in the polarity reversal operation can be reduced.

Pixel Circuit

Figure 4:
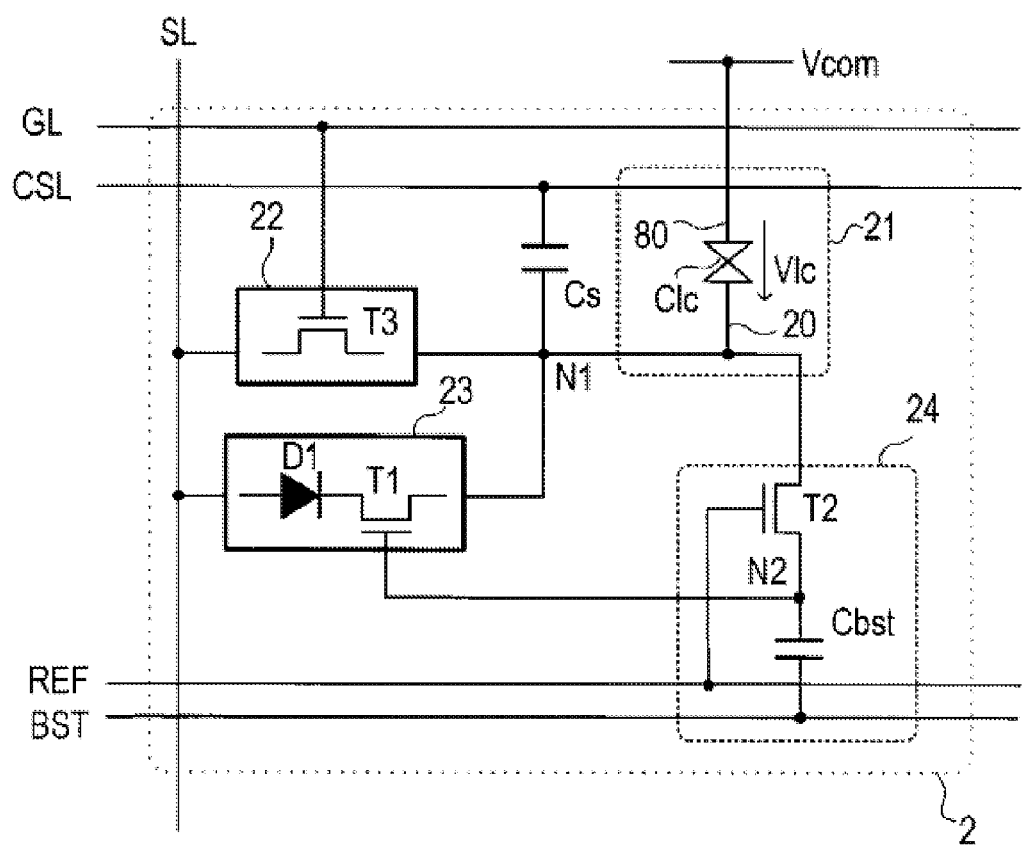
FIG. 4 is a circuit diagram showing a basic circuit configuration of a pixel circuit of the present invention.
Figure 5:
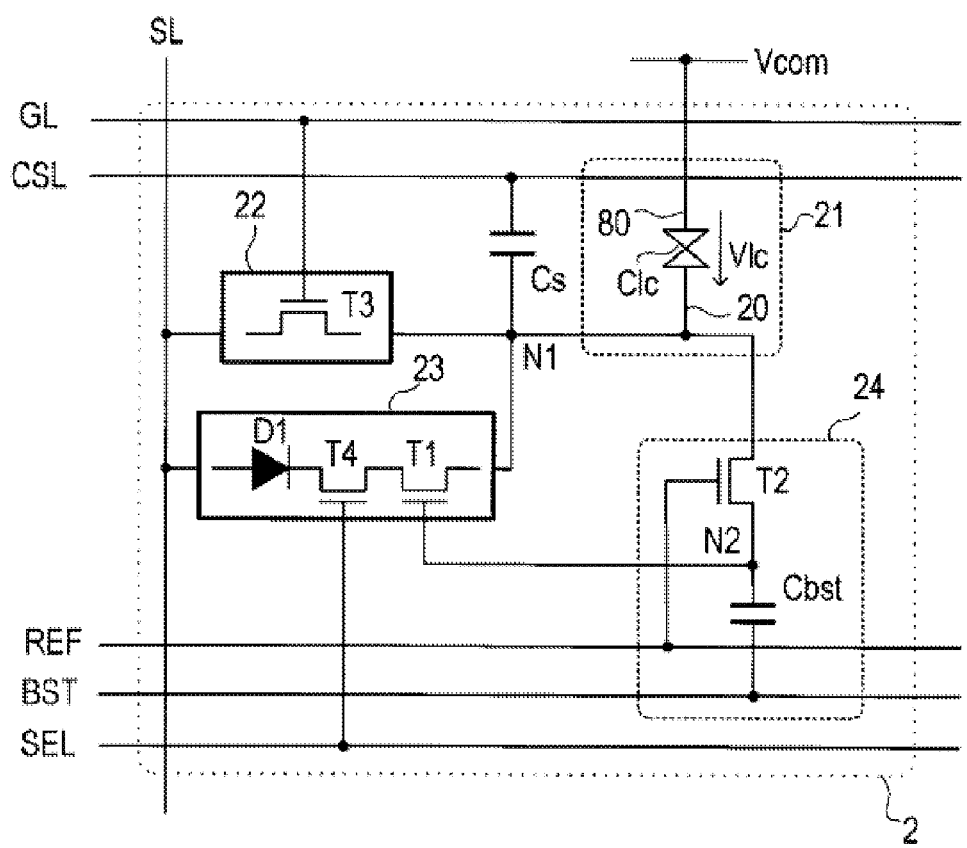
FIG. 5 is a circuit diagram showing another basic circuit configuration of the pixel circuit of the present invention.
Figure 6:
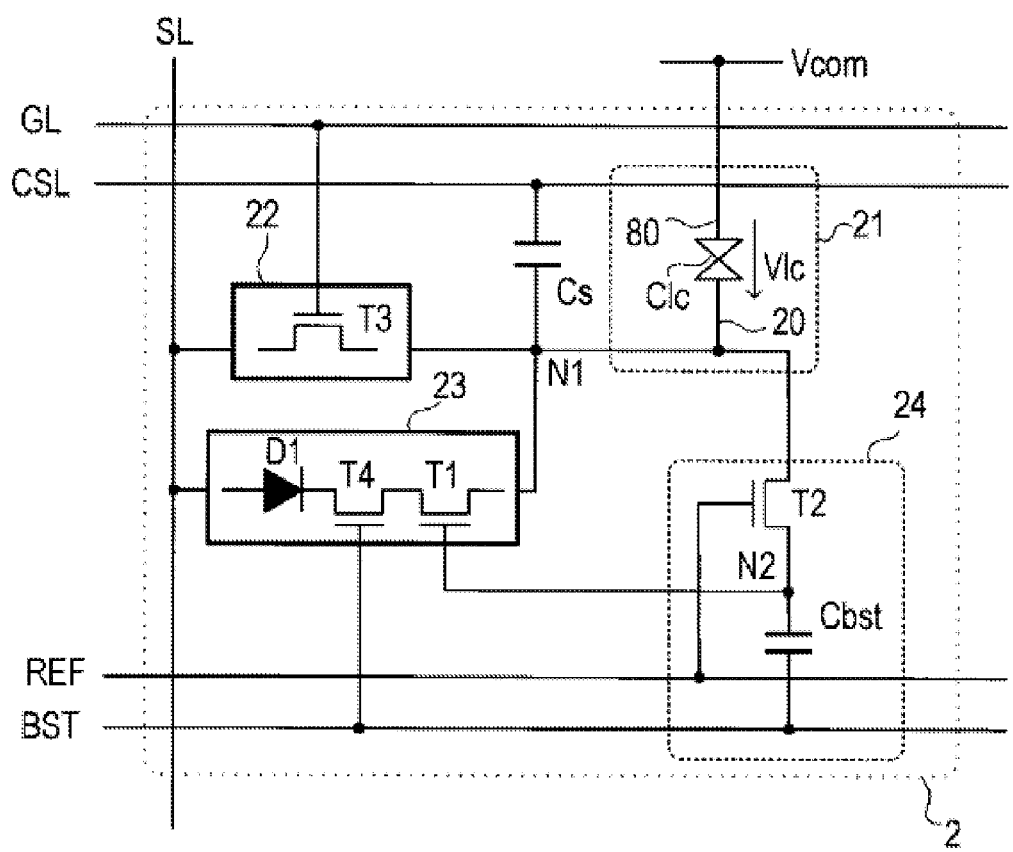
FIG. 6 is a circuit diagram showing another basic circuit configuration of the pixel circuit of the present invention.

Next, a configuration of the pixel circuit 2 will be explained with reference to FIGS. 4 to 17. FIGS. 4 to 6 show basic circuit configurations of the pixel circuit 2 of the present invention. The pixel circuit 2 is configured to include a display element unit 21 that has the unit liquid crystal display element Clc, a first switching circuit 22, a second switching circuit 23, a control circuit 24, and an auxiliary capacitance element Cs. All of the pixel circuits 2 have this configuration in common. The auxiliary capacitance element Cs corresponds to a "second capacitance element."

The basic circuit configurations shown in FIGS. 4 to 6 respectively encompass circuit configurations common to Types 1 to 3, respectively, which will be later described. The unit liquid crystal display element Clc is the same as the one that has been described with reference to FIG. 2, and therefore, the explanation thereof will be omitted.

The pixel electrode 20 is connected to respective one ends of the first switching circuit 22, the second switching circuit 23, and the control circuit 24, thereby forming an internal node N1. The internal node N1 holds a pixel data voltage supplied from the source line SL in the writing operation.

The auxiliary capacitance element Cs has one end thereof connected to the internal node N1, and the other end thereof connected to the auxiliary capacitance line CSL. This auxiliary capacitance element Cs is additionally provided so that the internal node N1 can hold the pixel data voltage stably.

In the first switching circuit 22, one end thereof that does not form the internal node N1 is connected to the source line SL. The first switching circuit 22 includes a transistor T3 that functions as a switching element. The transistor T3 is a transistor that has the control terminal connected to the gate line, and corresponds to a "third transistor element." At least when the transistor T3 is off, the first switching circuit 22 is turned into a non-conducting state, thereby breaking electrical continuity between the source line SL and the internal node N1.

One end of the second switching circuit 23 that does not form the internal node N1 is connected to the source line SL. The second switching circuit 23 includes a series circuit of a transistor T1 and a diode D1. The transistor T1 is a transistor that has the control terminal connected to an output node N2 of the control circuit 24, and corresponds to a "first transistor element." The diode D1 has a rectifying function in a direction from the source line SL toward the internal node N1, and corresponds to a "diode element." In this embodiment, this diode D1 is made of a p-n junction, but it may also be made of the Schottky junction, or a diode-connected MOSFET (MOSFET with the drain or the source connected to the gate).

As shown in FIG. 4, a configuration where the second switching circuit 23 includes a series circuit of the transistor T1 and the diode D1, and does not include a transistor T4 will be referred to as Type 1 below.

Unlike this Type 1, the second switching circuit 23 may also include a series circuit of not only the transistor T1 and the diode D1, but also a transistor T4 as shown in FIGS. 5 and 6. This configuration has two types as respectively shown in FIGS. 5 and 6 that differ from each other with respect to the signal line to which the control terminal of the transistor T4 is connected. In the pixel circuit type shown in FIG. 5 (Type 2), the select line SEL is provided in addition to the boost line BST, and the control terminal of the transistor T4 is connected to this select line SEL. On the other hand, in the pixel circuit type shown in FIG. 6 (Type 3), the control terminal of the transistor T4 is connected to the boost line BST. It is apparent that the select line SEL is not provided in Type 1. This transistor T4 corresponds to a "fourth transistor element."

In Type 1, if a potential difference equal to or greater than a turn-on voltage is generated across respective ends of the diode D1 when the transistor T1 is on, a current flows through the second switching circuit 23 in the direction from the source line SL toward the internal node N1. On the other hand, in Types 2 and 3, when both transistors T1 and T4 are on, if a potential difference equal to or greater than a turn-on voltage is generated across the respective ends of the diode D1, a current flows through the second switching circuit 23 in the direction from the source line SL toward the internal node N1.

The control circuit 24 includes a series circuit of the transistor T2 and a boost capacitance element Cbst. The first terminal of the transistor T2 is connected to the internal node N1, and the control terminal thereof is connected to the reference line REF. The second terminal of the transistor T2 is connected to the first terminal of the boost capacitance element Cbst and the control terminal of the transistor T1, thereby forming an output node N2. The second terminal of the boost capacitance element Cbst is connected to the boost line BST. The transistor T2 corresponds to a "second transistor element."

One end of the auxiliary capacitance element Cs and one end of the liquid crystal capacitance element Clc are connected to the internal node N1. In order to simplify the reference characters, an electrostatic capacitance of the auxiliary capacitance element (referred to as an "auxiliary capacitance") is denoted by Cs, and an electrostatic capacitance of the liquid crystal capacitance element (referred to as a "liquid crystal capacitance") is denoted by Clc. The total capacitance attributed to the internal node N1, i.e., a pixel capacitance Cp where the pixel data is written and is held, is approximately represented as a sum of the liquid crystal capacitance Clc and the auxiliary capacitance Cs (Cp≈Clc+Cs).

The boost capacitance element Cbst is set so as to satisfy Cbst<<Cp, where Cbst is the electrostatic capacitance of the element (referred to as a "boost capacitance").

When the transistor T2 is on, the output node N2 holds a voltage that corresponds to a voltage level of the internal node N1, and when the transistor T2 is off, it maintains an initial holding voltage even if the voltage level of the internal node N1 changes. The circuit is configured so that an on or off state of the transistor T1 of the second switching circuit 23 is controlled by this hold voltage of the output node N2.

All of the above-mentioned four types of transistors T1 to T4 are thin film transistors, such as polycrystalline silicon TFTs, amorphous silicon TFTs, or the like, that are formed on the active matrix substrate 10. In each of the transistors, one of the first and second terminals corresponds to the drain electrode, the other corresponds to the source electrode, and the control terminal corresponds to the gate electrode. Further, the respective transistors T1 to T4 may be constituted of individual transistor elements, respectively, or it may be configured by connecting a plurality of transistors in series so as to commonly use the same control terminal when the reduction of leakage current in the off state is strongly demanded. In the explanation of an operation of the pixel circuit 2 below, all of the transistors T1 to T4 are assumed to be n-channel type polycrystalline silicon TFTs that have the threshold voltage of about 2V.

In a manner similar to the transistors T1 to T4, the diode D1 is also formed on the active matrix substrate 10. In this embodiment, a p-n junction diode made of polycrystalline silicon is used as the diode D1.

Type 1

First, the Type 1 pixel circuit in which the second switching circuit 23 includes a series circuit of the transistor T1 and the diode D1 only will be explained.

Figure 7:
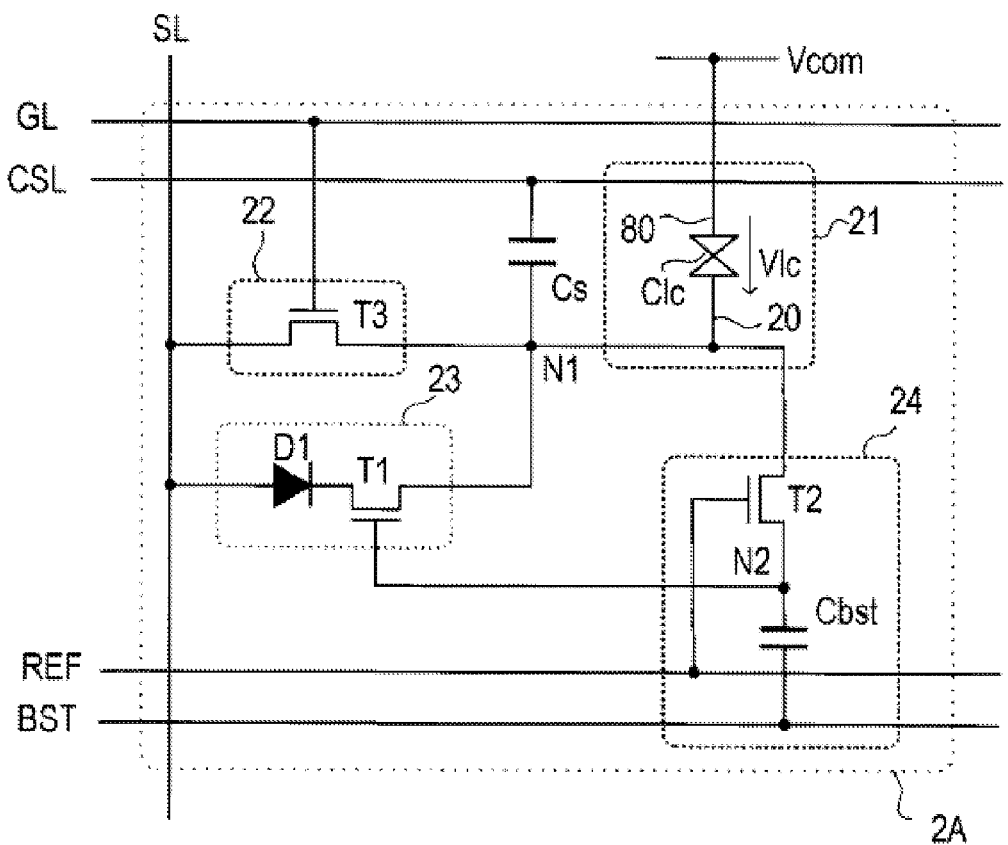
FIG. 7 is a circuit diagram showing a configuration example of a Type 1 circuit among pixel circuits of the present invention.
Figure 8:
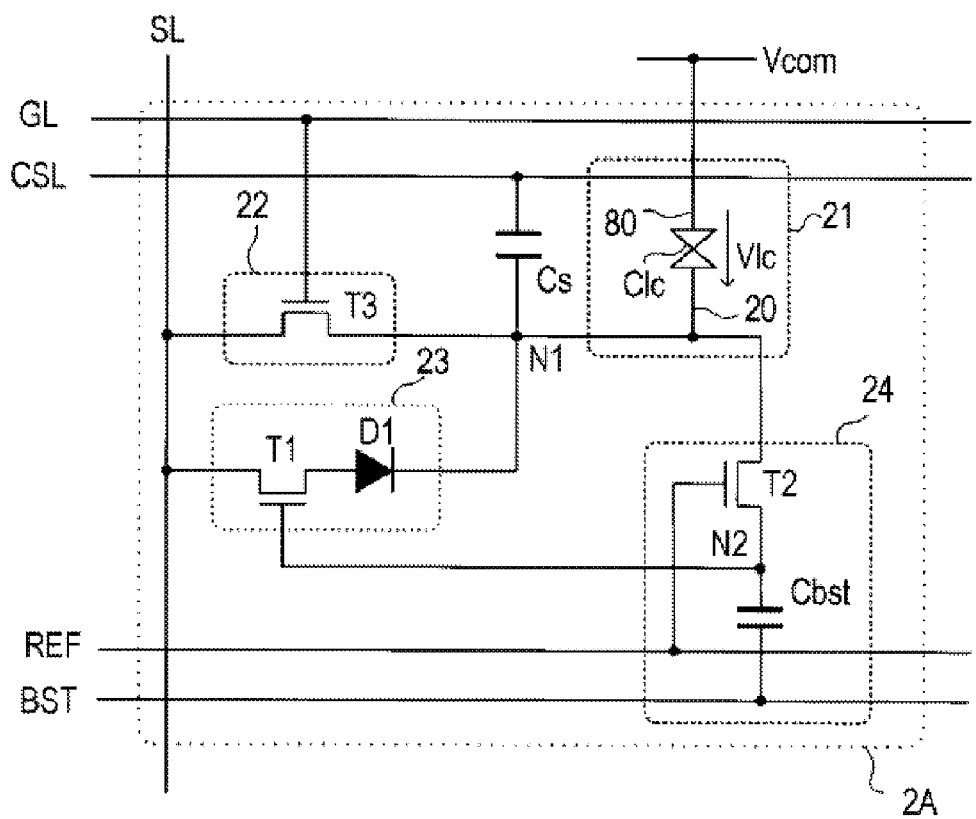
FIG. 8 is a circuit diagram showing another configuration example of the Type 1 circuit among the pixel circuits of the present invention.

As shown in FIGS. 7 and 8, two kinds of pixel circuits 2A can be provided, which differ from each other in the configuration of the second switching circuit 23 as described above.

In the Type 1 pixel circuit 2A shown in FIG. 7, the first switching circuit 22 is constituted of the transistor T3 only.

In FIG. 7, the second switching circuit 23 includes a series circuit of the diode D1 and the transistor T1, and the figure shows a configuration where the first terminal of the transistor T1 is connected to the internal node N1, the second terminal of the transistor T1 is connected to the cathode terminal of the diode D1, and the anode terminal of the diode D1 is connected to the source line SL as an example. However, as shown in FIG. 8, the transistor T1 and the diode D1 of the series circuit may switch places. The circuit may also be configured such that the transistor T1 is sandwiched by two diodes D1.

Type 2

Next, the Type 2 pixel circuit where the second switching circuit 23 includes a series circuit of the transistor T1, the diode D1, and the transistor T4, and the control terminal of the transistor T4 is connected to the select line SEL will be explained.

Figure 9:
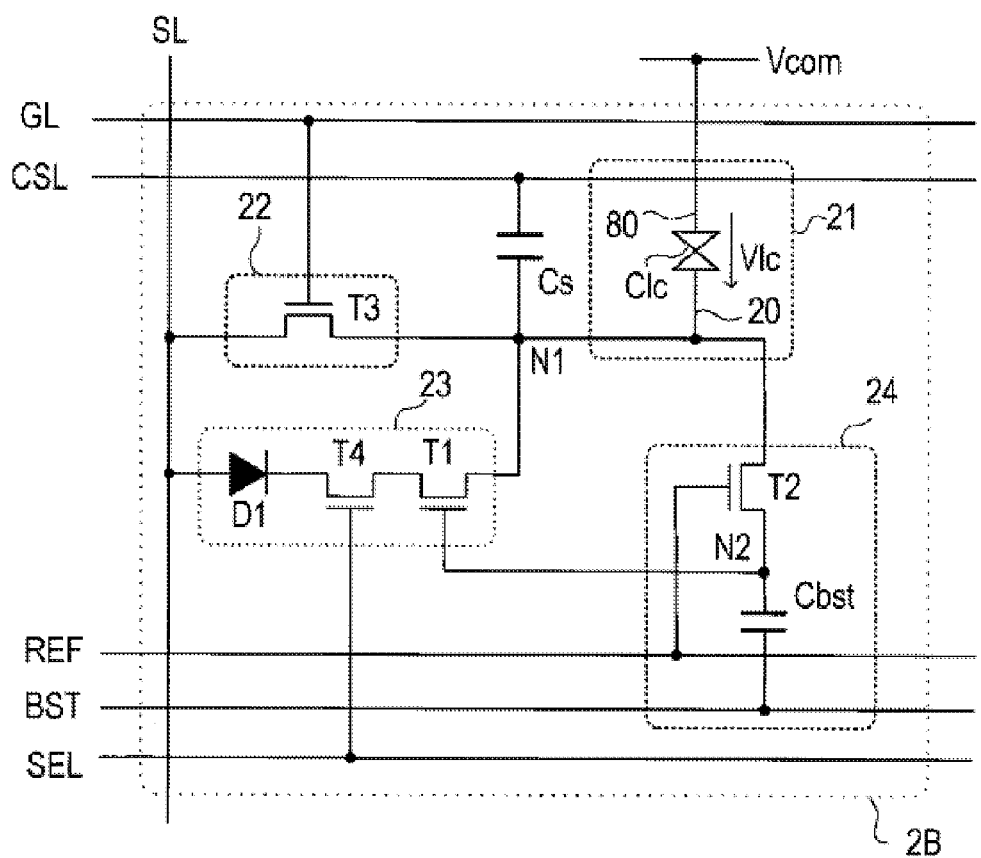
FIG. 9 is a circuit diagram showing a configuration example of Type 2 circuit among the pixel circuits of the present invention.
Figure 10:
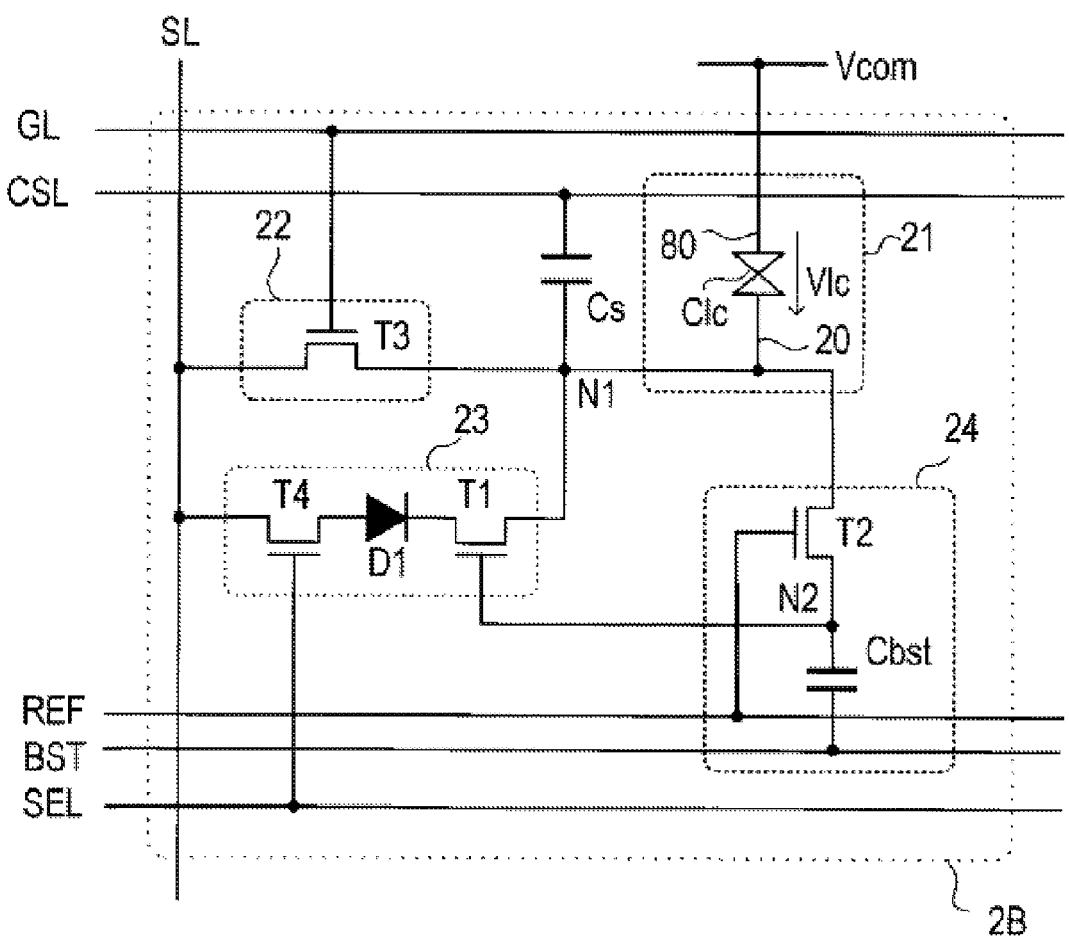
FIG. 10 is a circuit diagram showing a configuration example of the Type 2 circuit among the pixel circuits of the present invention.
Figure 11:
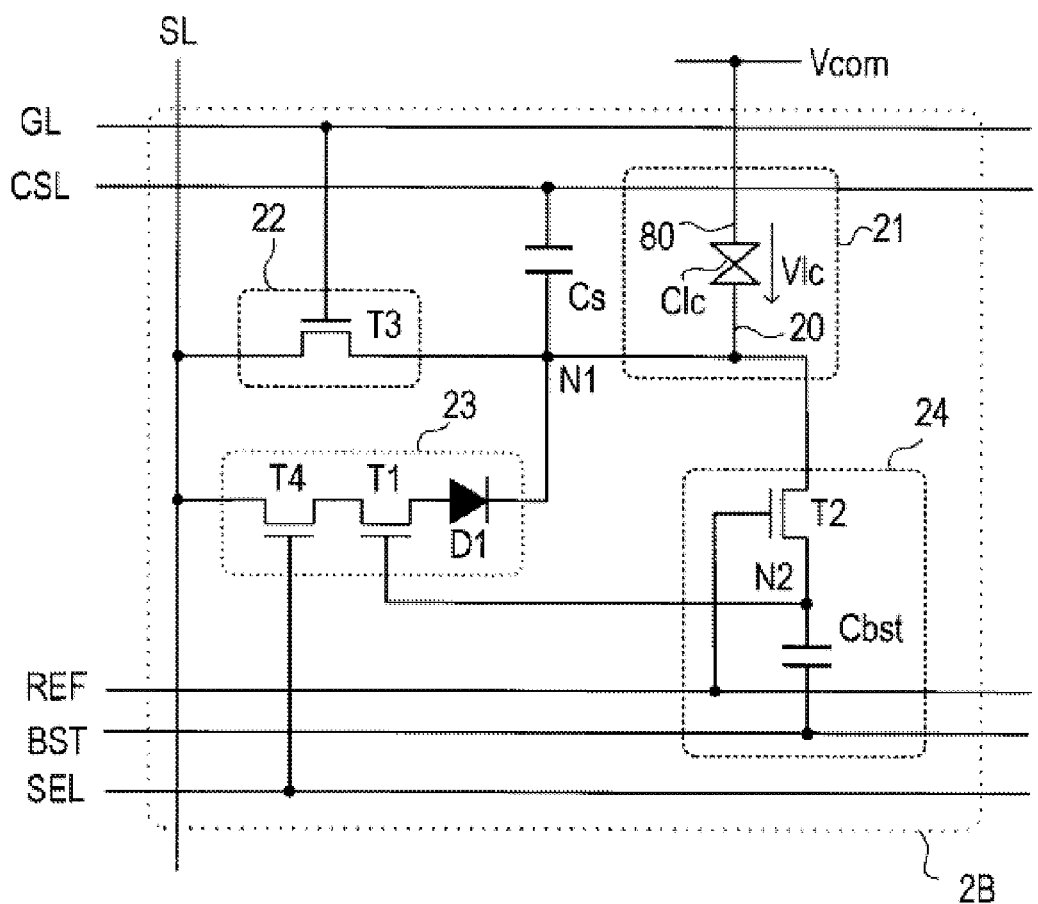
FIG. 11 is a circuit diagram showing a configuration example of the Type 2 circuit among the pixel circuits of the present invention.

Possible circuit configurations of Type 2 are generalized into pixel circuits 2B shown in FIGS. 9 to 11 and pixel circuits 2C shown in FIGS. 12 to 15 in accordance with the configuration of the first switching circuit 22.

In the pixel circuit 2B shown in FIG. 9, the first switching circuit 22 is constituted of the transistor T3 only. In a manner similar to Type 1, the circuit configuration of the second switching circuit 23 can be modified so as to arrange the diode D1 differently (see FIGS. 10 and 11, for example). Also, in these circuits, the transistors T1 and T4 can be replaced with each other.

Figure 12:
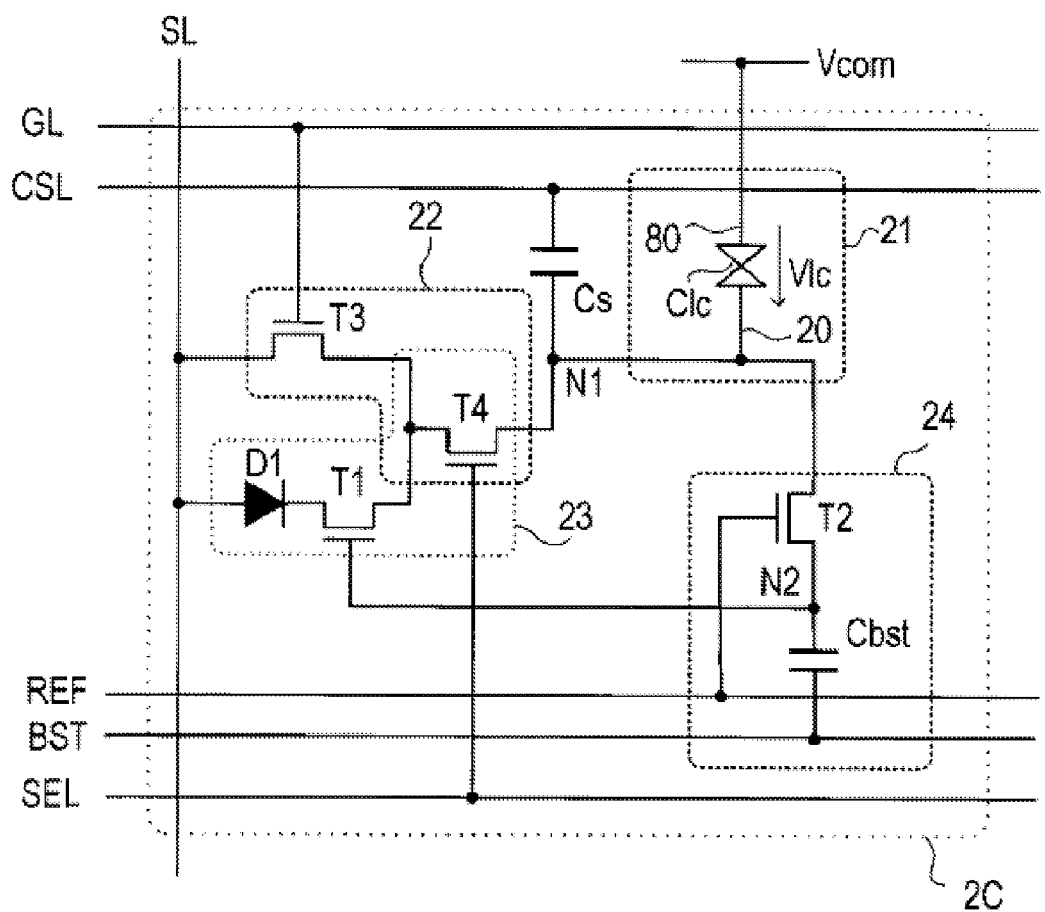
FIG. 12 is a circuit diagram showing a configuration example of the Type 2 circuit among the pixel circuits of the present invention.
Figure 13:
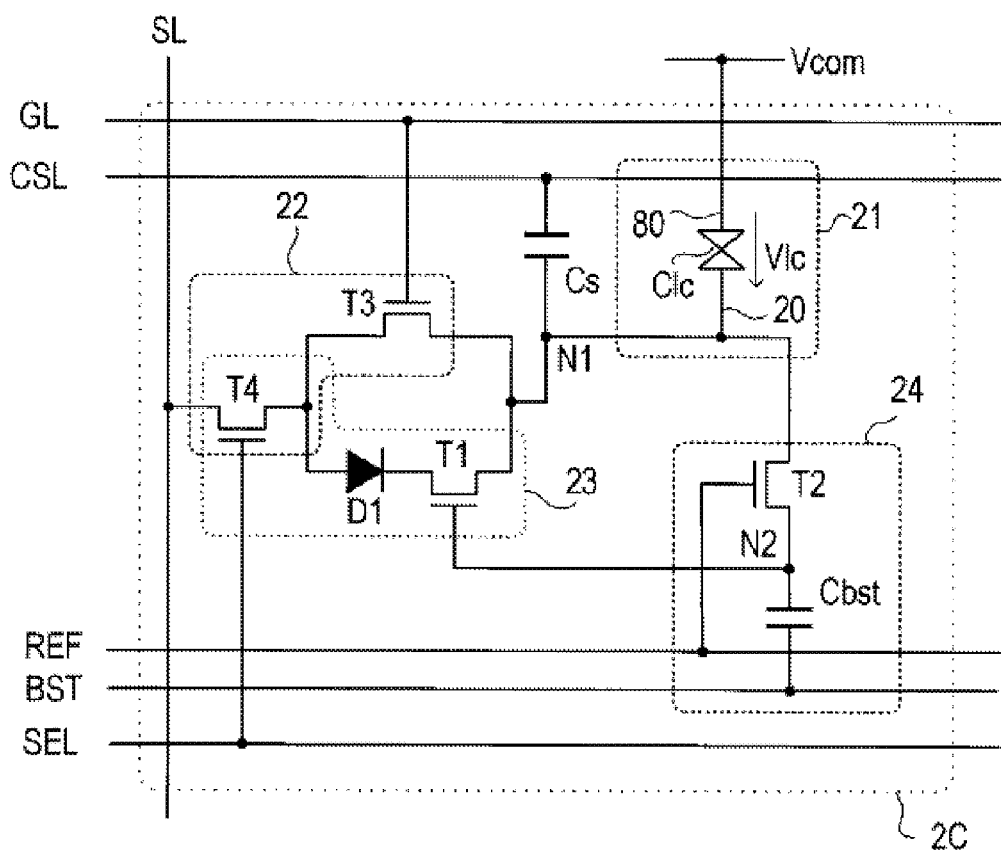
FIG. 13 is a circuit diagram showing a configuration example of the Type 2 circuit among the pixel circuits of the present invention.
Figure 14:
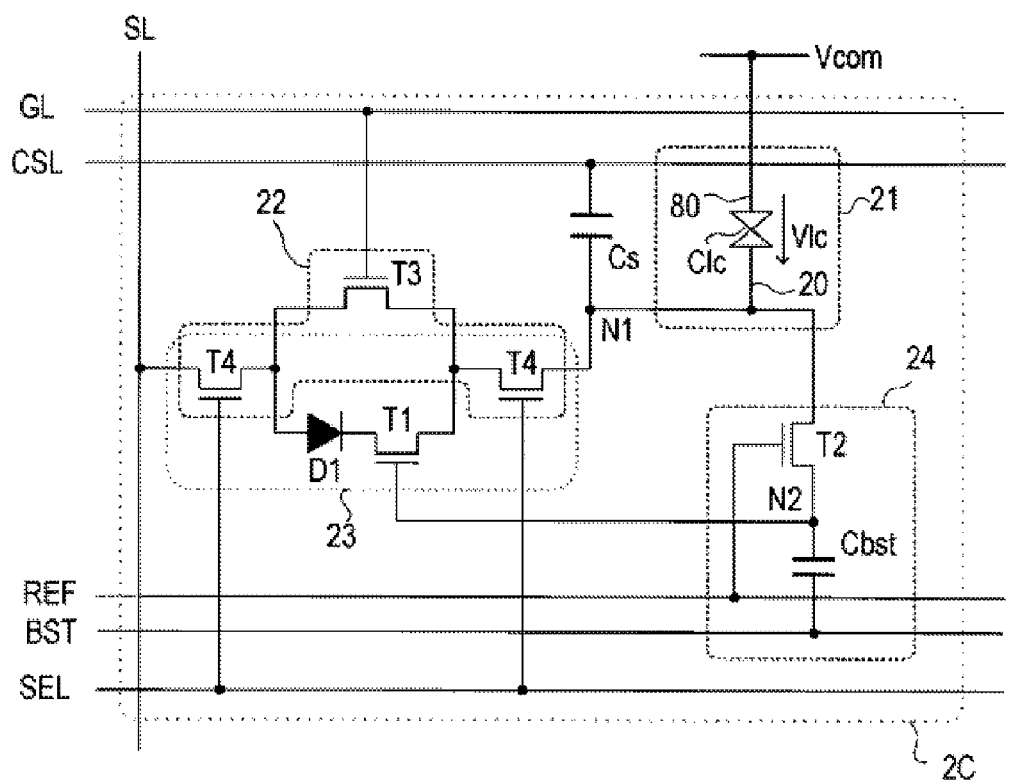
FIG. 14 is a circuit diagram showing a configuration example of the Type 2 circuit among the pixel circuits of the present invention.

In the pixel circuit 2C shown in FIG. 12, the first switching circuit 22 includes a series circuit of the transistor T3 and the transistor T4. By arranging the transistor T4 in a different position, a modification circuit shown in FIG. 13 is provided. A modification circuit shown in FIG. 14 is obtained by providing a plurality of transistors T4.

Figure 15:
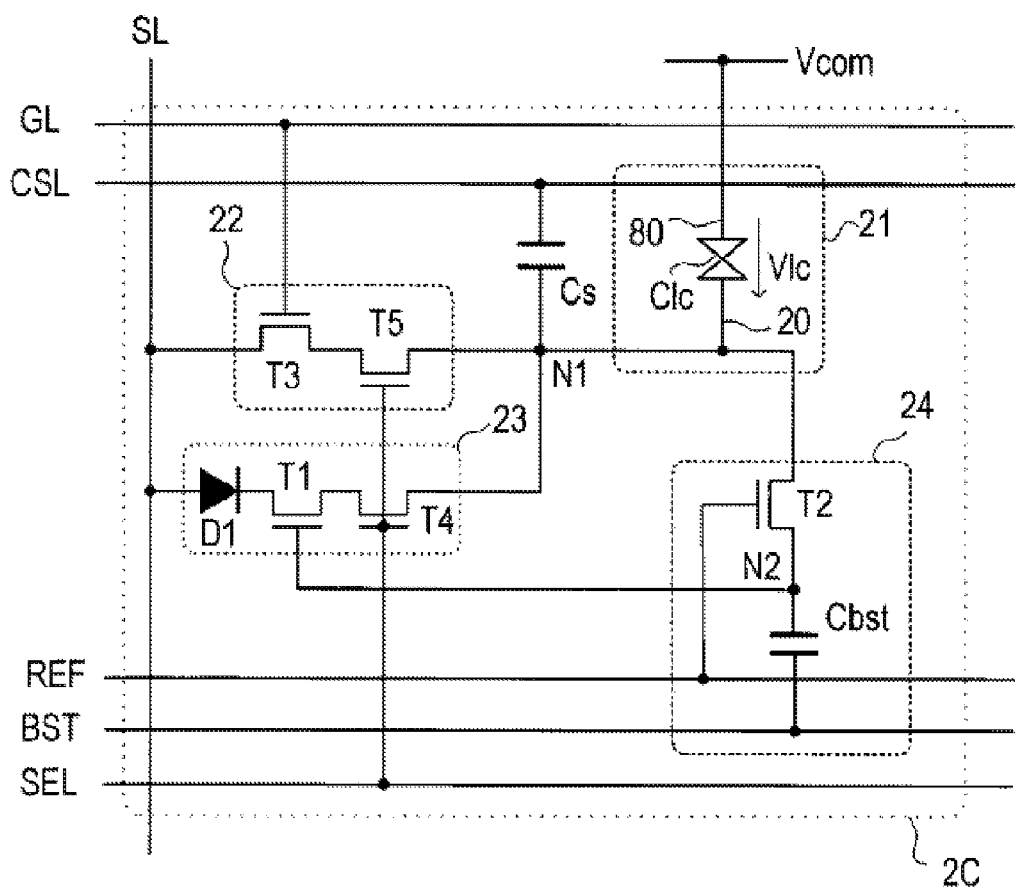
FIG. 15 is a circuit diagram showing a configuration example of the Type 2 circuit among the pixel circuits of the present invention.

Further, as shown in FIG. 15, the circuit can be modified to include a transistor T5 in the first switching circuit 22, instead of the transistor T4. The transistor T5 has the control terminal thereof connected to the control terminal of the transistor T4.

Type 3

Next, the Type 3 pixel circuit where the second switching circuit 23 includes a series circuit of the transistor T1, the diode D1, and the transistor T4, and the control terminal of the transistor T4 is connected to the boost line BST will be explained.

Figure 16:
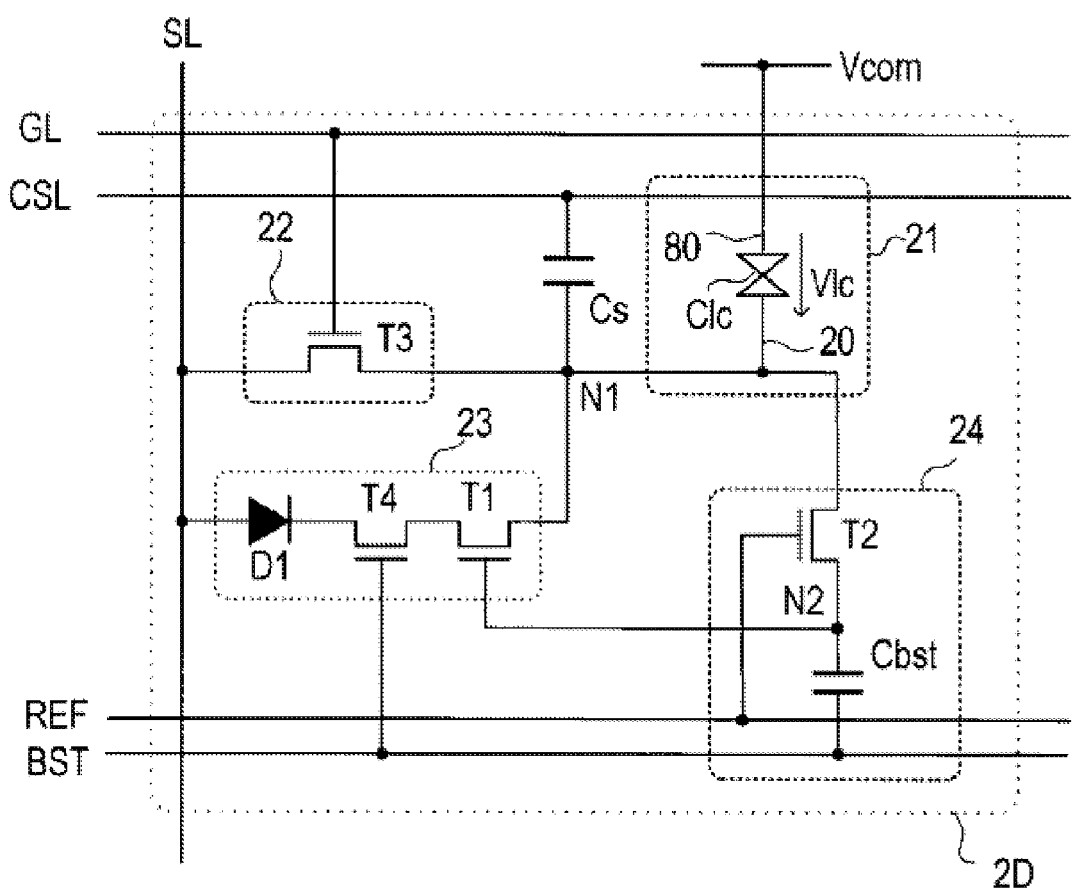
FIG. 16 is a circuit diagram showing a configuration example of a Type 3 circuit among the pixel circuits of the present invention.
Figure 17:
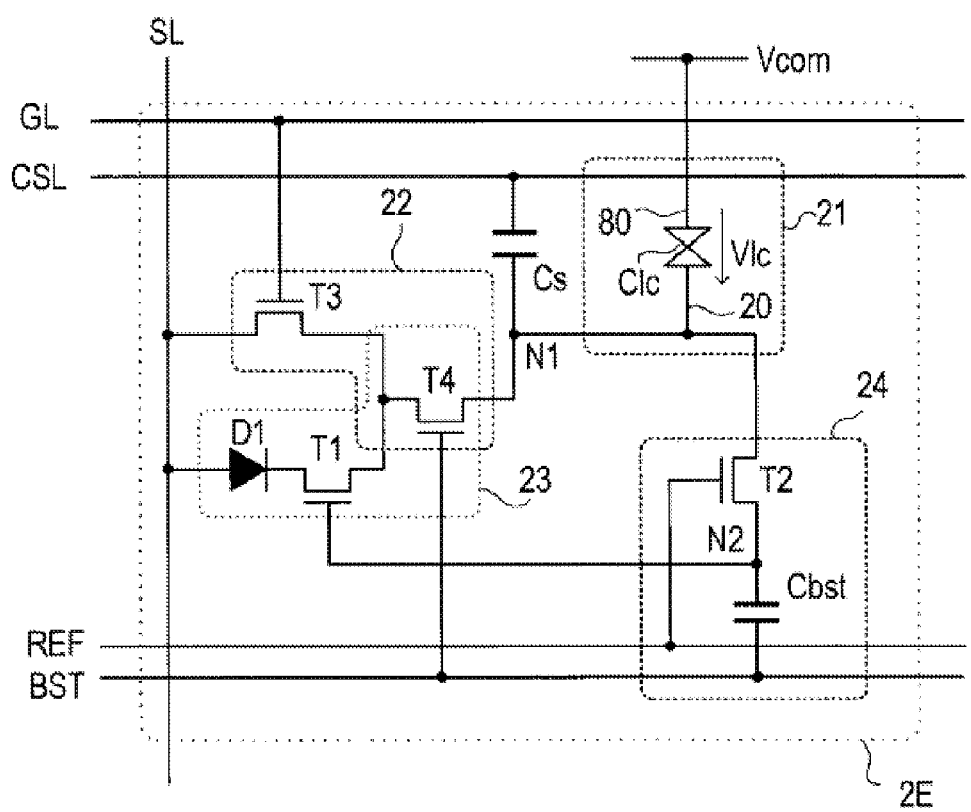
FIG. 17 is a circuit diagram showing a configuration example of the Type 3 circuit among the pixel circuits of the present invention.

The respective Type 3 pixel circuits are configured in a manner similar to the respective Type 2 pixel circuits, but in Type 3, the control terminal of the transistor T4 is connected to the boost line BST, and the select line SEL is not provided. Therefore, pixel circuits that respectively correspond to the pixel circuits 2B shown in FIGS. 9 to 11, and the pixel circuits 2C shown in FIGS. 12 to 15 can be provided. As examples, a pixel circuit 2D that corresponds to the pixel circuit 2B in FIG. 9 is shown in FIG. 16, and a pixel circuit 2E that corresponds to the pixel circuit 2C in FIG. 12 is shown in FIG. 17, respectively.

The above-mentioned pixel circuits of the respective types may also include a plurality of same transistor elements or diode elements that are connected in series, respectively.

Embodiment 2

In Embodiment 2, self-refresh operations by the respective pixel circuits of Types 1 to 3 above will be explained with reference to figures.

The self-refresh operation is performed for a plurality of pixel circuits 2 during the constant display mode by operating the first switching circuits 22, the second switching circuits 23, and the control circuits 24 in a prescribed sequence so as to restore the potential of the pixel electrodes 20 (which also is the potential of the internal nodes N1) to the potential of a gradation level that is written in the last writing operation. This operation is conducted for the pixel circuits of all of the gradation levels and separately for each target gradation level, and the pixel circuits having the same gradation level are restored at once "at the same time." The self-refresh operation that is conducted with the pixel circuits 2A to 2E above is unique to the present invention, and allows for significant reduction in power consumption as compared with the conventional "external refresh operation" that restores the potential of the pixel electrode 20 by performing the normal writing operation. The term "same time" used in "at the same time" above allows for a length of time during which a series of self-refresh operations are performed.

Conventionally, in the writing operation, an external polarity reversal operation for reversing only the polarity of the liquid crystal voltage Vcl applied between the pixel electrode 20 and the opposite electrode 80 without changing the absolute value thereof was performed. When this external polarity reversal operation is performed, the polarity is reversed, and the absolute value of the liquid crystal voltage Vcl is also updated to a state in the last writing operation. This means the polarity reversal and the refresh are performed at the same time, and thus it is unusual to perform the refresh operation alone to renew the absolute value of the liquid crystal voltage Vcl only without reversing the polarity in the writing operation. However, for ease of explanation, such a refresh operation is referred to as the "external refresh operation" below in order to make comparison with the self-refresh operation.

Even when the refresh operation is conducted by the external polarity reversal operation, the writing operation is still performed, and therefore, the self-refresh operation of this embodiment makes it possible to achieve the significant reduction in power consumption as compared with this conventional technique as well.

As described below, the self-refresh operation of this embodiment applies the same voltage setting to all of the pixel circuits. However, under this voltage setting, only the pixel circuits that have a voltage state of a specific gradation level at the internal nodes N1 are automatically selected, and the potential of those internal nodes N1 is actually restored (refreshed). That is, even though the voltage application is performed on all of the pixel circuits, upon the voltage application, the actual refresh of the potential of the internal nodes N1 is performed in some pixel circuits, but not in other pixel circuits.

Therefore, to avoid confusion caused by expressions, the term "self-refresh (operation)" and the term "refresh (operation)" below are used in different ways from each other on purpose. The former is used more broadly to indicate a series of operations for restoring the potential of the internal nodes N1 of the respective pixel circuits. On the other hand, the latter is used more narrowly to indicate an actual operation of restoring the potential of the pixel electrode (the potential of the internal node). That is, the "self-refresh operation" in this embodiment is configured to automatically and selectively "refresh" the internal nodes having a voltage state of a prescribed gradation level through the same voltage application to all of the pixel circuits, and by applying different voltages for respective target gradation levels to be "refreshed" in a similar manner, pixel circuits of all gradation levels are "refreshed." As described, the "self-refresh operation" in this embodiment is configured to perform the "refresh operation" for every gradation level, respectively.

The timing of the voltage application is configured to be the same for all of the gate lines GL, the source lines SL, the reference lines REF, the auxiliary capacitance lines CSL, the boost lines BST, and the opposite electrode 80 that is connected to the pixel circuits 2 that are to be self-refreshed. The voltage is also applied to the select lines SEL at the same timing in the Type 2 pixel circuit provided with the select lines SEL.

At the same point in time, all of the gate lines GL are applied with the same voltage, all of the reference lines REF are applied with the same voltage, all of the auxiliary capacitance lines CSL are applied with the same voltage, and all of the boost lines BST are applied with the same voltage. The timing control of these voltage applications is performed by the display control circuit 11 shown in FIG. 1, and the individual voltage applications are performed by the display control circuit 11, the opposite electrode driver circuit 12, the source driver 13, and the gate driver 14, respectively.

In the constant display mode of this embodiment, as described in Embodiment 1 above, the pixel data of the three gradation levels (three values) are held in the respective pixel circuits. In this case, potential VN1 held in the internal node N1 (that is, the potential of the pixel electrode 20) indicates one of three voltage states, which are first through third voltage states. In this embodiment, the first voltage state (high voltage state), the second voltage state (medium voltage state), and the third voltage state (low voltage state) are respectively set to 5V, 3V, and 0V, for example.

It is expected that, at a point immediately before the self-refresh operation is started, the first voltage state is written in the pixel electrodes 20 of some pixels, the second voltage state is written in the pixel electrodes 20 of other pixels, and the third voltage state is written in the pixel electrodes 20 of the rest of the pixels, respectively. However, according to the self-refresh operation of this embodiment, regardless of the voltage states written in the pixel electrodes 20, the refresh operation can be performed for all of the pixel circuits by conducting the voltage application process based on the same sequence. The details will be explained with reference to timing charts and circuit diagrams.

Hereinafter, the "case H" refers to a case where the voltage of the first voltage state (high level voltage) has been written by the last writing operation and that high level voltage needs to be restored, the "case M" refers to a case where the voltage of the second voltage state (medium level voltage) has been written by the last writing operation and that medium level voltage needs to be restored, and the "case L" refers to a case where the voltage of the third voltage state (low level voltage) has been written by the last writing operation and that low level voltage needs to be restored.

As described in Embodiment 1 above, the threshold voltage of each of the transistors is set to 2V, and the turn-on voltage of the diode D1 is set to 0.6V.

Type 1

First, the self-refresh operation of the Type 1 pixel circuit 2A where the second switching circuit 23 includes the series circuit of the transistor T1 and the diode D1 only will be explained. Here, the pixel circuit 2A shown in FIG. 7 is used as an example.

Figure 18:
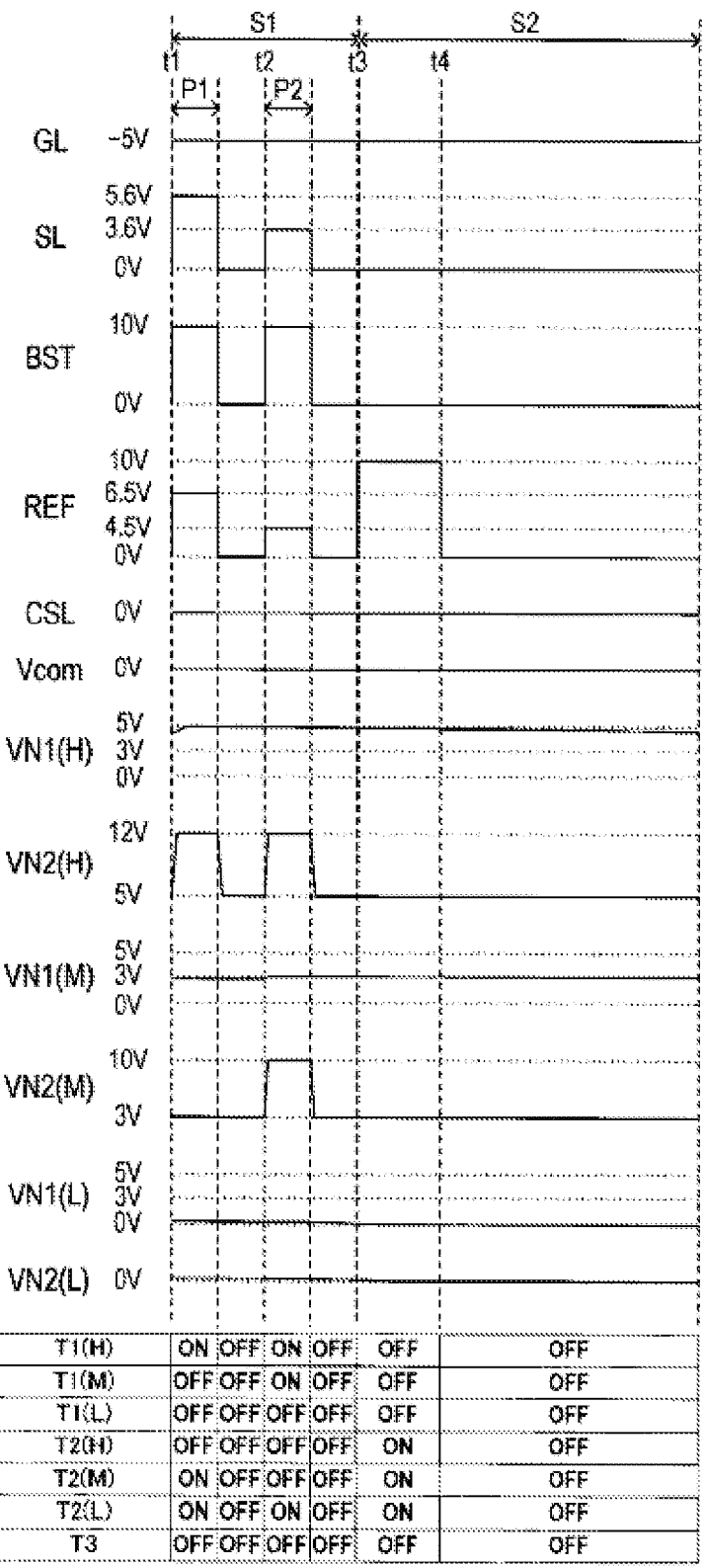
FIG. 18 is a timing chart of a self-refresh operation according to Embodiment 2 with the pixel circuits of Type 1 and Type 3.

In FIG. 18, a timing chart of the self-refresh operation of Type 1 is shown. As shown in FIG. 18, the self-refresh operation is divided into two steps S1 and S2, and the step S1 further includes two phases P1 and P2. FIG. 18 shows respective voltage waveforms of all of the gate lines GL, the source lines SL, the boost lines BST, the reference lines REF, and the auxiliary capacitance lines CSL connected to the pixel circuits 2A, which are the target of the self-refresh operation. A voltage waveform of the opposite voltage Vcom is also shown. In this embodiment, the self-refresh operation is being performed for all of the pixel circuits in the pixel circuit array.

Further, FIG. 18 shows waveforms that indicate changes in the potential (pixel voltage) VN1 of the internal node N1, the potential VN2 of the output node N2, and on-off states of the transistors T1 to T3 in the respective steps and the respective phases for the respective cases H, M, and L. Reference characters in the parentheses in FIG. 18 indicate the respective cases. VN1 (H) is a waveform that indicates a change in the potential VN1 in the case H, for example.

Prior to a time (t1) when the self-refresh operation is started, the high level voltage was written to pixels of the case H, the medium level voltage was written to pixels of the case M, and the low level voltage was written to pixels of the case L.

After the writing operation was performed, the potential VN1 of the internal node N1 is eventually changed due to leakage current generated in the respective transistors in the pixel circuit. In the case H, VN1 was 5V immediately after the writing operation, but the voltage value of VN1 decreases over time from the initial state. Similarly, in the case M, VN1 was 3V immediately after the writing operation, but this voltage value decreases over time from the initial state. As described, in the case H and the case M, the potential of the internal node N1 is gradually decreased with time, and this is mainly due to the leakage current flowing toward lower potential (grounding line, for example) through off-state transistors.

In the case L, the potential VN1, which was 0V immediately after the writing operation, may slightly increase over the course of time. This is because, even in a non-selected pixel circuit, owing to the writing voltage applied the source lines SL in the writing operation for other pixel circuits, for example, the leakage current may flow toward the internal node N1 from the source line SL through an off-state transistor.

Taking into account the above-mentioned potential changes, FIG. 18 describes VN1 (H) being slightly lower than 5V, VN1 (M) being slightly lower than 3V, and VN1 (L) being slightly higher than 0V at the time t1.

The self-refresh operation of this embodiment can be broadly divided into two steps S1 and S2. The step S1 corresponds to a "refresh step," and the step S2 corresponds to a "stand-by step."

In the step S1, the refresh operations for the case H and the case M are directly performed by applying a pulse voltage. On the other hand, in the step S2, the refresh operation for the case L is indirectly performed by applying a prescribed voltage for a longer period of time than the step S1 (ten times or longer). "Directly performed" means establishing electrical continuity between the internal node N1 and the source line SL through the second switching circuit 23, thereby providing the voltage applied to the source line SL to the internal node N1 and setting the potential VN1 of the internal node to a target value. "Indirectly performed" means making the potential VN1 of the internal node N1 closer to a target value by utilizing a small leakage current flowing from the internal node N1 to the source line SL through the first switching circuit 22 in a non-conducting state, instead of establishing electrical continuity between the internal node N1 and the source line SL through the second switching circuit 23.

In the step S1, the respective phases P1 and P2 differ from each other in that the case H is refreshed in one of the two phases and the case M is refreshed in the other. In FIG. 18, only the internal nodes N1 of the case H (high-voltage is written) are refreshed in the phase P1, and only the internal nodes N1 of the case M (medium-voltage is written) are refreshed in the phase P2. The details of this operation will be explained below.

Step S1/Phase P1

In the phase P1 that is started from the time t1, the gate line GL is provided with a voltage that turns the transistor T3 completely off, which is set to −5V in this case. This keeps the transistor T3 off while the self-refresh operation is performed, allowing the voltage applied to the gate line GL to stay constant during the self-refresh operation.

The opposite voltage Vcom to be applied to the opposite electrode 80, and a voltage to be applied to the auxiliary capacitance line CSL are set to 0V. These voltages are not limited to 0V, and may be the same voltage values as those prior to the time t1. These voltages may also be constant during the self-refresh operation.

At the time t1, the source line SL is provided with a voltage obtained by adding a turn-on voltage Vdn of the diode D1 to a target voltage of the internal node N1 that is to be restored by the refresh operation. In the phase P1, the refresh target is the case H, and therefore, the target voltage of the internal node N1 is 5V. Thus, when the turn-on voltage Vdn of the diode D1 is 0.6V, 5.6V is applied to the source line SL.

The target voltage of the internal node N1 corresponds to a "refresh target voltage." The turn-on voltage Vdn of the diode D1 corresponds to a "first adjusting voltage." The actual voltage that is applied to the source line SL in the refresh step S1 corresponds to a "refresh input voltage." In the phase P1, this refresh input voltage is 5.6V.

At the time t1, the reference line REF is provided with a voltage that turns the transistor T2 off when the internal node N1 is in a voltage state (gradation level) of the refresh target or higher (higher gradation level) and that turns the transistor T2 on when the internal node N1 is in a voltage state (lower gradation level) lower than the voltage state (gradation level) of the refresh target. In the phase P1, the refresh target is the case H (first voltage state), and because a voltage state that is higher than that does not exist, a voltage applied to the reference line REF is set so as to turn the transistor T2 off only when the internal node N1 is in the first voltage state (case H), and to turn the transistor T2 on when the internal node N1 is in the second voltage state (case M) or the third voltage state (case L).

More specifically, because a threshold voltage Vt2 of the transistor T2 is 2V, when a voltage that exceeds 5V is applied to the reference line REF, the transistor T2 can be turned on in the case M. On the other hand, if a voltage applied to the reference line REF exceeds 7V, it even turns on the transistor T2 in the case H, which is the target in the phase P1. Therefore, a voltage applied to the reference line REF needs to be greater than 5V and no more than 7V.

It is presumed that, at a point before the self-refresh operation is performed, the potential of the internal node N1 has become lower than a voltage state written by the last writing operation by a certain level because of the above-mentioned occurrence of leakage current or the like. That is, the potential VN1 of the internal node N1 corresponding to the case M may have been lowered to about 2.5V at the point in time before the self-refresh operation is performed. In such a case, if the voltage of about 5.1V is applied to the reference line REF, the transistor T2 may be turned off even in the case M, depending on the size of the voltage decrease in the internal node N1. For this reason, the voltage is set to 6.5V so as to allow a certain degree of a margin.

When 6.5V is applied to the reference line REF, in the pixel circuit with the potential VN1 of the internal node N1 being 4.5V or higher, the transistor T2 is turned off. On the other hand, in the pixel circuit with VN1 being lower than 4.5V, the transistor T2 is turned on. In the internal node N1 of the case H written to 5V by the last writing operation, if the self-refresh operation is performed before the voltage is decreased by 0.5V or greater due to the occurrence of the leakage current, VN1 becomes 4.5V or greater, and therefore, the transistor T2 is turned off. On the other hand, in the internal node N1 in the case M that was written to 3V by the last writing operation, and in the internal node N1 in the case L that was written to 0V, VN1 does not reach or exceed 4.5V even when time has passed, and therefore, in those cases, the transistors T2 are turned on.

As described, a value obtained by subtracting the threshold voltage Vt2 of the transistor T2 from the voltage Vref applied to the reference line REF needs to be a value intermediate between the internal node potential VN1 in the case H that is the target of the refresh operation in this phase and the internal node potential VN1 of the case M that is a voltage state one level lower than the case H. In other words, in this phase P1, a value of the voltage Vref applied to the reference line REF needs to be set so as to satisfy a condition of 3V<(Vref−Vt2)< 5V. The voltage represented by "Vref−Vt2" corresponds to a "refresh isolation voltage." Vt2 corresponds to a "second adjusting voltage," and Vref corresponds to a "refresh reference voltage." When the above-mentioned condition is described by using these terms, the "refresh reference voltage" that is to be applied to the reference line REF in the phase P1 corresponds to a voltage value obtained by adding the "second adjusting voltage," which corresponds to the threshold voltage of the transistor T2, to the "refresh isolation voltage" that is defined by a voltage intermediate between the voltage state (gradation level) that is the target of the refresh operation and the voltage state (gradation level) that is one level lower than that.

The boost line BST is provided with a voltage within a range that turns on the transistor T1 in the case H where the transistor T2 was turned off in the manner described above and that turns off the transistor T1 in the cases M and L where the transistors T2 were turned on.

The boost line BST is connected to one end of the boost capacitance element Cbst. Therefore, when a high-level voltage is applied to the boost line BST, the potential of the other end of the boost capacitance element Cbst, which is the potential of the output node N2, is increased. As described, increasing the voltage that is applied to the boost line BST so as to boost the potential of the output node N2 is referred to as "boosting" below.

In the case H, the transistor T2 remains off during the phase P1 as described above. Therefore, the size of the potential change in the node N2 caused by the boosting is determined by the ratio of the boost capacitance Cbst to the total parasitic capacitance of the node N2. When this ratio is 0.7, for example, if one electrode of the boost capacitance element is increased by ΔVbst, the other electrode, which is the node N2, is increased by about 0.7 ΔVbst only.

In the case H, the potential VN1 (H) of the internal node N1 is about 5V at the time t1. When potential that is higher than VN1(H) by the threshold voltage of 2V or greater is applied to the gate of the transistor T1, which is the output node N2, the transistor T1 is turned on. In this embodiment, the voltage applied to the boost line BST at the time t1 is set to 10V, which increases the output node N2 by 7V. As described in Embodiment 4 below, in the writing operation, the transistor T2 is turned on, and therefore, at a point in time immediately before the time t1, the node N2 is at substantially the same potential (5V) as that of the node N1. This means that by boosting, the node N2 increases to about 12V. This way, the potential difference between the gate of the transistor T1 and the node N1 becomes at least the threshold voltage, thereby turning the transistor T1 on.

On the other hand, the case M or the case L where the transistor T2 is turned on in the phase P1 differs from the case H in that the output node N2 and the internal node N1 are electrically connected. In this case, the size of potential change of the output node N2 caused by the boosting is affected by not only the boost capacitance Cbst and the total parasitic capacitance of the node N2, but also the total parasitic capacitance of the internal node N1.

As described above, the internal node N1 is connected to one end of the auxiliary capacitance element Cs and one end of the liquid crystal capacitance element Clc, and the total capacitance Cp at this internal node N1 can be approximately represented by the sum of the liquid crystal capacitance Clc and the auxiliary capacitance Cs. A value of the boost capacitance Cbst is significantly smaller than that of the total capacitance Cp. Therefore, the ratio of the boost capacitance to the total capacitance becomes very small, which is about 0.01 or smaller, for example. In this case, when one electrode of the boost capacitance element is increased by ΔVbst, the other electrode, which is the output node N2, is increased only by about 0.01 ΔVbst at most. That is, in the case M and the case L, even when ΔVbst is set to be 10V, the potential VN2(M) and the potential VN2(L) of the output nodes N2 show little increase.

In the case M, the potential VN2 (M) is about 3V at a point immediately before the time t1. In the case L, the potential VN2 (L) is about 0V at a point immediately before the time t1. Therefore, in both cases, even when the boosting is performed at the time t1, the gate of the transistor T1 is not provided with potential that is large enough to turn the transistor on. That is, unlike the case H, the transistor T1 remains off.

The potential of the output node N2 immediately before the time t1 in the case M and in the case L is not limited to 3V and 0V, respectively, and the potential may be in any voltage levels as long as the transistor T1 is not turned on even when the small potential change is caused by the pulse voltage applied to the boost line BST. Similarly, in the case H, the potential of the node N1 immediately before the time t1 is not limited to 5V, and the potential may be in any voltage level as long as the transistor T1 is turned on when the potential change occurs by performing the boosting with the transistor T2 being in the off state.

In the case H, the transistor T1 is turned on by the boosting. Because 5.6V is applied to the source line SL, if the potential VN1(H) of the internal node N1 is slightly lowered from 5V, the potential difference that is equal to or greater than the turn-on voltage Vdn of the diode D1 has been generated between the source line SL and the internal node N1. This turns the diode D1 on in the direction from the source line SL toward the internal node N1, and the current flows from the source line SL toward the internal node N1, causing the potential VN1(H) of the internal node N1 to increase. This potential increase continues until the potential difference between the source line SL and the internal node N1 becomes equal to the turn-on voltage Vdn of the diode D1, and stops when the potential difference reaches Vdn. Because the voltage applied to the source line SL is 5.6V, and the turn-on voltage Vdn of the diode D1 is 0.6V, the increase in potential VN1(H) of the internal node N1 stops when it reaches 5V. This way, the refresh operation in the case H is performed.

In both cases M and L, because the transistor T1 is turned off as described above, electrical continuity between the source line SL and the internal node N1 is not established, and therefore, the potential VN1(M) or the potential VN1(L) of the internal node N1 is not affected by the voltage applied to the source line SL.

That is, the refresh operation is performed for the pixel circuits with the potential of the internal nodes N1 being at least the refresh isolation voltage, but no more than the refresh target voltage. In the phase P1, because the refresh isolation voltage was set to 4.5V (=6.5−2V), and the refresh target voltage was set to 5V, the operation of refreshing the potential VN1 to 5V is performed only for the pixel circuits with the potential VN1 of the internal nodes N1 being at least 4.5V, but no more than 5V, that is, the case H only.

When the phase P1 is completed, the voltage application to the respective lines of the source line SL, the boost line BST, and the reference line REF is stopped. Thereafter, the subsequent phase P2 is started from a time t2.

Step S1/Phase P2

In the phase P2 starting from the time t2, the refresh target is the case M (nodes written to the medium voltage).

Specifically, 3.6V is applied to the source line SL as the refresh input voltage. This 3.6V is a value obtained by adding the turn-on voltage Vdn of the diode D1 to the refresh target voltage (3V) of the internal node N1 in the phase P2.

The reference line REF is provided with a voltage that turns the transistor T2 off when the internal node N1 is in a voltage state (case M) of the refresh target or a higher voltage state (case H) and that turns the transistor T2 on when the internal node N1 is in a voltage state (case L) that is lower than the refresh target voltage state (case M). In the manner similar to the phase P1, by applying a voltage that exceeds 2V to the reference line REF, the transistor T2 in the case L can be turned on. On the other hand, if a voltage that exceeds 5V is applied to the reference line REF, even the transistor T2 in the case M is turned on. Therefore, technically, a voltage intermediate between 2V and 5V may be applied to the reference line REF. However, in the manner similar to the phase P1, it is necessary to apply a voltage with a certain degree of a margin, and therefore, 4.5V is applied in this case, for example. This 4.5V corresponds to the refresh reference voltage in the phase P2, and 2.5V, which is a value obtained by subtracting the threshold voltage of the transistor T2, corresponds to the refresh isolation voltage.

If the potential VN1 of the internal node N1 is at least 2.5V that is the refresh isolation voltage, the transistor T2 is turned off. On the other hand, in the pixel circuits with VN1 being smaller than 2.5V, the transistors T2 are turned on. That is, in the case H written to 5V by the last writing operation, or in the case M written to 3V, VN1 becomes at least 2.5V, and therefore, the transistor T2 is turned off in either case. On the other hand, in the case L written to 0V by the last writing operation, VN1 becomes smaller than 2.5V, and therefore, the transistor T2 is turned on.

The boost line BST is provided with a voltage within a range that turns on the transistor T1 in the cases H and M where the transistor T2 is turned off and that turns off the transistor T1 in the case L where the transistor T2 is turned on. The voltage is set to be 10V in the same manner as the phase P1. In the cases H and M, the potential of the output nodes N2 is increased by the boosting, and therefore, the transistors T1 are turned on. On the other hand, in the case L, even with the boosting, the potential VN2(L) of the output node N2 is not changed almost at all, and therefore, the transistor T1 is not turned on. Because this principle is the same as that in the phase P1, the detailed explanation will be omitted.

In the case H, the transistor T1 is turned on by the boosting. However, the source line SL is provided with 3.6V, and even though the potential VN1(H) of the internal node N1 has been slightly decreased from 5V, the decrease amount is less than 1V. This creates the reverse bias state from the source line SL toward the internal node N1, and therefore, owing to the rectifying function of the diode D1, electrical continuity between the source line SL and the internal node N1 is not established. That is, the potential VN1(H) of the internal node N1 is not affected by the voltage applied to the source line SL.

In the case M, the transistor T1 is turned on by the boosting. Because 3.6V is applied to the source line SL, if the potential VN1(M) of the internal node N1 is decreased slightly from 3V, the potential difference that is equal to or greater than the turn-on voltage Vdn of the diode D1 has been generated between the source line SL and the internal node N1. This turns the diode D1 on in the direction from the source line SL toward the internal node N1, thereby allowing current to flow from the source line SL toward the internal node N1. As a result, the potential VN1(M) of the internal node N1 increases until the potential difference between the source line SL and the internal node N1 becomes equal to the turn-on voltage Vdn (=0.6V). That is, VN1(M) is increased to 3V, and thereafter maintains the potential. This way, the refresh operation for the case M is performed.

In the case L, the transistor T1 is in the off state as described above, and therefore, electrical continuity between the source line SL and the internal node N1 is not established. Thus, the voltage applied to the source line SL does not affect the potential VN1(L) of the internal node N1.

That is, in the phase P2, the refresh isolation voltage was set to 2.5V (=4.5V−2V), and the refresh target voltage was set to 3V, and therefore, the operation of refreshing the potential VN1 to 3V is performed only for the pixel circuits with the potential VN1 of the internal nodes N1 being at least 2.5V, but no more than 3V, that is, the case M only.

When the phase P2 is completed, the voltage application to the respective lines of the source line SL, the boost line BST, and the reference line REF is stopped, and a stand-by step S2 is started.

Step S2

In the step S2 starting from a time t3, the reference line REF is provided with a voltage that always turns on the transistor T2 regardless of the potential VN1 of the internal node N1. The voltage is set to 10V here. Other signal lines maintain the same voltage states as those at the end of the phase P2.

When such voltage states are provided, in all of the cases H, M, and L, the transistors T2 become on, and the transistors T1 become off. Because the gate lines GL are still receiving the low level voltage, the transistors T3 remain off. Thus, the potential VN1 of the internal nodes N1 remains the same as that immediately after the end of the refresh step S1. Also, because the electrical continuity is established between the output node N2 and the internal node N1, VN2 becomes equal to VN1.

Thereafter, at a time t4, the voltage applied to the reference lines REF is changed to a lower level (0V), thereby turning the transistors T2 off.

In this step S2, the same voltage states are maintained for a sufficiently longer period of time as compared to the step S1. During this time, the source lines SL are provided with 0V, and therefore, leakage current occurs in the direction from the internal node N1 toward the source line SL through the transistor T3 in the off state. Therefore, even if VN1(L) is slightly higher than 0V at the time t1 for the reason described above, VN1(L) is gradually decreased to 0V during this stand-by step S2. As a result, the refresh operation for the case L is "indirectly" performed.

However, this leakage current occurs in not only the case L, but also the case H and the case M. Therefore, after being refreshed to 5V and 3V, respectively, at a point in time immediately after the step S1, VN1 of the case H and VN1 of the case M are gradually decreased in the step S2. Thus, it is desirable to repeat the refresh operation for the respective cases H and M by conducting the refresh step S1 again after the voltage states of the stand-by step S2 have been maintained for a certain period of time.

As described above, by repeating the refresh steps S1 and the stand-by steps S2, the potential VN1 of the internal nodes N1 in the respective cases H, M, and L can be restored to the respective states of the last writing operation.

When the refresh operation is performed for the respective pixel circuits in the conventional manner by conducting a so-called "writing operation" through the source line SL, it is necessary to scan every gate line GL one by one in the vertical direction. Therefore, the high level voltage application to the gate lines GL needs to be repeated for the number of the gate lines (n). Also, the same potential level as the potential level that was written by the last writing operation needs to be applied to each of the source lines SL, and therefore, the charging and discharging operations need to be repeated "n" number of times at maximum for each source line SL.

In contrast, according to this embodiment, the potential of the internal node N1, which is the voltage of the pixel electrode 20, in every pixel circuit can be restored to the potential state established by the writing operation, regardless of the voltage state of each internal node N1, only by applying the pulse voltage twice during the refresh step S1 and by maintaining a prescribed voltage state in the stand-by step that follows. This allows for a significant reduction in the number of times the voltage applied to the respective lines needs to be changed in order to restore the potential of the pixel electrode 20 in each pixel in one frame period, and further, the control operation can be simplified. As a result, the power consumption of the gate driver 14 and the source driver 13 can be significantly reduced.

The above-mentioned self-refresh operation that has been described with reference to FIG. 18 was based on the pixel circuit 2A in FIG. 7, but it is apparent that the self-refresh operation can be performed in the exactly same manner for the modified pixel circuit shown in FIG. 8.

When a plurality of diodes D1 are provided in the second switching circuit 23, in order to establish electrical continuity between the source line SL and the internal node N1, the potential difference between the source line SL and the internal node N1 needs to be equal to or greater than a value obtained by multiplying the turn-on voltage Vdn by the number of the diodes D1 in the second switching circuit 23. Therefore, when the second switching circuit 23 is provided with two diodes D1, for example, the refresh input voltage that is applied to the source line SL must be as large as a sum of the refresh target voltage of each case and the first adjusting voltage having a value twice as large as the turn-on voltage Vdn. Except for this point, the self-refresh operation can be performed in the same manner as FIG. 18.

Instead of the voltage application method shown in FIG. 18, the following methods can also be employed.

(1) In the phase P1 in FIG. 18, the refresh operation for the case H was performed first, and thereafter the refresh operation for the case M was performed, but this order can be reversed.

The order of the step S1 and the step S2 is not significant because the steps S1 and S2 are repeatedly conducted.

(2) In both phases P1 and P2, 10V was applied to the boost line BST. However, the voltage in the phase P1 needs to be large enough to turn on the transistor T1 of the case H, and the voltage in the phase P2 needs to be large enough to turn on the transistor T1 of the case M. In the phase P2, because the voltage that is applied to the source line SL is 3.6V, and the threshold voltage of the transistor T3 is 2V, the voltage applied to the boost line BST needs to be at least 5.6V without taking account into the turn-on voltage Vdn of the diode D1, and therefore, as long as the transistor T1 in the case M is turned on, the voltage applied to the boost line BST in the phase P2 can be made smaller than that of the phase P1.

(3) In the stand-by step S2, the high level voltage (10V) was applied to the reference line REF for the period from the time t3 to the time t4. This voltage is applied so as to make the potential VN2 of the output node N2 equal to the potential VN1 of the internal node N1. Therefore, the high level voltage can be applied to the reference line REF at any point during the step S2.

Figure 19:
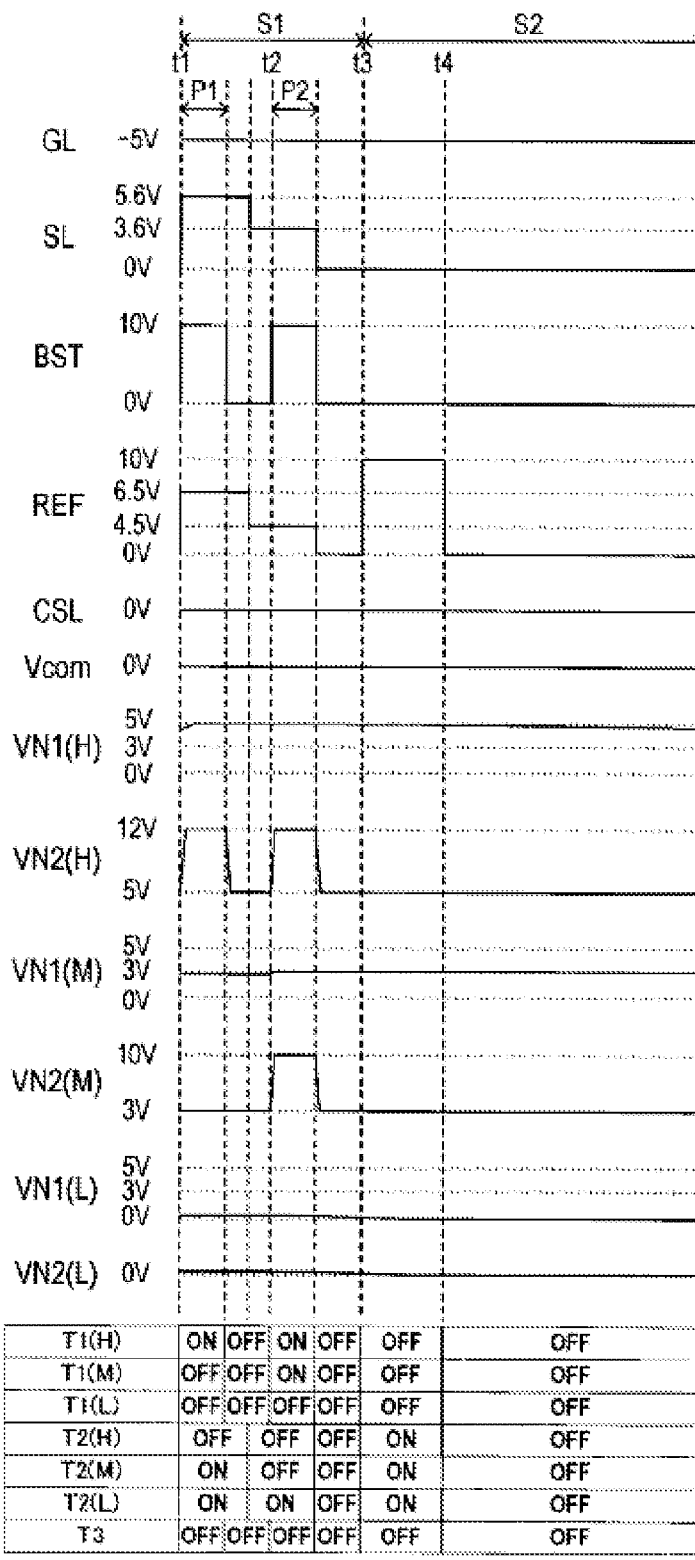
FIG. 19 is another timing chart of the self-refresh operation according to Embodiment 2 with the pixel circuits of Type 1 and Type 3.

(4) In FIG. 18, after the refresh operation of the phase P1 is completed in the refresh step S1, the source line SL and the reference line REF are lowered to the low level (0V) before the start of the refresh operation of the phase P2. However, the voltages applied to these lines are not necessarily required to be reduced to the low level. As shown in FIG. 19, for example, between the phases P1 and P2, that is, while the level of the boost line BST is reduced to the low level (0V), the source line SL and the reference line REF may also be set to the same values as those to be applied in the phase P2. This configuration makes it possible to reduce the size of the change in the voltages applied to the source line SL and the reference line REF as compared with the case of FIG. 18.

Figure 20:
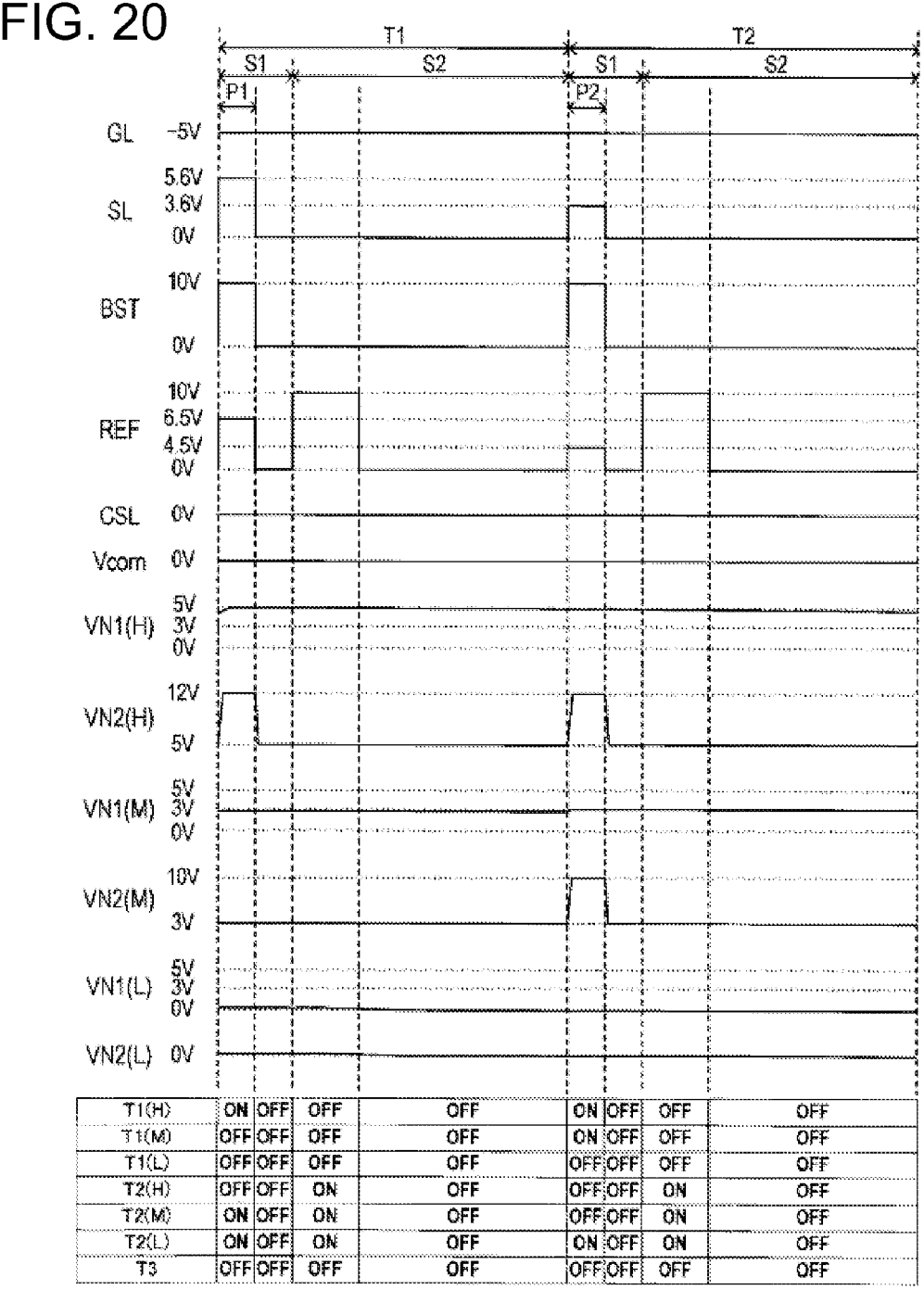
FIG. 20 is another timing chart of the self-refresh operation according to Embodiment 2 with the pixel circuits of Type 1 and Type 3.

(5) The embodiments above were configured to repeat the refresh step S1 for the cases H and M and the subsequent stand-by step S2 as a series of self-refresh operations. In contrast, the self-refresh operation may also be configured such that, in the refresh step S1 in one term, the refresh operation is performed for a prescribed gradation level, which is followed by the stand-by step S2, and thereafter, in the refresh step S1 in the subsequent term, the refresh operation is performed for another gradation level (see FIG. 20). In FIG. 20, the refresh operation is performed for the nodes N1 of the case H (P1) during the refresh step S1 in a term T1, and after the stand-by step S2, the refresh operation for the nodes N1 of the case M is performed (P2) during the refresh step S1 in a subsequent term T2. As described, the target gradation level for the refresh operation may be changed for every term.

Type 2

Next, the pixel circuit of Type 2 where the second switching circuit 23 includes a series circuit of the transistor T1, the diode D1, and the transistor T4, and the control terminal of the transistor T4 is connected to the select line SEL will be explained.

First, a case where the self-refresh operation is performed for the Type 2 pixel circuit 2B shown in FIG. 9 will be explained. This circuit differs from the pixel circuit 2A shown in FIG. 7 in that the conducting state of the second switching circuit 23 is controlled by not only the transistor T1 and the diode D1, but also the transistor T4.

As described in Type 1, electrical continuity between the source line SL and the internal node N1 is established through the second switching circuit 23 only during the refresh step S1. In each refresh step S1, the conducting state of the second switching circuit 23 was controlled by the diode D1 and the transistor T1 so that it is turned on only for the target case of the refresh operation. In the other cases, the second switching circuit 23 was turned off by the diode D1 being reverse-biased or by the transistor T1 being off. This scheme remains the same in Type 2.

Figure 21:
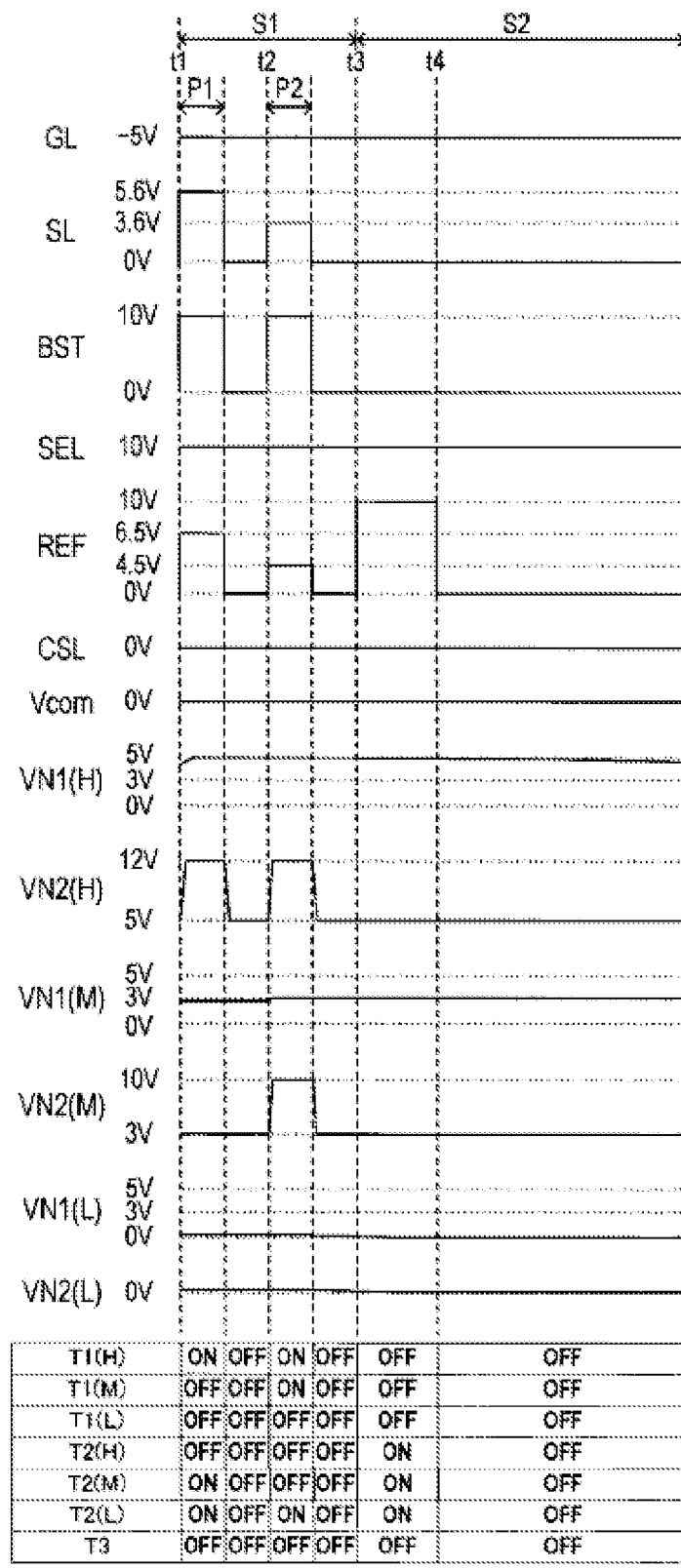
FIG. 21 is a timing chart of a self-refresh operation according to Embodiment 2 with the Type 2 pixel circuit.

The Type 2 is provided with the transistor T4, and in order to control the conducting state of this transistor T4, the select line SEL is also provided in addition to the boost line BST. Therefore, by applying a voltage to the select line SEL so as to keep the transistor T4 on during the refresh step S1, the exactly same voltage state as that of Type 1 can be achieved. A timing chart of this configuration is shown in FIG. 21. In this case, the voltage applied to the select line SEL was set to 10V.

Figure 22:
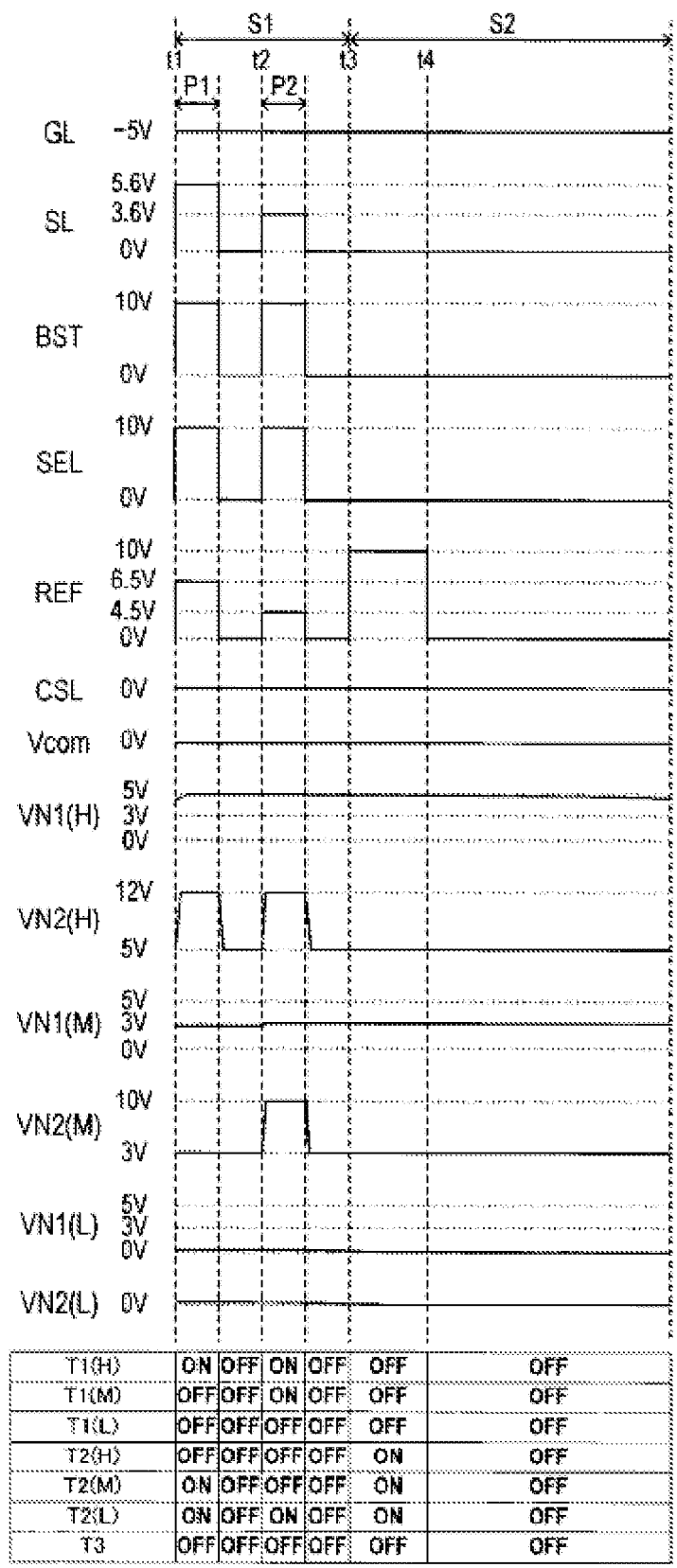
FIG. 22 is another timing chart of the self-refresh operation according to Embodiment 2 with the Type 2 pixel circuit.

It is also possible to apply a pulse voltage to the select line SEL at the same timing as the application of the boost voltage to the boost line BST. A timing chart of this configuration is shown in FIG. 22.

It is apparent that the description above can also be applied to the pixel circuits 2B shown in FIGS. 10 and 11 and the pixel circuits 2C shown in FIGS. 12 to 15, and therefore, the explanations thereof are omitted.

Type 3

Next, the Type 3 pixel circuit where the second switching circuit 23 includes a series circuit of the transistor T1, the diode D1, and the transistor T4, and the control terminal of the transistor T4 is connected to the boost line BST will be explained.

The respective pixel circuits of Type 3 differ from the respective pixel circuits of Type 2 in that the control terminal of the transistor T4 is connected to the boost line BST, and the select line SEL is not provided. Therefore, unlike the Type 2 pixel circuits, the conducting state of the transistor T4 is controlled by the boost line BST.

However, as shown in FIG. 22, the select line SEL in Type 2 can be provided with pulsed voltages having the same timing as the boost line BST to achieve the exactly same voltage states as those of respective pixel circuits in Type 1. This means that the exactly same voltage state can be achieved even with the configuration where the control terminal of the transistor T4 is connected to the boost line BST.

Thus, by adopting the same voltage state as that in FIG. 18, the self-refresh operation can be performed for the pixel circuit 2D of FIG. 16. This also applies to the pixel circuit 2E in FIG. 17. The detailed explanations will be omitted.

Embodiment 3

In Embodiment 3, a case where the self-refresh operation is performed by a voltage application method that is different from Embodiment 2 will be explained with reference to figures. The self-refresh operation of this embodiment is divided into the refresh step S1 and the stand-by step S2 in a manner similar to Embodiment 2.

Embodiment 2 was configured to refresh only the internal node N1 of the case H (written to high voltage) in the phase P1, and to refresh only the internal node N1 of the case M (written to medium voltage) in the phase P2, and the pulse voltage needed to be applied to the boost line BST in both phases P1 and P2, respectively, during the step S1.

In contrast, this embodiment is configured to refresh only the internal node N1 of the case M (written to medium voltage) in the phase P1, and to refresh only the internal node N1 of the case H (written to high voltage) in the phase P2 as described below. In the step S1, the high level voltage is applied to the boost line BST over the course of the phase P1 and the phase P2. This makes it possible to reduce the number of times the voltage applied to the boost line BST needs to be changed in the step S1, and as a result, the power consumption in the self-refresh operation can be reduced. Below, this operation will be explained in detail.

Type 1

A self-refresh operation of this embodiment for the Type 1 pixel circuit 2A will be explained with reference to a timing chart in FIG. 23. As in Embodiment 2, the pixel circuit 2A described below is the pixel circuit 2A shown in FIG. 7.

Step S1/Phase P1

In the phase P1, the refresh target is the writing nodes N1 (M) in the case M (medium voltage state).

In the step S1 starting at the time t1, the gate line GL is provided with a voltage that turns the transistor T3 into a complete off state, which is set to −5V here. Because the transistor T3 remains off throughout the self-refresh operation, it is not necessary to change the voltage applied to the gate line GL during the self-refresh operation.

The opposite voltage Vcom that is applied to the opposite electrode 80 and a voltage that is applied to the auxiliary capacitance line CSL are set to 0V. However, they are not limited to 0V, and may also be the same voltage values as those prior to the time t1. These voltages may stay constant during the self-refresh operation as well.

At the time t1, the reference line REF is provided with a voltage that turns the transistor T2 off when the internal node N1 is in a voltage state (gradation level) of the refresh target or a higher voltage state (high gradation level) and that turns the transistor T2 on when the internal node N1 is in a voltage state (low gradation level) that is lower than the voltage state (gradation level) of the refresh target. In the phase P1, the refresh target is the second voltage state (case M), and the reference line REF is provided with a voltage that turns the transistor T2 off when the internal node N1 is in the second voltage state (case M) or in the first voltage state (case H) and that turns the transistor T2 on when the internal node N1 is in the third voltage state (case L).

More specifically, because the threshold voltage Vt2 of the transistor T2 is 2V, when a voltage that exceeds 2V is applied to the reference line REF, the transistor T2 in the case L is turned on. On the other hand, when a voltage applied to the reference line REF exceeds 5V, even the transistor T2 of the case M, which is the target in the phase P1, is turned on. Therefore, a voltage applied to the reference line REF needs to be at least 2V, but no more than 5V. In the example of FIG. 23, 4.5V is applied to the reference line REF.

When 4.5V is applied to the reference line REF, in the pixel circuits with the potential VN1 of the internal nodes N1 being 2.5V or greater, the transistors T2 are turned off. On the other hand, in the pixel circuits with VN1 being lower than 2.5V, the transistors T2 are turned on.

In the internal node N1 of the case M written to 3V by the last writing operation, if the self-refresh operation is performed before the voltage is decreased by 0.5V or greater due to the occurrence of the leakage current, VN1 becomes 2.5V or greater, and therefore, the transistor T2 is turned off. In the same manner, VN1 of the internal node N1 of the case H written to 5V by the last writing operation becomes 2.5V or greater, and therefore, transistor T2 is turned off. On the other hand, the internal node N1 in the case L written to 0V by the last writing operation does not reach or exceed 2.5V even when time has passed, and therefore, in this case, the transistor T2 is turned on.

The source line SL is provided with a voltage that equals to a sum of the target voltage of the internal node N1 that is to be restored by the refresh operation and the turn-on voltage Vdn of the diode D1 (at time t2). In this case, because the refresh target of the phase P1 of this embodiment is the case M, the target voltage of the internal node N1 is 3V. Therefore, when the turn-on voltage Vdn of the diode D1 is 0.6V, 3.6V is applied to the source line SL. The time t1 where 4.5V is applied to the reference line REF and the time t2 where 3.6V is applied to the source line SL may coincide with each other.

The target voltage of the internal node N1 corresponds to the "refresh target voltage." The turn-on voltage Vdn of the diode D1 corresponds to the "first adjusting voltage." The voltage that is actually applied to the source line SL in the refresh step S1 corresponds to the "refresh input voltage." In the phase P1, this refresh input voltage is 3.6V.

The boost line BST is provided with a voltage within a range that turns on the transistor T1 in the case M and the case H and that turns off the transistor T1 in the case L (at time t3). As described above, in the cases M and H, the transistors T2 are turned off, and in the case L, the transistor T2 is turned on. The boost line BST is connected to one end of the boost capacitance element Cbst. Therefore, when a high-level voltage is applied to the boost line BST, the potential of the other end of the boost capacitance element Cbst, which is the potential of the output node N2, is boosted.

As described above, in the case M and the case H, the transistors T2 are off during the phase P1. Therefore, the size of the potential change in the node N2 caused by the boosting is determined by the ratio of the boost capacitance Cbst to the total capacitance attributed to the node N2. When this ratio is 0.7, for example, if one electrode of the boost capacitance element is increased by ΔVbst, the other electrode, which is the node N2, is increased by about 0.7ΔVbst.

In the case M, the potential VN1(M) of the internal node N1 at the time t1 is about 3V. If the gate of the transistor T1, which is the output node N2, is provided with the potential that is higher than VN1(M) by at least the threshold voltage of 2V, the transistor T1 is turned on. In this embodiment, the voltage applied to the boost line BST at the time t1 is set to 10V, and therefore, the output node N2 is increased by 7V. Because the transistor T2 is turned on during the writing operation, the potential of the node N2 immediately before the time t1 is almost the same as that of the node N1 (about 3V). Therefore, by the boosting, the node N2 is increased to about 10V. This makes the potential difference between the gate of the transistor T1 and the node N1 equal to or greater than the threshold voltage, thereby turning the transistor T1 on.

Similarly, in the case H, the node N2 is increased to about 12V by the boosting, and therefore, the transistor T1 is turned on.

On the other hand, the case L where the transistor T2 is turned on in the phase P1 differs from the case M and the case H in that the output node N2 and the internal node N1 are electrically connected. In this case, the size of the potential change of the output node N2 caused by the boosting is affected by not only the total parasitic capacitance of the boost capacitance Cbst and the total parasitic capacitance of the node N2, but also the total parasitic capacitance of the internal node N1.

The internal node N1 is connected to one end of the auxiliary capacitance element Cs and one end of the liquid crystal capacitance element Clc, and the total parasitic capacitance Cp of this internal node N1 can be approximately represented by the sum of the liquid crystal capacitance Clc and the auxiliary capacitance Cs. A value of the boost capacitance Cbst is significantly smaller than that of the total capacitance Cp. Therefore, the ratio of the boost capacitance to the total capacitance becomes very small, which is about 0.01 or smaller, for example. In this case, when one electrode of the boost capacitance element is increased by ΔVbst, the other electrode, which is the output node N2, is increased only by about 0.01 ΔVbst at most. That is, in the case L, even when ΔVbst is set to be 10V, the potential VN2(L) of the output node N2 shows little increase.

In the case L, VN2(L) is about 0V immediately before the time t1. Therefore, even when the boosting is performed at the time t1, the gate of the transistor T1 is not provided with the potential that is high enough to turn the transistor on. That is, unlike the case M, the transistor T1 remains off.

In the case M, the transistor T1 is turned on by the boosting. The source line SL is provided with 3.6V, and therefore, if the potential VN1(M) of the internal node N1 is decreased slightly from 3V, the potential difference that is equal to or greater than the turn-on voltage Vdn of the diode D1 has been generated between the source line SL and the internal node N1. This turns the diode D1 on in the direction from the source line SL toward the internal node N1, thereby allowing current to flow from the source line SL toward the internal node N1. As a result, the potential VN1(M) of the internal node N1 increases. This potential increase continues until the potential difference between the source line SL and the internal node N1 becomes equal to the turn-on voltage Vdn of the diode D1, and stops when the potential difference reaches Vdn. In this case, because the voltage applied to the source line SL is 3.6V, and the turn-on voltage Vdn of the diode D1 is 0.6V, the potential VN1(M) of the internal node N1 stops when it reaches 3V. The refresh operation in the case M is performed in this way.

For the case H, the transistor T1 is turned on by the boosting. However, because the source line SL is provided with 3.6V, and even though the potential VN1(H) of the internal node N1 has been slightly decreased from 5V, the decrease amount is less than 1V, and the reverse bias state from the source line SL toward the internal node N1 is created. Therefore, due to the rectifying function of the diode D1, electrical continuity between the source line SL and the internal node N1 is not established. That is, the potential VN1(H) of the internal node N1 is not affected by the voltage applied to the source line SL.

In the case L, because the transistor T1 is off, electrical continuity between the source line SL and the internal node N1 is not established. Thus, the potential VN1(L) of the internal node N1 is not affected by the voltage applied to the source line SL.

That is, in the phase P1, the refresh operation is performed for the pixel circuits with the potential of the internal nodes N1 being at least the refresh isolation voltage, but no more than the refresh target voltage. In the phase P1, the refresh isolation voltage was set to 2.5V (=4.5−2V), and the refresh target voltage was set to 3V, and therefore, the operation of refreshing the potential VN1 to 3V is performed only for the pixel circuits with the potential VN1 of the internal nodes N1 being at least 2.5V, but no more than 3V, that is, the case M only.

Step S1/Phase P2

In the phase P2, the refresh target is the writing nodes N1 (H) in the case H (high voltage state).

The voltage applied to the boost line BST remains 10V, continued from the phase P1.

At the time t4, the reference line REF is provided with a voltage that turns off the transistor T2 when the internal node N1 indicates a voltage state (case H) of the refresh target and that turns on the transistor T2 when the internal node N1 indicates a voltage state (case M or L) that is lower than the voltage state (case H) of the refresh target.

More specifically, because the threshold voltage Vt2 of the transistor T2 is 2V, and the voltage VN1(M) of the node N1 in the case M is 3V, by applying a voltage that is greater than 5V(=2+3) to the reference line REF, the transistor T2 in the case M can be turned on. It is apparent that the transistor T2 is also turned on for the case L by this voltage application.

On the other hand, if a voltage that exceeds 7V is applied to the reference line REF, the transistor T2 is turned on even in the case H. Therefore, technically, any voltage may be applied to the reference line REF as long as it is between 5V and 7V. However, in the manner similar to the phase P1, it is necessary to allow a certain degree of a margin in the applied voltage, and therefore, the applied voltage is set to be 6.5V in this case, for example. This 6.5V corresponds to the refresh reference voltage in the phase P2, and 4.5V, which is a value obtained by subtracting the threshold voltage of the transistor T2, corresponds to the refresh isolation voltage.

With this voltage application, if the potential VN1 of the internal node N1 is at least 4.5V, which is the refresh isolation voltage, the transistor T2 is turned off. On the other hand, if VN1 of the pixel circuit is smaller than 4.5V, the transistor T2 is turned on. That is, in the case H written to 5V by the last writing operation, VN1 is at least 4.5V, and therefore, the transistor T2 is turned off. On the other hand, in the case L written to 0V by the last writing operation and in the case M written to 3V, VN1 is smaller than 4.5V, and therefore, the transistor T2 is turned on.

The source line SL is provided with a voltage that equals a sum of the target voltage of the internal node N1 that is to be restored by the refresh operation and the turn-on voltage Vdn of the diode D1 (at time t5). In the phase P2 of this embodiment, the refresh target is the case H, and therefore, the target voltage of the internal node N1 is 5V. Thus, when the turn-on voltage Vdn of the diode D1 is 0.6V, the source line SL is provided with 5.6V. In this phase P2, the time t5 at which 5.6V is applied to the source line SL needs to occur after the time t4 at which 6.5V is applied to the reference line REF for the reason described below.

In the case H, because the transistor T2 remains off since the time of the phase P1 and the output node N2 maintains the same potential state as that in the phase P1, the transistor T1 is turned on. When 5.6V is applied to the source line SL in this condition, if the potential VN1(H) of the internal node N1 has been decreased slightly from 5V, the potential difference that is equal to or greater than the turn-on voltage Vdn of the diode D1 is generated between the source line SL and the internal node N1. This turns on the diode D1 in the direction from the source line SL toward the internal node N1, thereby allowing current to flow from the source line SL toward the internal node N1. As a result, the potential VN1(H) of the internal node N1 increases until the potential difference between the source line SL and the internal node N1 becomes equal to the turn-on voltage Vdn (=0.6V). That is, VN1(H) is increased to 5V, and thereafter maintains that potential. This way, the refresh operation for the case H is performed.

An operation for the case M will be explained in detail. At a point immediately before the time t4 when 6.5V is applied to the reference line REF, the potential VN2(M) of the node N2 is about 10V, and VN1(M) is 3V. When 6.5V is applied to the reference line REF at the time t4 in this condition, the transistor T2 is turned on, and establishes electrical conductance in the direction from the node N2 toward N1, thereby allowing a current to flow in this direction. However, as described above, the parasitic capacitance of the node N1 is significantly greater than the parasitic capacitance of the node N2, and therefore, while the potential of the node N2 is lowered by the current generated here, the potential of the node N1 is not changed at all. The potential of the node N2 continues lowering until it reaches the same potential as that of the node N1 (that is, 3V), and the potential decrease thereafter stops. Because the refresh operation for the case M has been already performed in the phase P1, the potential VN2(M) of the node N2 becomes the same as the potential VN1(M) after that refresh operation.

When the potential of the node N2 becomes lower than a voltage (5V) that is equal to the sum of the threshold voltage (2V) of the transistor T1 and the potential of the node N1, the transistor T1 is turned off. As described above, because the potential change in the node N2 is stopped when the potential thereof becomes the same as the potential of the node N1, the off state of the transistor T1 continues thereafter. Therefore, even if 5.6V is applied to the source line SL in this condition, this voltage is not supplied to the node N1(M) through the transistor T1. This means that the potential VN1(M) of the internal node N1 is not affected by the voltage (5.6V) applied to the source line SL in the phase P2.

In other words, in order to prevent the internal node N1 of the case M from receiving the voltage of 5.6V when 5.6V is supplied to the source line SL at the time t5, the transistor T1 must be off at the time t5. At a point in time immediately before the application of 6.5V to the reference line REF, the transistor T1 of the case M is on, and in order to turn it off, the potential VN2 of the node N2 must be lower than at least 5V after 6.5V is applied to the reference line REF. Therefore, between the point in time where 6.5V is applied to the reference line REF at the time t4 and the point in time where the voltage applied to the source line SL is changed to 5.6V, there needs to be an enough time for the potential VN2 of the node N2 to go below at least 5V. This means that the time t5 where 5.6V is applied to the source line SL needs to occur at least after the time t4 where 6.5V is applied to the reference line REF. This is illustrated in FIG. 23 as a slight time lag between the time t4 and the point in time where the transistor T1(M) is turned into the off state from the on state.

In the case L, because the transistor T1 has been off since the phase P1, electrical continuity between the source line SL and the internal node N1 is not established. Thus, the potential VN1(L) of the internal node N1 is not affected by the voltage applied to the source line SL.

That is, in the phase P2, the refresh operation is performed for the pixel circuits with the potential of the internal nodes N1 being at least the refresh isolation voltage and no more than the refresh target voltage. Because the refresh isolation voltage was set to 4.5V (=6.5-2V), and the refresh target voltage was set to 5V, the operation of refreshing the potential VN1 to 5V is performed only for the pixel circuits with the potential VN1 of the internal nodes N1 being at least 4.5V, but no more than 5V, that is, the case H only.

After the refresh operation of the case H, the voltage application to the boost line BST is stopped (at time t6), and a high voltage (10V, in this case) is applied to the reference line REF so as to turn on the transistors T2 in the respective cases H, M, and L (at time t7). Thereafter, the voltage application to the source line SL is stopped (at time t8). The order of the times t6 to t8 is not limited to this, and they may also take place at the same time.

Step S2

At the time t8 and beyond, the stand-by step S2 during which the previous voltage states are simply maintained is performed (times t8 through t9). Here, because the reference line REF is provided with the high voltage, the nodes N1 and N2 have the same potential level in the respective cases H, M, and L. In the same manner as Embodiment 2, the stand-by step S2 is maintained for a significantly longer period of time than the refresh step S1.

Figure 23:
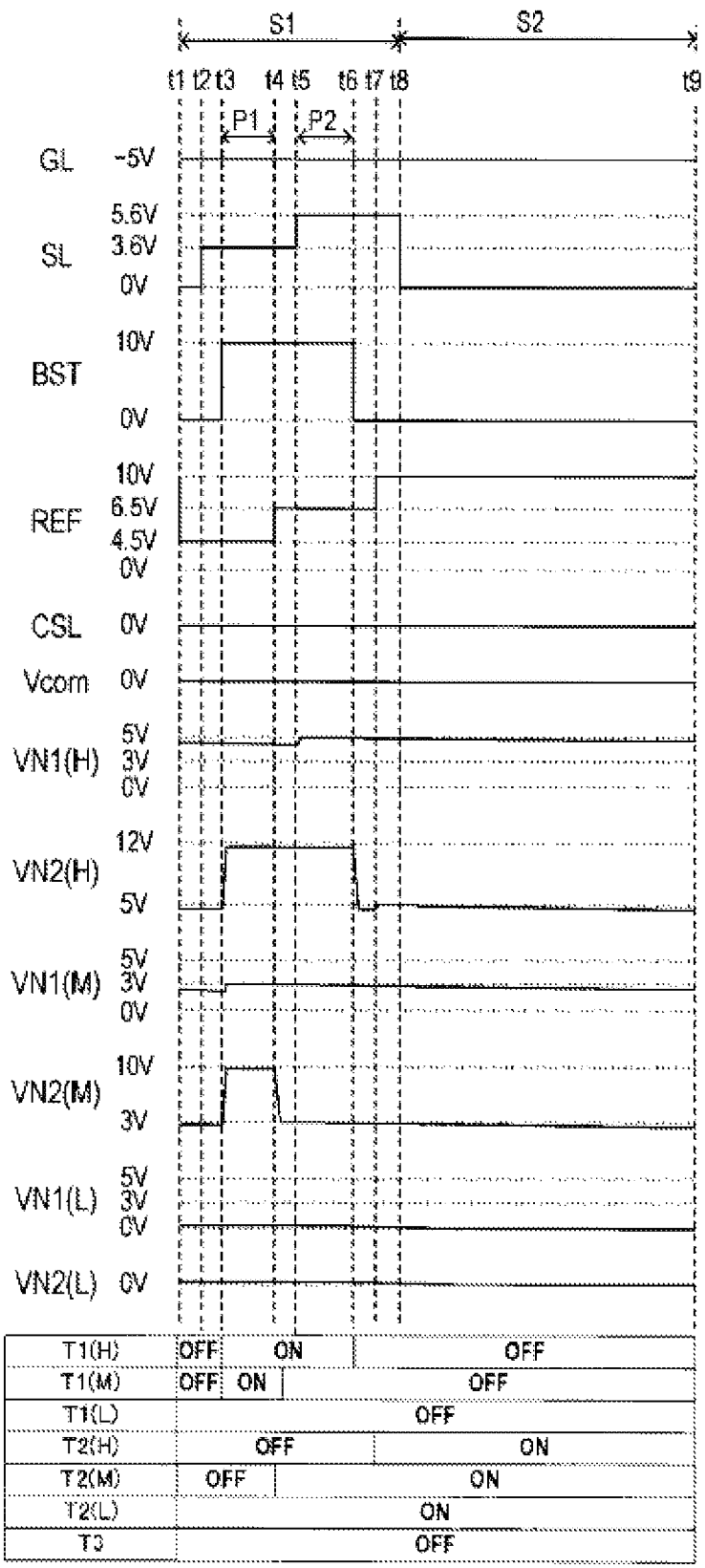
FIG. 23 is a timing chart of a self-refresh operation according to Embodiment 3 with the Type 1 pixel circuit.

As described above, according to the self-refresh operation of this embodiment shown in FIG. 23, the number of times the voltage applied to the boost line BST needs to be changed can be reduced as compared with Embodiment 2 shown in FIG. 18, and therefore, it becomes possible to further reduce the power consumption. It is apparent that the description above applies to not only the pixel circuit 2A in FIG. 7, but also the modified pixel circuit shown in FIG. 8 in the same manner.

In Embodiment 2, the order of the refresh operations for the case H and for the case M can be reversed, but in this embodiment where the voltage applied to the boost line BST is changed only once, the refresh operation for the case H must be performed after the refresh operation for the case M, and these operations cannot be performed in reverse order. This is because, if 10V is applied to the boost line BST first so as to perform the refresh operation for the case H, the potential of the nodes N2 in the state of the case M cannot be boosted, which creates a need to change the voltage applied to the boost line BST again so as to perform the refresh operation for the case M.

Although 10V (a voltage that turns on the transistors T2 in all of the cases H, M, and L) is applied to the reference line REF immediately before the time t1 and during the stand-by step S2 in this embodiment, it is also possible to apply 0V to the reference line REF so as to turn the transistors T2 off as described in Embodiment 2. However, by applying the voltage in the same manner as this embodiment, the number of times the voltage applied to the reference line REF needs to be changed can be reduced.

Type 2

Figure 24:
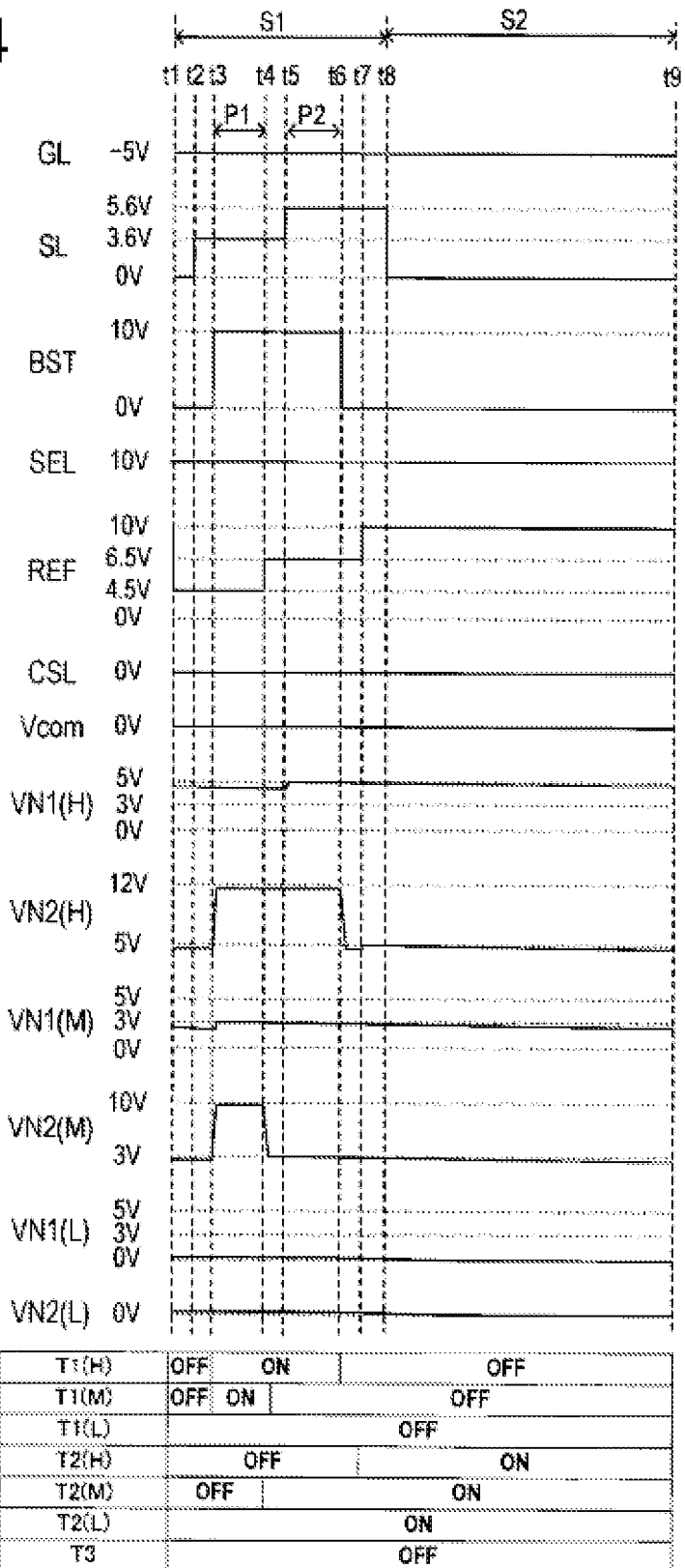
FIG. 24 is a timing chart of a self-refresh operation according to Embodiment 3 with the Type 2 pixel circuit.

The Type 2 pixel circuit 2B shown in FIG. 9 includes the transistor T4, and is provided with the select line SEL for controlling the conducting state of this transistor T4, in addition to the boost line BST. Therefore, by applying a voltage to the select line SEL so as to keep the transistor T4 on during the refresh step S1, the exactly same voltage state as that of Type 1 can be achieved. FIG. 24 shows a timing chart of this configuration. The voltage applied to the select line SEL was set to 10V in this case.

Figure 25:
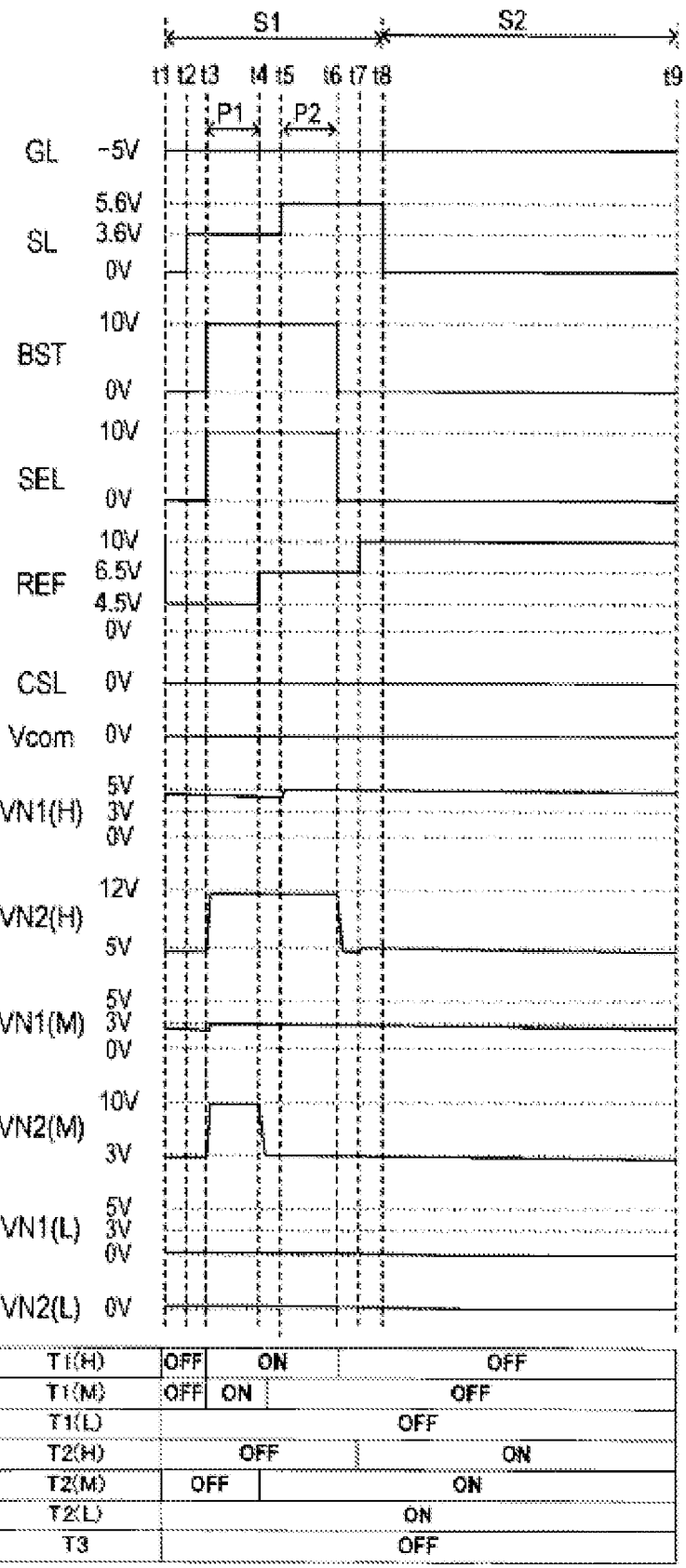
FIG. 25 is another timing chart of the self-refresh operation according to Embodiment 3 with the Type 2 pixel circuit.

It is also possible to apply a pulse voltage to the select line SEL at the same timing as the application of the boost voltage to the boost line BST. FIG. 25 shows a timing chart of this configuration.

It is apparent that the description above applies to not only the pixel circuit 2B shown in FIG. 9, but also the pixel circuits 2B shown in FIGS. 10 and 11, and the pixel circuits 2C shown in FIGS. 12 to 15 as well. The detailed explanations are omitted.

Type 3

The respective Type 3 pixel circuits 2D and 2E differ from the respective Type 2 pixel circuits in that the control terminal of the transistor T4 is connected to the boost line BST, and the select line SEL is not provided. Therefore, unlike the Type 2 pixel circuits, the conducting state of the transistor T4 is controlled by the boost line BST.

However, as shown in FIG. 25, the select line SEL in Type 2 can be provided with pulsed voltages having the same timing as the boost line BST to achieve the exactly same voltage states as those of respective pixel circuits in Type 1. This means that the exactly same voltage state can be achieved even with the configuration where the control terminal of the transistor T4 is connected to the boost line BST.

Thus, by adopting the same voltage state as that of FIG. 25, the self-refresh operation can be performed for the pixel circuit 2D in FIG. 16 as well. This also applies to the pixel circuit 2E in FIG. 17. The detailed explanations are omitted.

Embodiment 4

In Embodiment 4, the writing operation in the constant display mode will be explained with reference to figures.

In the writing operation of the constant display mode, the pixel data for one frame is divided into respective display lines extended in the horizontal direction (row direction), and in every horizontal period, voltages that correspond to the pixel data for one display line are applied to the source lines SL of respective columns. In the same manner as Embodiment 2, the pixel data have three gradation levels. That is, each source line SL is provided with one of a high level voltage (5V), a medium level voltage (3V), and a low level voltage (0V). By applying a selected row voltage 8V to the gate line GL of the selected display line (selected row), the first switching circuits 22 in all of the pixel circuits 2 of the selected row are turned on, thereby transferring the voltages of the source lines SL of the respective columns to the internal nodes N1 of the respective pixel circuits 2 of the selected row.

The gate lines GL of the display lines other than the selected display line (non-selected rows) are provided with a non-selected row voltage −5V so as to turn off the first switching circuits 22 in all of the pixel circuits 2 of the non-selected rows. The timing of the voltage applications to the respective signal lines in the writing operation described below is controlled by the display control circuit 11, and the individual voltage applications are performed by the display control circuit 11, the opposite electrode driver circuit 12, the source driver 13, and the gate driver 14.

Type 1

First, the Type 1 pixel circuit where the second switching circuit 23 includes a series circuit of the transistor T1 and the diode D1 only will be explained.

Figure 26:
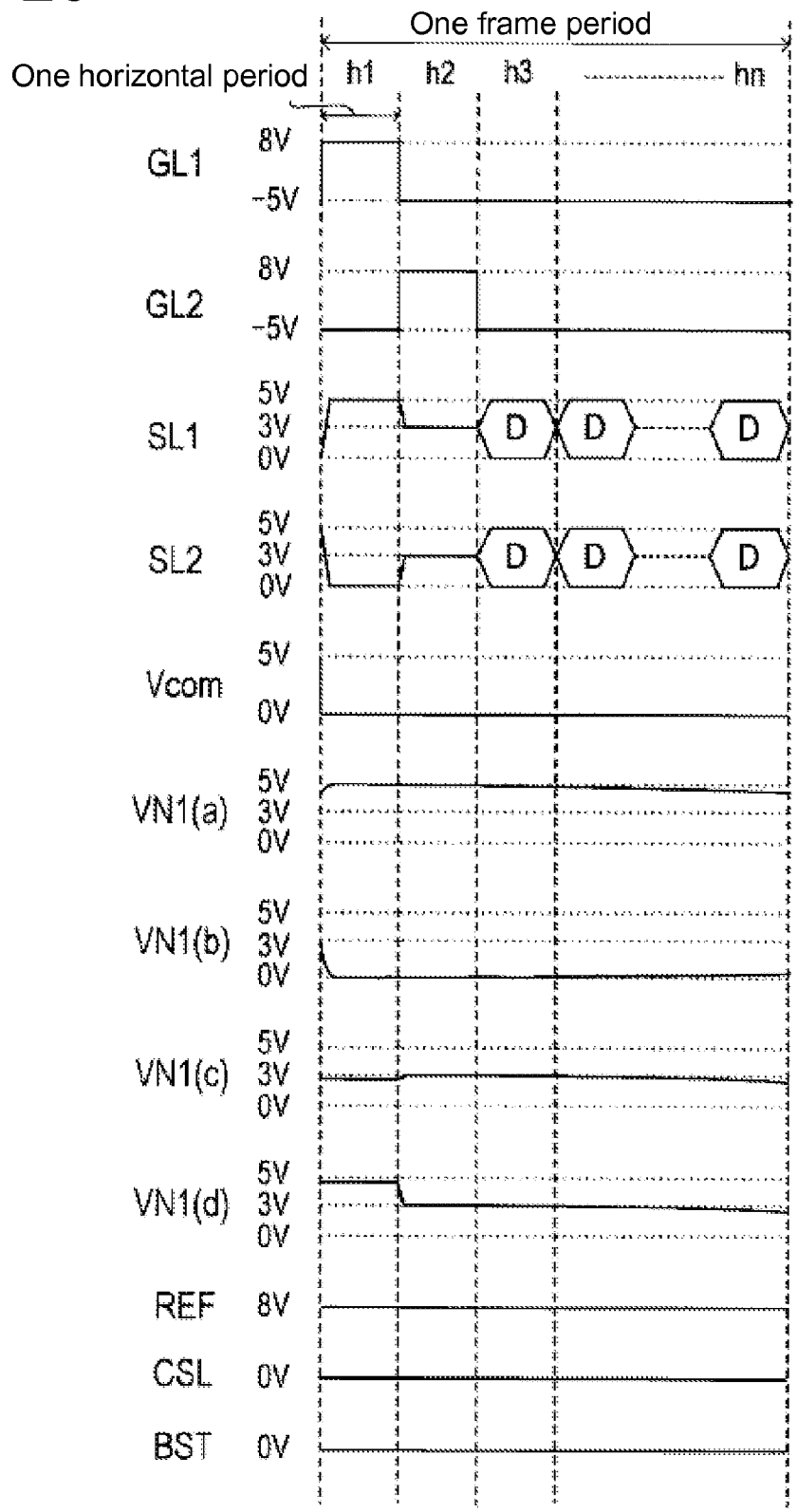
FIG. 26 is a timing chart of a writing operation in a constant display mode with the Type 1 pixel circuit.

In FIG. 26, a timing chart of the writing operation that uses the Type 1 pixel circuit 2A (FIG. 7) is shown. FIG. 26 illustrates respective voltage waveforms of two gate lines GL1 and GL2, two source lines SL1 and SL2, the reference line REF, the auxiliary capacitance line CSL, and the boost line BST as well as a voltage waveform of the opposite voltage Vcom in one frame period.

Further, FIG. 26 shows waveforms of the potential VN1 of each internal node N1 in four pixel circuits 2A. These four pixel circuits 2A include a pixel circuit 2A(a) that is selected by the gate line GL1 and the source line SL1, a pixel circuit 2A(b) that is selected by the gate line GL1 and the source line SL2, a pixel circuit 2A(c) that is selected by the gate line GL2 and the source line SL1, and a pixel circuit 2A(d) that is selected by the gate line GL2 and the source line SL2. In the figure, each of the characters (a) through (d) is added to the corresponding internal node potential VN1 to make a distinction.

One frame period is divided into numerous horizontal periods in accordance with the number of the gate lines GL, the respective horizontal periods are assigned with the gate lines GL1 to GLn in that order as the gate lines to be selected in the corresponding horizontal periods. FIG. 26 shows a voltage change in the two gate lines GL1 and GL2 in the first two horizontal periods. In the first horizontal period, the selected row voltage 8V and the non-selected row voltage −5V are applied to the gate line GL1 and the gate line GL2, respectively. In the second horizontal period, the selected row voltage 8V and the non-selected row voltage −5V are applied to the gate line GL2 and the gate line GL1, respectively. In the horizontal periods that follow, the non-selected row voltage −5V is applied to both the gate lines GL1 and GL2.

The source line SL of each column is provided with a voltage (5V, 3V, or 0V) that corresponds to pixel data of a corresponding display line in every horizontal period. FIG. 26 shows two source lines SL1 and SL2 to represent the respective source lines SL. In FIG. 26, in order to illustrate a change in the potential VN1 of the internal node N1, the voltages of the two source lines SL1 and SL2 are specified as 5V, 3V, or 0V in the first two horizontal periods. In the subsequent periods, a voltage of one of the three values is applied to each line in accordance with pixel data. In FIG. 26, these voltages are shown as "D" so as to indicate that the voltage values are data-dependent.

FIG. 26 shows a case where the high level voltage is written in the pixel circuit 2A(a), and the low level voltage is written in the pixel circuit 2A(b), respectively, in the first horizontal period h1, and the medium level voltage is written in the pixel circuits 2A(c) and 2A(d) in the second horizontal period h2, for example.

In the description below, in the respective pixel circuits 2A(a) to 2A(d) at a point in time immediately before the writing operation, the pixel circuit 2A(a) is written to about 0V (low voltage state), the pixel circuits 2A(b) and 2A(c) are written to about 3V (medium voltage state), and the pixel circuit 2A(d) is written to about 5V, respectively, for example. The term "about" is used here to take into account the potential change that occurs over time due to the leakage current or the like as described in Embodiment 2 above.

That is, by the writing operation of this embodiment, the pixel circuit 2A(a) is written from 0V to 5V, the pixel circuit 2A(b) is written from 3V to 0V, the pixel circuit 2A(c) is written to 3V again, and the pixel circuit 2A(d) is written from 5V to 3V.

During the writing operation period (one frame period), the reference line REF is provided with a voltage that keeps the transistors T2 on, regardless of the voltage state of the internal nodes N1. In this case, the voltage was set to 8V. This voltage may be set to any values as long as it is greater than the sum of the threshold voltage (2V) of the transistor T2 and the potential VN1 (5V) of the internal node N1 in the high voltage state. This establishes an electrical connection between the output node N2 and the internal node N1, which makes it possible to stabilize the internal node potential VN1 by using the auxiliary capacitance element Cs connected to the internal node N1.

Because the boosting is not performed during the writing operation period, a low level voltage (0V in this case) is applied to the boost line BST. A prescribed fixed voltage (0V, for example) is applied to the auxiliary capacitance line CSL. Although the opposite voltage Vcom is controlled by the above-mentioned opposite AC driving, during one frame period, it stays at a high level (5V) or a low level (0V). In FIG. 26, the opposite voltage Vcom is fixed to 0V.

In the first horizontal period h1, the selected row voltage is applied to the gate line GL1, and voltages that correspond to the pixel data are applied to the respective source lines SL. Among the pixel circuits that are connected to the gate line GL1 through the control terminals of the transistors T3, 5V is to be written in the pixel circuit 2A(a), and 0V is to be written in the pixel circuit 2A(b). Therefore, 5V is applied to the source line SL1, and 0V is applied to the source line SL2, respectively. Other source lines are respectively provided with voltages that correspond to the pixel data in the manner similar to above.

In the first horizontal period h1, because the transistors T3 are turned on in both the pixel circuits 2A(a) and 2A(b), the voltages applied to the source lines SL are written in the internal nodes N1 through the transistors T3, respectively.

On the other hand, during the first horizontal period h1, in other pixel circuits in which the control terminals of the transistors T3 are connected to gate lines GL other than the gate line GL1, the transistors T3 are not turned on, and therefore, the voltages applied to the source lines SL are not provided to the internal nodes N1 through the first switching circuits 22.

Referring to the pixel circuit 2A(c) that is selected by the gate line GL2 and the source line SL1, because the control terminal of the transistor T3 in the pixel circuit 2A(c) is connected to the gate line GL2, the transistor T3 is not turned on as described above, and therefore, the voltage (5V) applied to the source line SL1 is not written in the internal node N1 through the first switching circuit 22.

Immediately before the writing, the potential VN1(c) of the internal node N1 is about 3V, and because the internal node N1 and the output node N2 have the same potential, the gate potential of the transistor T1 also becomes about 3V. At this point, the source line SL1 is provided with 5V, and therefore, the transistor T1 is not turned on. This means that the voltage applied to the source line SL1 is not written in the internal node N1 through the second switching circuit 23 either.

Thus, during the first horizontal period h1, the potential VN1(c) maintains the same value since immediately before the writing operation.

Next, referring to the pixel circuit 2A(d) that is selected by the gate line GL2 and the source line SL2, because the control terminal of the transistor T3 in the pixel circuit 2A(d) is also connected to the gate line GL2, the transistor T3 is not turned on like the pixel circuit 2A(c). Therefore, the voltage (0V) applied to the source line SL2 is not written in the internal node N1 through the first switching circuit 22.

Immediately before the writing, the potential VN1(d) of the internal node N1 is about 5V, and because the source line SL2 is provided with 0V, a reverse-bias voltage is applied to the diode D1. Therefore, the voltage (0V) applied to the source line SL2 is not provided to the internal node N1 through the second switching circuit 23.

This means that, during the first horizontal period h1, the potential VN1(d) also maintains the same value since immediately before the writing operation.

On the other hand, in the second horizontal period h2, in order to write 3V in the pixel circuits 2A(c) and 2A(d), respectively, the selected row voltage is applied to the gate line GL2, the non-selected row voltage is applied to the other gate lines GL, and 3V is applied to the respective source lines SL1 and SL2. Other source lines SL are also provided with voltages that correspond to pixel data of the respective pixel circuits that are selected by the gate line GL2. In the pixel circuits 2A(c) and 2A(d), the voltage applied to the source lines SL are provided to the internal nodes N1 through the first switching circuits 22, respectively. In the pixel circuits 2A(a) and 2A(b), in contrast, because the first switching circuits 22 are off, and the second switching circuits 23 are also off due to the diode D1 being reverse-biased or the transistor T1 being off, the voltages applied to the source lines SL are not provided to their internal nodes N1.

By applying voltages in the manner described above, in the selected pixel circuits only, the voltages that correspond to pixel data are provided from the source lines SL to the respective internal nodes N1 through the first switching circuits 22.

In the embodiment above, the description has been made for the case where the pixel circuit 2A shown in FIG. 7 is used as each pixel circuit, but it is apparent that the writing operation can be performed in the same manner even when the pixel circuit 2A shown in FIG. 8 is used.

Type 2

Next, the pixel circuit of Type 2 where the second switching circuit 23 includes a series circuit of the transistor T1, the diode D1, and the transistor T4, and the control terminal of the transistor T4 is connected to the select line SEL will be explained.

As described above, Type 2 includes the pixel circuits 2B (FIGS. 9 to 11) where the first switching circuit 22 is made of the transistor T3 only, and the pixel circuits 2C (FIGS. 12 to 15) where the first switching circuit 22 includes a series circuit of the transistors T3 and T4 (or T5).

Figure 27:
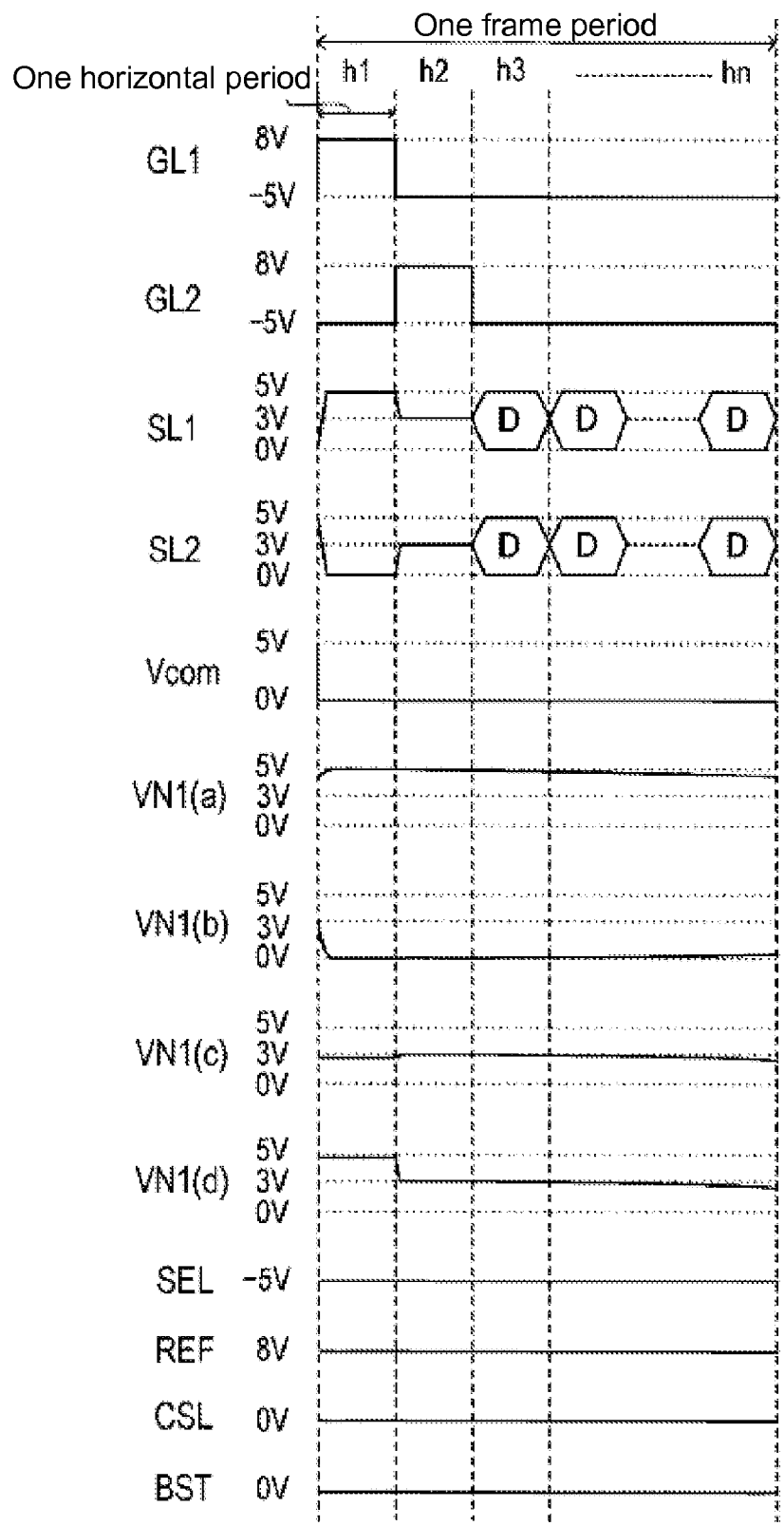
FIG. 27 is a timing chart of a writing operation in the constant display mode with the Type 2 pixel circuit.

As described in Type 1, in the writing operation, the second switching circuit 23 is turned off, and a voltage is applied to the internal node N1 from the source line SL through the first switching circuit 22. In the pixel circuit 2B, by keeping the transistor T4 in the off state, the second switching circuit 23 can be turned off reliably during the writing operation. Other than that point, the writing operation can be performed in the same manner as Type 1. FIG. 27 shows a timing chart for the writing operation using the Type 2 pixel circuit 2B (FIG. 9). In FIG. 27, −5V is applied to the select line SEL so as to keep the transistor T4 off during the writing operation period.

On the other hand, as shown in FIGS. 12 to 15, when the first switching circuit 22 includes a series circuit of the transistors T3 and T4 (or T5), it becomes necessary to turn on both transistors T3 and T4 (or T5) in the writing operation so that the first switching circuit 22 is turned on. In the pixel circuit 2C shown in FIG. 15, the transistor T5 is provided in the first switching circuit 22, but because the control terminal of this transistor T5 is connected to the control terminal of the transistor T4, the conducting state of the first switching circuit 22 is controlled through the conduction control of the transistor T4 in the same manner as the other pixel circuits 2C.

Thus, unlike the pixel circuits 2B where all select lines SEL are controlled in the same manner, the select lines SEL in the pixel circuit 2C need to be controlled separately for every row in the same manner as the gate lines GL. That is, the select lines SEL are arranged such that each row is provided with one select line SEL, and the number of the select lines SEL must be the same as that of the gate lines GL1 to GLn. The selected lines SEL are selected sequentially in the same manner as the gate lines GL1 to GLn.

Figure 28:
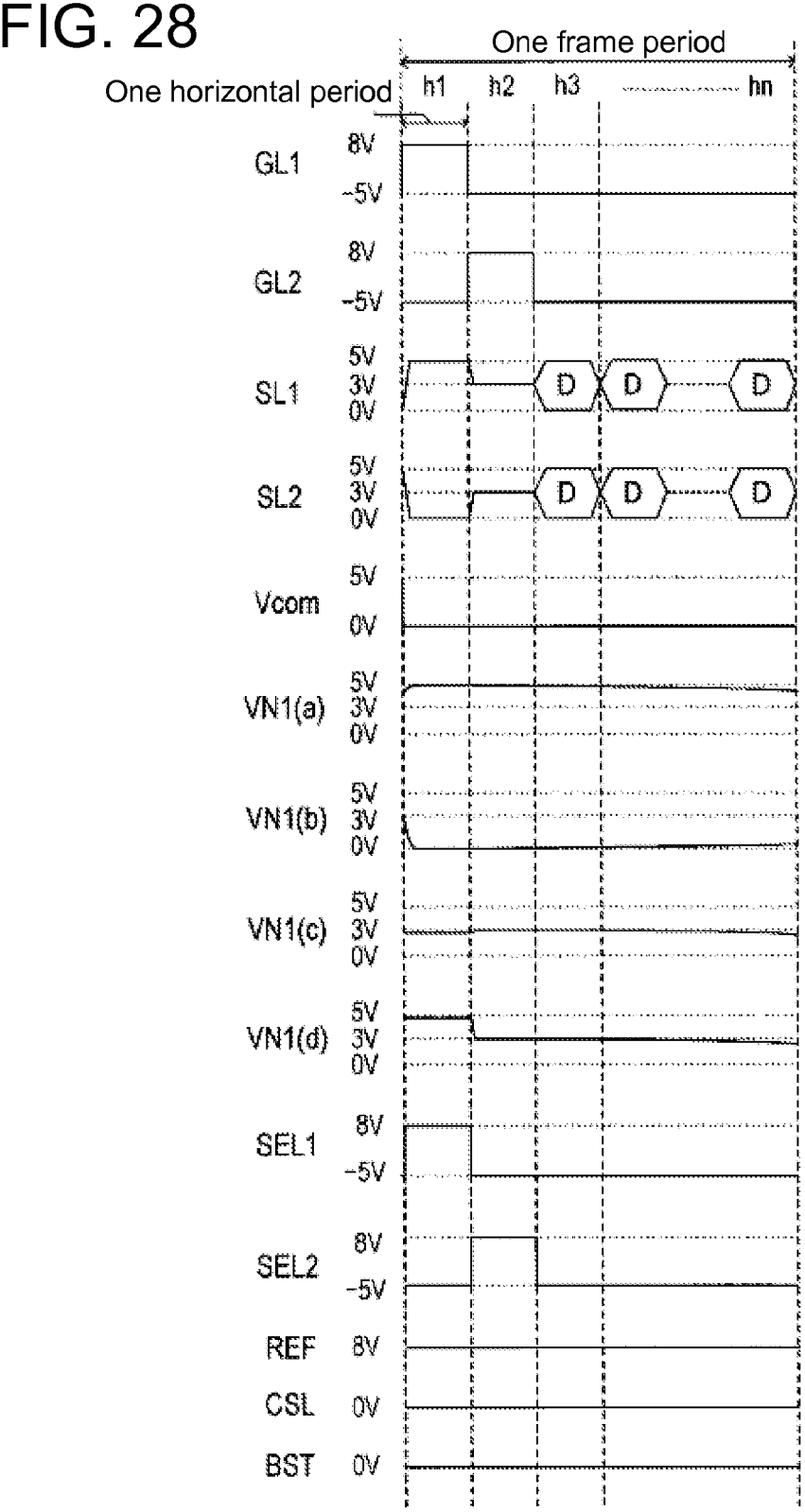
FIG. 28 is a timing chart of a writing operation in the constant display mode with the Type 2 pixel circuit.

FIG. 28 shows a timing chart of the writing operation for the Type 2 pixel circuit 2C (FIG. 12). In FIG. 28, changes in voltages of the two select lines SEL1 and SEL2 in the first two horizontal periods are illustrated. In the first horizontal period, the select voltage 8V and the non-select voltage −5V are applied to the select line SEL1 and the select line SEL2, respectively. In the second horizontal period, the select voltage 8V and the non-select voltage −5V are applied to the select line SEL2 and the select line SEL1, respectively. In the subsequent horizontal periods, the non-select voltage −5V is applied to both select lines SEL1 and SEL2. Except for that point, this timing chart is the same as the timing chart of the writing operation of the Type 1 pixel circuit 2A shown in FIG. 26. This makes it possible to achieve the same voltage state as that of the Type 1 pixel circuit 2A shown in FIG. 26. The detailed explanation is omitted.

Type 3

Next, the Type 3 pixel circuit will be explained. In the Type 3 pixel circuit, the second switching circuit 23 includes a series circuit of the transistor T1, the diode D1, and the transistor T4, and the control terminal of the transistor T4 is connected to the boost line BST.

Figure 29:
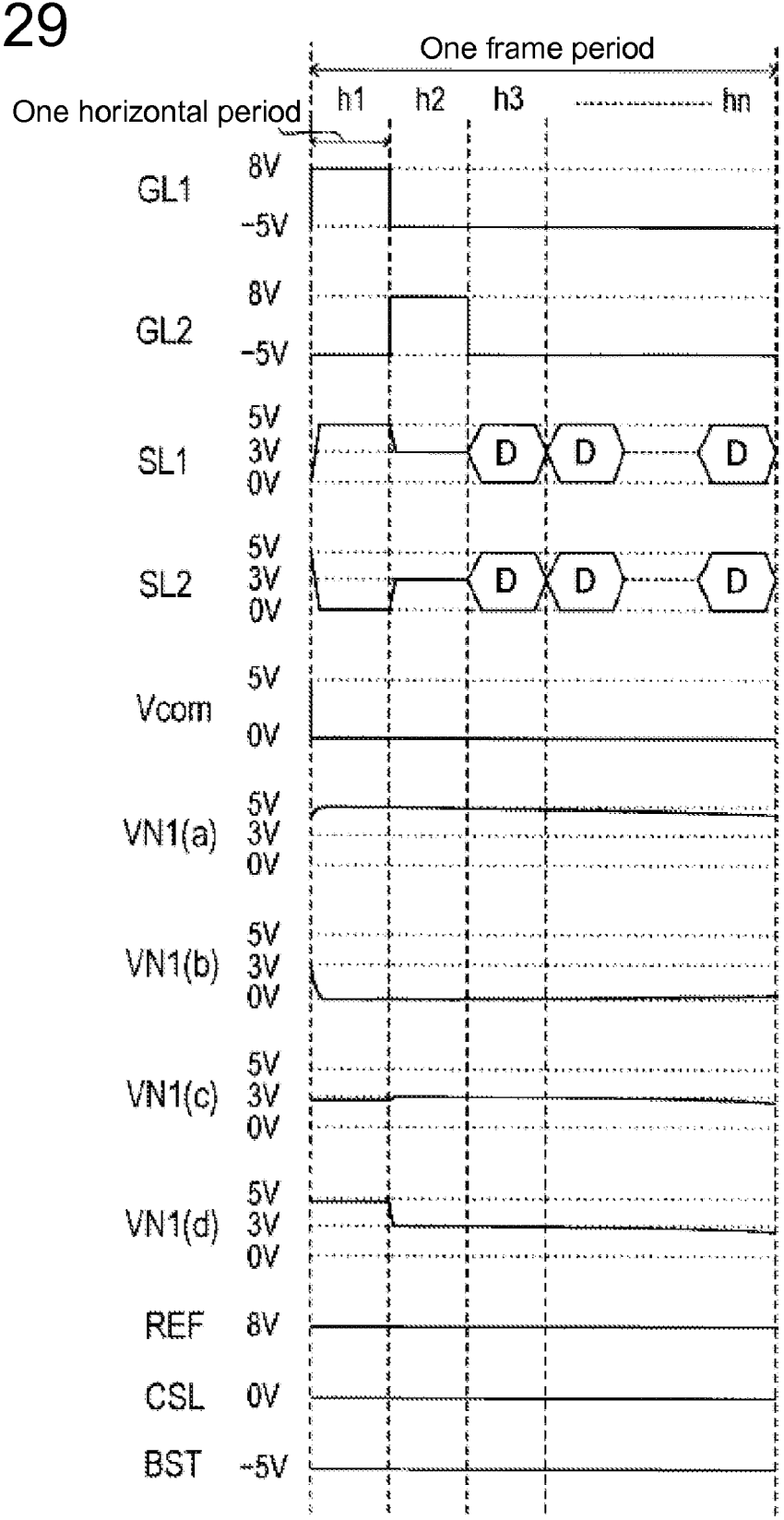
FIG. 29 is a timing chart of a writing operation in the constant display mode with the Type 3 pixel circuit.

The Type 3 pixel circuit differs from Type 2 only in that the select line SEL is not provided, and the control terminal of the transistor T4 is connected to the boost line BST. Therefore, voltages may be applied to the boost line BST in a manner similar to the voltage application to the select line SEL in Type 2. FIG. 29 shows a timing chart of the writing operation for the Type 3 pixel circuit 2D (FIG. 16).

Here, the reference line REF is provided with 8V, thereby keeping the transistor T2 on, and even when the voltage applied to the boost line BST is increased, the potential VN2 of the output node N2 is not increased almost at all, and therefore, the transistor T1 is not turned on.

Embodiment 5

In Embodiment 5, a relationship between the self-refresh operation and the writing operation in the constant display mode will be explained.

In the constant display mode, after the writing operation is performed for the pixel data of one frame, the writing operation is not performed for a certain period of time, and the display content obtained by the last writing operation is maintained.

By the writing operation, a voltage is provided to the internal node N1 (pixel electrode 20) of each of the pixels through the corresponding source line SL. Thereafter, the gate line GL is reduced to the low level so as to turn the transistor T3 off. However, because the electrical charge that has been accumulated by the last writing operation exists in the pixel electrode 20, the potential VN1 of the internal node N1 is maintained. That is, the voltage Vlc between the pixel electrode 20 and the opposite electrode 80 is maintained. This makes it possible to continuously apply the voltage required to display the image data across the terminals of the liquid crystal capacitance Clc even after the completion of the writing operation.

When the potential of the opposite electrode 80 is fixed, the liquid crystal voltage Vlc becomes dependent on the potential of the pixel electrode 20. This potential is changed over the course of time by the leakage current of the transistor in the pixel circuit 2. When the potential of the source line SL is lower than the potential of the internal node N1, for example, the leakage current is generated in the direction from the internal node N1 toward the source line SL, causing the potential VN1 of the internal node N1 to reduce over time. In contrast, when the potential of the source line SL is higher than the potential of the internal node N1 (when the low voltage state is written, in particular), the leakage current is generated in the direction from the source line SL toward the internal node N1, causing VN1 to increase over time. That is, as time goes by without the writing operation from the outside, the liquid crystal voltage Vlc is gradually changed, resulting in a change in the displayed image.

In the normal display mode, even when a still image is displayed, the writing operation is performed for all of the pixel circuits 2 in every frame. Therefore, the amount of electrical charge accumulated in the pixel electrode 20 needs to be maintained during one frame period only. Because the size of potential change in the pixel electrode 20 during one frame period is very small, the effects of the potential change in this period on the displayed image data is not significant enough to be visually recognized. Thus, in the normal display mode, the potential change in the pixel electrode 20 poses almost no problem.

In contrast, in the constant display mode, the writing operation is not performed in every frame. Therefore, during a period in which the potential of the opposite electrode 80 remains the same, the potential of the pixel electrode 20 needs to be maintained. In some cases, the same potential needs to be maintained over several frames. However, when the writing operation is not performed for several frame periods, the potential of the pixel electrode 20 is changed gradually due to the occurrence of the leakage current as described above. As a result, the displayed image data may be changed significantly enough to be visually recognized.

Figure 30:
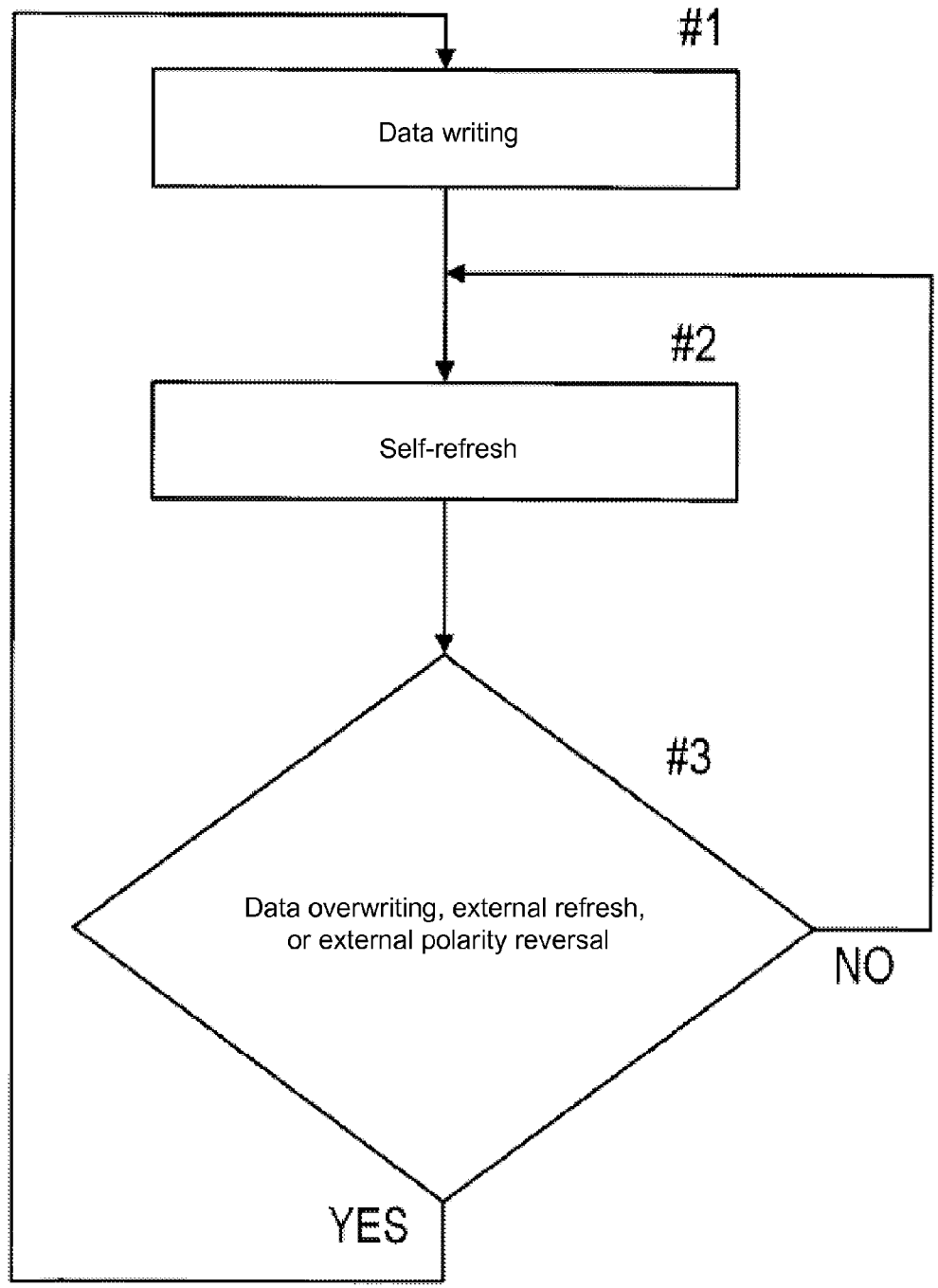
FIG. 30 is a flowchart illustrating implementation steps of a writing operation and a self-refresh operation in the constant display mode.

In order to prevent such a phenomenon, in the constant display mode, a combination of a self-polarity reversal operation and the writing operation is performed in a manner illustrated with a flowchart in FIG. 30 so as to achieve a significant reduction in power consumption while suppressing the potential change in the pixel electrode.

First, the writing operation of the pixel data for one frame in the constant display mode is performed in the manner described in Embodiment 4 above (step #1).

After the writing operation in the step #1, the self-refresh operation is performed in the manner described in Embodiment 2 above (step #2). As described above, the self-refresh operation includes the refresh step S1 and the stand-by step S2.

When a request for the writing operation for new pixel data (data overwriting), the external refresh operation, or the external polarity reversal operation is received during the period of the stand-by step S2 (YES in step #3), the process goes back to the step #1, and the writing operation is performed for the new pixel data or the previous pixel data. When such a request is not received during the period of the stand-by step S2 (NO in the step #3), the process goes back to the step #2, and the self-refresh operation is performed again. This makes it possible to suppress the change of the displayed image caused by the effects of the leakage current.

When the refresh operation is to be performed by the writing operation instead of the self-refresh operation, the power consumption is represented by the relational expression in Formula 1 above. However, when the self-refresh operations are repeatedly performed with the same refresh rate, and when the respective pixel circuits are configured to hold the respective three values of pixel data, the voltages for all of the source lines are driven twice as described in Embodiment 4, and therefore, the variable "n" in Formula 1 becomes 2. Further, if the display resolution (the number of pixels) is for VGA, "m" equals 1920, and "n" equals 480, and therefore, the power consumption is expected to be reduced by a ratio of one to two hundred forty.

In this embodiment, the self-refresh operation is combined with the external refresh operation or the external polarity reversal operation. This is to address the following problem: even though the pixel circuits 2 function properly at first, when a defect is caused in the second switching circuit 23 or in the control circuit 24 by age-related degradation, the self-refresh operation may not be able to run properly in some of the pixel circuits 2, although the writing operation can be performed with no problem. That is, when only the self-refresh operation is used, once the display degradation occurs in some of the pixel circuits 2, the same pixel circuits 2 would always have the problem. However, by using the external polarity reversal operation concurrently, it becomes possible to prevent the display defect from chronically appearing in the same pixel circuits.

Embodiment 6

In Embodiment 6, the writing operation in the normal display mode will be explained for each of the Types with reference to figures.

In the writing operation in the normal display mode, pixel data for one frame is divided into the respective display lines disposed in the horizontal direction (row direction). In every horizontal period, analog voltages of multiple gradation levels each corresponding to pixel data of one display line are respectively applied to the source lines SL of the respective columns. The selected row voltage 8V is applied to the gate line GL of the selected display line (selected row) so that the first switching circuits 22 in all of the pixel circuits 2 connected to the selected row are turned on, thereby transferring the voltages applied to the source lines SL of the respective columns to the internal nodes N1 of the respective pixel circuits 2 in the selected row. The non-selected row voltage −5V is applied to the gate lines GL (non-selected rows) other than the selected display line, thereby turning off the first switching circuits 22 in all of the pixel circuits 2 connected to the non-selected rows.

The writing operation of the normal display mode differs from that of the constant display mode in that the opposite voltage Vcom is changed in every horizontal period (opposite AC driving), and the auxiliary capacitance line CSL is driven with the voltage that varies so as to follow the opposite voltage Vcom. Because the pixel electrode 20 is not only capacitively coupled with the opposite electrode 80 through the liquid crystal layer, but also capacitively coupled with the auxiliary capacitance line CSL through the auxiliary capacitance element Cs, if the voltage of the auxiliary capacitance element Cs is fixed, only Vcom is changed. This would induce variations in the liquid crystal voltage Vlc of the pixel circuits 2 in the non-selected rows. By driving all of the auxiliary capacitance lines CSL with the same voltage as the opposite voltage Vcom, the voltages of the opposite electrode 80 and the pixel electrode 20 are changed in the same voltage direction, thereby cancelling the effect of the opposite AC driving.

Figure 31:
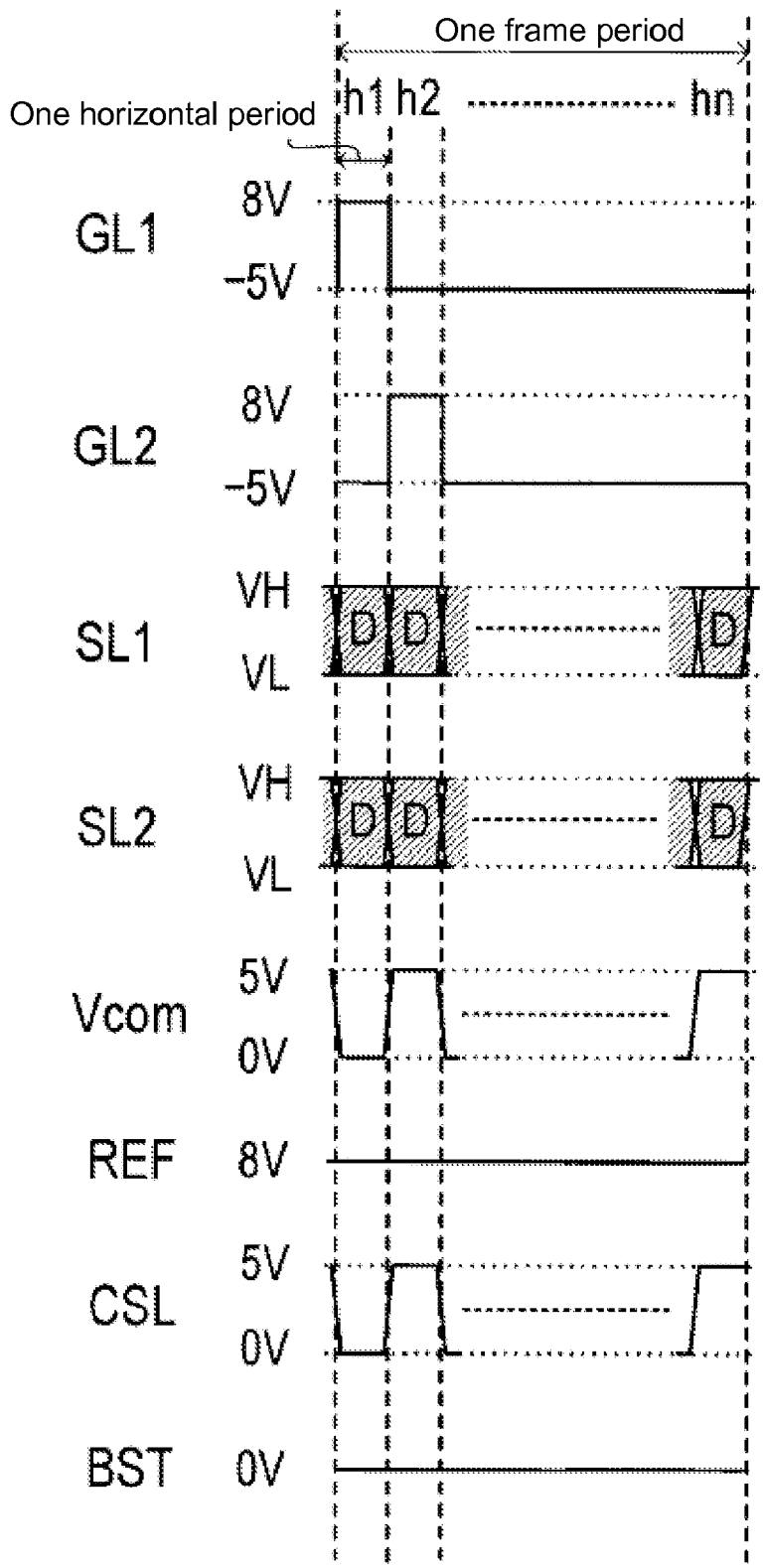
FIG. 31 is an example of a timing chart of a writing operation in a normal display mode with the Type 1 pixel circuit.

The writing operation of the normal display mode is performed on the same principle as the writing operation of the constant display mode except that the opposite AC driving is performed, and that the source lines SL are provided with the analog voltages for more gradation levels than the constant display mode, and therefore, the detailed explanations are omitted. FIG. 31 shows a timing chart of the writing operation in the constant display mode for the Type 1 pixel circuit 2A (FIG. 7). Because the analog voltages for multiple gradation levels applied to the source lines SL are changed in accordance with the pixel data of an analog display line, and therefore cannot be uniquely determined to take certain values between the minimum value VL and the maximum value VH, the applied voltages are indicated by hatching the corresponding areas in FIG. 31.

Figure 32:
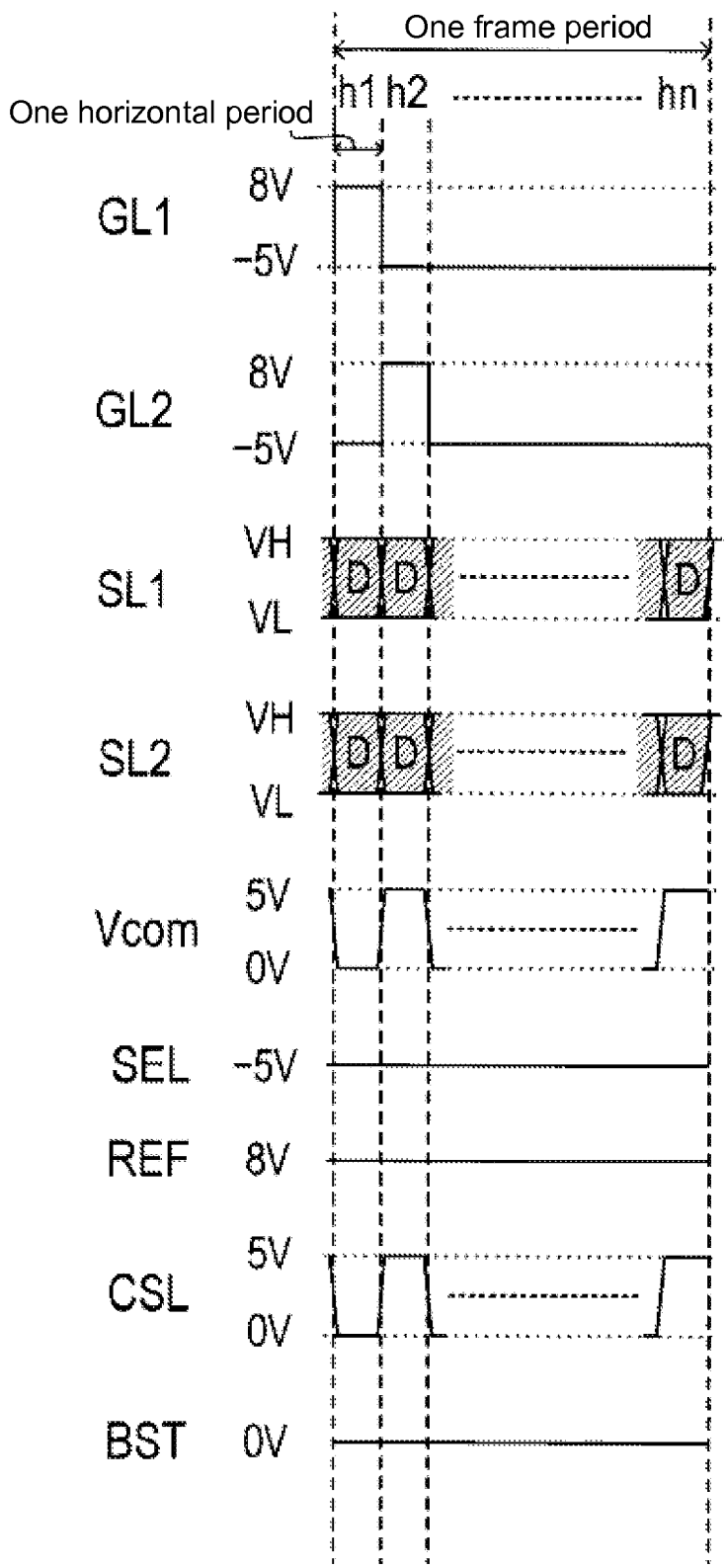
FIG. 32 is an example of a timing chart of a writing operation in the normal display mode with the Type 2 pixel circuit.

Similarly, FIG. 32 shows a timing chart of the writing operation performed by using the Type 2 pixel circuit 2C (FIG. 12).

In this embodiment, the polarity of each display line is reversed in every horizontal period during the writing operation in the normal display mode. This scheme is adopted in order to solve below-described problems that arise when the polarity is reversed in every frame period. Other methods, such as conducting the polarity reversal for every column, or conducting the polarity reversal for each row and each column simultaneously in every pixel, can also be used to solve the same problems.

Assuming that the positive liquid crystal voltage Vlc is applied to all of the pixels in a frame F1, and that the negative liquid crystal voltage Vlc is applied to all of the pixels in a subsequent frame F2, even though the voltage of the same absolute value is applied to the liquid crystal layer 75, a slight difference may occur in light transmittance between the positive voltage and the negative voltage. When a still image of high quality is displayed, this small difference may cause a very small change in the display condition between the frame F1 and the frame F2. Even when a moving image is displayed, a very small change in the display condition may occur in a display section where the display content remains the same between the frames. In displaying a still image or a moving image of high quality, it is possible that such a very small change is visually recognized.

Because the normal display mode is configured to display those high quality still images or moving images, the above-mentioned very small change may be visually recognized. In order to prevent such a phenomenon, this embodiment is configured to reverse the polarity for every display line in the same frame. This way, the polarity of the applied liquid crystal voltages Vlc can be changed between the respective display lines in the same frame, making it possible to suppress the effects of the polarity of the liquid crystal voltage Vlc on the display image data.

Other Embodiments

Other embodiments will be explained below.

1. In the above-mentioned embodiments, the constant display mode, for which the self-refresh operation is performed, has been explained as a display mode that has less display colors than the normal display mode. However, it is also possible to perform the liquid crystal display by the constant display mode alone by increasing the gradation levels so as to increase the number of display colors to a certain degree. In this case, even though the full color display that can be achieved by the normal display mode cannot be obtained, for a screen that does not require many colors to display, it is possible to use the constant display mode of the present invention alone.

When the number of gradation levels is increased, the number of pulses applied in the self-refresh operation in Embodiment 2, i.e., the number of phases in the refresh step S1, is also increased. In Embodiment 2, the two phases of the phases P1 and P2 were provided to achieve the three values, but when the gradation levels are increased to four, three phases are required, and when the gradation levels are increased to five, four phases are required.

On the other hand, according to the method described in Embodiment 3, the voltage applied to the reference line REF and the voltage applied to the source line SL are changed for a certain number of time (the number of gradation levels −1) while the voltage applied to the boost line BST remains the same since the start of the phase P1.

Although the pixel data values in the constant display mode in the respective embodiments above were set to 5V, 3V, and 0V, it is apparent that the pixel data values are not limited to such values.

2. With regard to the Type 2 pixel circuits 2B (FIGS. 9 to 11), in the writing operations in the normal display mode and in the constant display mode, the transistor T2 may be turned off by applying a low-level voltage to the reference line REF. This makes it possible to electrically separate the internal node N1 and the output node N2 from each other, which makes the potential of the pixel electrode 20 unaffected by the voltage of the output node N2 before the writing operation. As a result, the voltage applied to the source line SL can be accurately reflected in the voltage of the pixel electrode 20, allowing the image data to be displayed without error.

3. In the embodiments above, all of the pixel circuits 2 arranged on the active matrix substrate 10 are configured to include the second switching circuits 23 and the control circuits 24, respectively. When two types of pixel sections, which are a transmissive pixel section that performs a transmissive liquid crystal display and a reflective pixel section that performs a reflective liquid crystal display, are provided on the active matrix substrate 10, the second switching circuits 23 and the control circuits 24 may be respectively provided in the pixel circuits in the reflective pixel section only, and in such a case, the pixel circuits in the transmissive display section are not provided with the second switching circuits 23 or the control circuits 24.

In this case, in the normal display mode, the image display is performed by the transmissive pixel section, and in the constant display mode, the image display is performed by the reflective pixel section. With this configuration, the number of elements formed on the entire active matrix substrate 10 can be reduced.

4. Although each of the pixel circuits 2 in the embodiments above includes the auxiliary capacitance element Cs, they may also be configured without the auxiliary capacitance element Cs. However, in order to make the potential of the internal node N1 more stable, and to thereby securely stabilize displayed images, this auxiliary capacitance element Cs is preferably provided.

Figure 33:
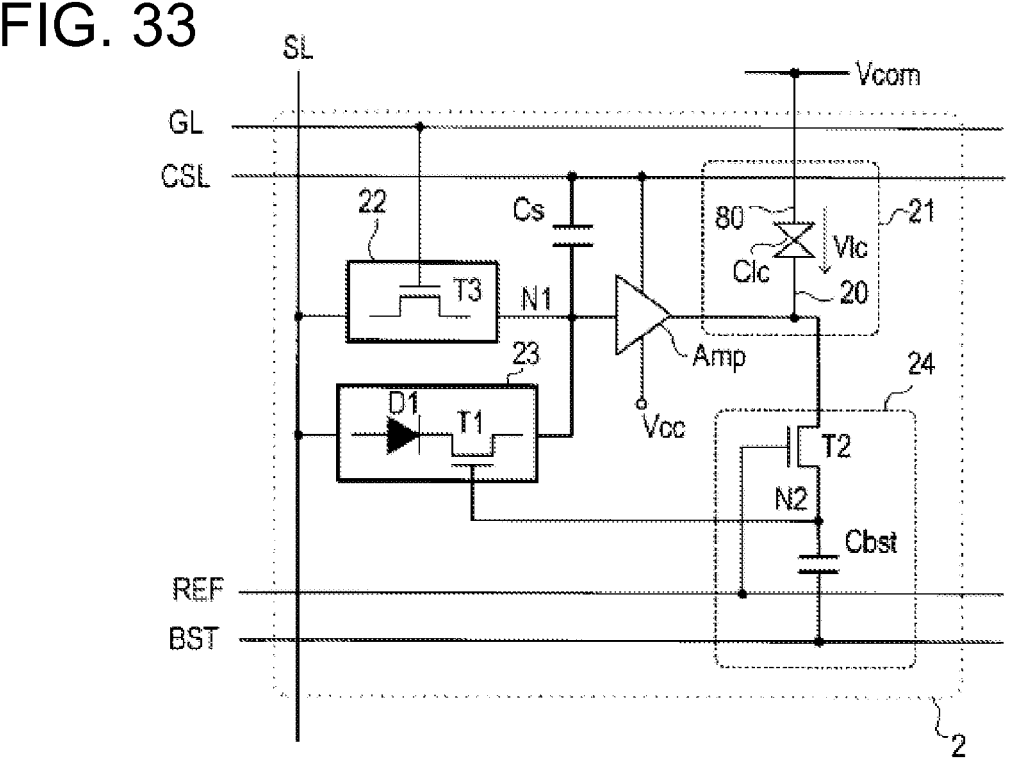
FIG. 33 is a circuit diagram showing yet another basic circuit configuration of the pixel circuit of the present invention.

5. The embodiments above were configured such that the display element unit 21 in each pixel circuit 2 is constituted of the unit liquid crystal display element Clc only. However, as shown in FIG. 33, it is also possible to employ a configuration where an analog amplifier Amp (voltage amplifier) is provided between the internal node N1 and the pixel electrode 20. An example shown in FIG. 33 is configured such that the auxiliary capacitance line CSL and a power line Vcc are used as power source lines for the analog amplifier Amp.

In this case, the voltage provided to the internal node N1 is amplified by the analog amplifier Amp in accordance with a prescribed amplification factor η, and the amplified voltage is supplied to the pixel electrode 20. This configuration allows a very small change in the voltage of the internal node N1 to be reflected in a displayed image.

With this configuration, when the self-polarity reversal operation is performed in the constant display mode, because the voltage of the internal node N1 is amplified by the amplification factor η, and is supplied to the pixel electrode 20, by adjusting the difference between the voltage in the first voltage state and the voltage in the second voltage state supplied to the source line SL, it becomes possible to make the voltages in the first and the second states that are applied to the pixel electrode 20 coincide with the high level and the low level voltages of the opposite voltage Vcom, respectively.

6. The embodiments above were configured to use n-channel polycrystalline silicon TFTs as the transistors T1 to T4 in the pixel circuit 2. However, a configuration where p-channel TFTs are used, and a configuration where amorphous silicon TFTs are used are also possible. In this case, by reversing the magnitude relationship among respective voltages, by reversing the rectifying direction of the diode D1, and by making other appropriate changes, the pixel circuit 2 can be operated in the same manner as the respective embodiments, and therefore, the same effects can be obtained.

7. In the embodiments above, the liquid crystal display device has been described as an example, but the present invention is not limited to such, and the present invention can be used for any display devices that have a capacitance corresponding to the pixel capacitance Cp for holding the pixel data and that display an image in accordance with the voltage held in the capacitance.

Figure 34:
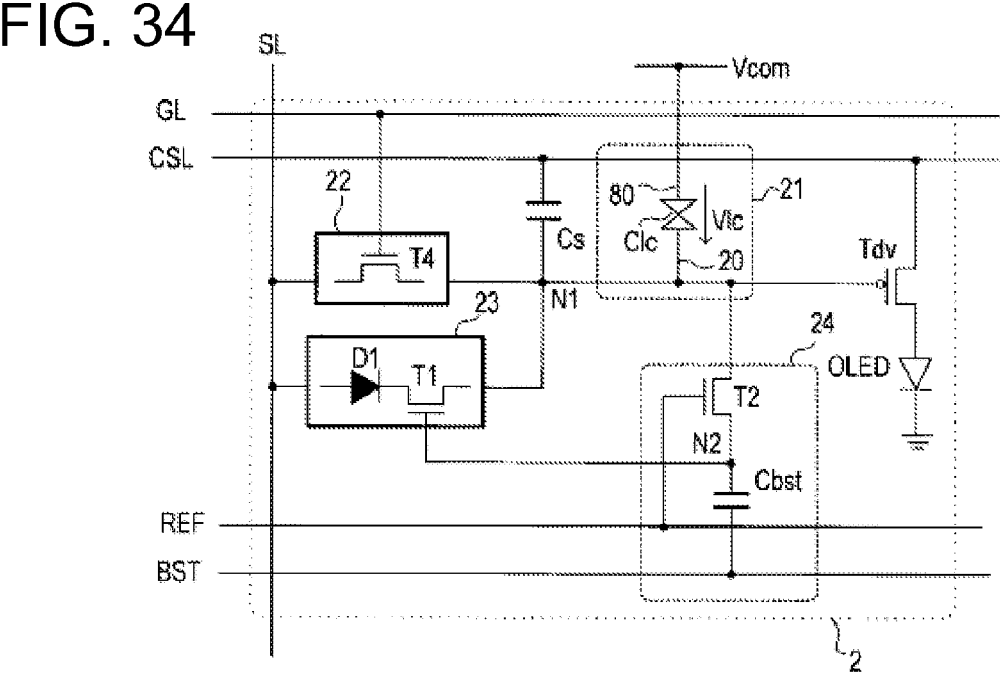
FIG. 34 is a circuit diagram showing yet another basic circuit configuration of the pixel circuit of the present invention.

For example, the present invention can be applied to an organic EL (Electroluminescence) display device that displays an image in accordance with the voltage corresponding to the pixel data held in a capacitance that corresponds to the pixel capacitance, and in particular, the present invention can be used for the self-refresh operation of such a device. FIG. 34 shows a circuit diagram illustrating an example of a pixel circuit of such an organic EL display device. In this pixel circuit, a voltage held in an auxiliary capacitance Cs as pixel data is provided to the gate terminal of a driver transistor Tdv that is constituted of a TFT, and a current corresponding to that voltage flows into a light-emitting element OLED through the driver transistor Tdv. Thus, the auxiliary capacitance Cs corresponds to the pixel capacitance Cp of the respective embodiments above.

Unlike the liquid crystal display device where the image display is performed by applying a voltage across electrodes so as to control the light transmittance, in the pixel circuit shown in FIG. 34, the image display is performed by making an electrical current flow through an element so that the element itself emits light. Because of the rectifying property of the light-emitting element, the polarity of the voltage applied across the element cannot be reversed, nor is it necessary to reverse the polarity.

8. In Embodiment 2, the self-refresh operation of the Type 2 pixel circuit has been explained with reference to the timing charts in FIGS. 21 and 22. The Type 2 pixel circuits 2B and 2C (FIGS. 9 to 15) respectively include the transistors T4 and, in addition to the boost lines BST, the select lines SEL that are connected to the gate terminals of T4. Therefore, in this type of pixel circuits, the timing to apply a voltage to the boost line BST and the timing to turn on the transistor T4 can be made different on purpose.

By taking advantage of this configuration, in performing the self-refresh operation for the Type 2 pixel circuits 2B and 2C, a timing of voltage application to the select line SEL may be delayed a little from a timing of voltage application to the reference line REF and the boost line BST.

As described above, the reference line REF is provided with a voltage within a range that turns T2 on in a pixel of a gradation level that is lower than the refresh target gradation level. Therefore, even when a voltage is applied to the boost line BST in this condition, the potential of the nodes N2 in such a pixel is not boosted, and as a result, the transistor T1 thereof is not turned on.

However, depending on the effects of the capability of the transistor, the parasitic capacitance of the node, or other factors, even when the transistor T2 is turned on, the potential of the node N2 may be temporarily increased with the voltage application to the boost line BST. In this case, the transistor T1 is turned on at that point, and as a result, the voltage of the pixel may be overwritten with a voltage of another gradation.

In contrast, by turning the transistor T4 on a little after the voltage is applied to the boost line BST, even when the potential of the node N2 is temporarily increased and the transistor T1 is turned on during that time, because the transistor T4 is off, the electrical continuity between the source line SL and the node N1 can be broken by the transistor T4. Even if the potential of the node N2 is temporarily increased, the electrical charge is subsequently absorbed by the parasitic capacitance at the node N1. This lowers the potential at N2. This turns the transistor T1 off, and therefore, even when the transistor T4 is turned on, the node N1 is not overwritten with the voltage applied to the source line SL in the pixel circuits having a gradation level lower than the refresh target gradation level.

As described above, in the Type 2 pixel circuits in particular, because the timing of voltage application to the select line SEL can be controlled independently from the timing of voltage application to the boost line BST, by slightly delaying the voltage application timing of the select line SEL relative to the application timing to the boost line BST, an erroneous operation where the pixel is written with an erroneous gradation can be prevented more reliably.

This method can also be used for the timing chart of Embodiment 3 shown in FIG. 25. That is, in FIG. 25, the timing of voltage application to the select line SEL can be delayed so that it occurs slightly after t3.

Although the refresh operation utilizing this method cannot be performed for Type 1 or Type 3, a possibility for the above-mentioned erroneous operation to occur is small to begin with, and therefore, the original gradation level can be properly restored even with the refresh operation utilizing the method described in Embodiment 2.

Description Of Reference Characters
    1 liquid crystal display device
    2 pixel circuit
    2A, 2B, 2C, 2D, 2E pixel circuit
    10 active matrix substrate
    11 display control circuit
    12 opposite electrode driver circuit
    13 source driver
    14 gate driver
    20 pixel electrode
    21 display element unit
    22 first switching circuit
    23 second switching circuit
    24 control circuit
    74 sealing material
    75 liquid crystal layer
    80 opposite electrode
    81 opposite substrate
    Amp analog amplifier
    BST boost line
    Cbst boost capacitance element
    Clc liquid crystal display element
    CML opposite electrode wiring line
    CSL auxiliary capacitance line
    Cs auxiliary capacitance element
    Ct timing signal
    D1 diode element
    DA digital image signal
    Dv data signal
    GL(GL1, GL2, . . . , GLn) gate line
    Gtc scanning timing control signal
    N1 internal node
    N2 output node
    OLED light-emitting element
    P1, P2 phase
    REF reference line
    S1, S2 step
    Sc1, Sc2, . . . , Scm source signal
    SEL select line
    SL(SL1, SL2, . . . , SLm) source line
    Stc data timing control signal
    T1, T2, T3, T4, T5 transistor
    Tdv driver transistor
    Vcom opposite voltage
    Vlc liquid crystal voltage
    VN1 internal node potential, pixel electrode potential
    VN2 output node potential

The invention claimed is:

1. A pixel circuit, comprising:
a display element unit that includes a unit display element;
an internal node constituting a part of the display element unit, the internal node holding a pixel data voltage applied to the display element unit;
a first switching circuit that transfers the pixel data voltage supplied by a data signal line to the internal node through at least a prescribed switching element;
a second switching circuit that transfers the pixel data voltage supplied by the data signal line to the internal node without passing through the prescribed switching element; and
a control circuit that holds, at one end of a first capacitance element, a prescribed voltage corresponding to the pixel data voltage held by the internal node, the control circuit controlling a conducting and non-conducting state of the second switching circuit,
wherein the second switching circuit includes a series circuit of a first transistor element and a diode element, the first transistor element having a first terminal, a second terminal, and a control terminal that controls electrical continuity between the first and second terminals,
wherein the control circuit includes a series circuit of a second transistor element and the first capacitance element, the second transistor element having a first terminal, a second terminal, and a control terminal that controls electrical continuity between the first and second terminals,
wherein respective one ends of the first and second switching circuits are connected to the data signal line,
wherein respective other ends of the first and second switching circuits and the first terminal of the second transistor element are connected to the internal node,
wherein the diode element serves as a rectifier in a direction from the data signal line to the internal node,
wherein the control terminal of the first transistor element, the second terminal of the second transistor element, and the one end of the first capacitance element are connected to each other, forming an output node of the control circuit,
wherein the control terminal of the second transistor element is connected to a first control line, and
wherein another end of the first capacitance element is connected to a second control line.

2. The pixel circuit according to claim 1, wherein the prescribed switching element is a third transistor element that has a first terminal, a second terminal, and a control terminal that controls electrical continuity between the first and second terminals, and wherein the control terminal of the third transistor element is connected to a scanning signal line.

3. The pixel circuit according to claim 1, wherein the second switching circuit includes a series circuit of the first transistor element, the diode element, and a fourth transistor element that has a first terminal, a second terminal, and a control terminal that controls electrical continuity between the first and second terminals, and wherein the control terminal of the fourth transistor element is connected to the second control line or a third control line.

4. The pixel circuit according to claim 3, wherein the first switching circuit includes a series circuit of the fourth transistor element in the second switching circuit and the prescribed switching element, or a series circuit of a fifth transistor element and the prescribed switching element, the fifth transistor element having a control terminal thereof connected to the control terminal of the fourth transistor element in the second switching circuit.

5. The pixel circuit according to claim 1, further comprising a second capacitance element having one end connected to the internal node and another end connected to a fourth control line or a prescribed fixed voltage line.

6. A display device, comprising:

a pixel circuit array in which a plurality of pixel circuits set forth in claim 1 are arranged in a row direction and a column direction, respectively, wherein the data signal line is provided in each column, wherein the pixel circuits arranged in a same column have respective one ends of the first switching circuits thereof connected to the same data signal line, wherein the pixel circuits arranged in a same row or in a same column have the respective control terminals of the second transistor elements thereof connected to the same first control line, wherein the pixel circuits arranged in the same row or in the same column have the respective other ends of the first capacitance elements connected to the same second control line, and wherein the display device further comprises a data signal line driver circuit for driving the data signal lines individually, and a control line driver circuit for driving the first and second control lines individually.

7. The display device according to claim 6, wherein the prescribed switching element is a third transistor element that has a first terminal, a second terminal, and a control terminal that controls electrical continuity between the first and second terminals, the control terminal being connected to a scanning signal line, wherein the scanning signal line is arranged in each row, wherein the pixel circuits arranged in the same row are connected to the same scanning signal line, and wherein the display device further comprises a scanning signal line driver circuit for driving each scanning signal line individually.

8. The display device according to claim 7, wherein the second switching circuit includes a series circuit of the first transistor element, the diode element, and a fourth transistor element, the fourth transistor element having a first terminal, a second terminal, and a control terminal that controls electrical continuity between the first and second terminals, and wherein the respective pixel circuits arranged in the same row or the same column have the control terminals of the fourth transistor elements thereof connected to the same second control line, respectively.

9. The display device according to claim 7, wherein the second switching circuit includes a series circuit of the first transistor element, the diode element, and a fourth transistor element, the fourth transistor element having a first terminal, a second terminal, and a control terminal that controls electrical continuity between the first and second terminals, wherein the respective pixel circuits arranged in the same row or the same column have the control terminals of the fourth transistor elements thereof connected to a same third control line, respectively, and wherein the control line driver circuit drives the respective first through third control lines individually.

10. The display device according to claim 8, wherein the first switching circuit includes a series circuit of the fourth transistor element in the second switching circuit and the third transistor element, or a series circuit of a fifth transistor element and the third transistor element, the fifth transistor element having a control terminal thereof connected to the control terminal of the fourth transistor element in the second switching circuit.

11. The display device according to claim 9, wherein the first switching circuit includes a series circuit of the fourth transistor element in the second switching circuit and the third transistor element, or a series circuit of a fifth transistor element and the third transistor element, the fifth transistor element having a control terminal thereof connected to the control terminal of the fourth transistor element in the second switching circuit.

12. The display device according to claim 7, wherein:

when a writing operation for writing the pixel data in the respective pixel circuits arranged in one selected row is performed, the scanning signal line driver circuit applies a prescribed selected row voltage to the scanning signal line of the selected row so as to turn on the third transistor elements arranged in the selected row, and applies a prescribed non-selected row voltage to the scanning signal lines of non-selected rows so as to turn off the third transistor elements arranged in the non-selected rows, and the data signal line driver circuit applies, to the respective data signal lines, data voltages corresponding to the pixel data that are to be written in the pixel circuits in the respective columns of the selected row, respectively.

13. The display device according to claim 12, wherein, in the writing operation, the control line driver circuit applies, to the first control line, a prescribed voltage that turns on the second transistor element.

14. The display device according to claim 10, wherein:

when a writing operation for writing the pixel data in the respective pixel circuits arranged in one selected row is performed, the scanning signal line driver circuit applies a prescribed selected row voltage to the scanning signal line of the selected row so as to turn on the third transistor elements arranged in the selected row, and applies a prescribed non-selected row voltage to the scanning signal lines of non-selected rows so as to turn off the third transistor elements arranged in the non-selected rows, the control line driver circuit applies, to the second control line of the selected row, a prescribed select voltage that turns on the fourth transistor element, and applies, to the second control lines of the non-selected rows, a prescribed non-select voltage that turns off the fourth transistor element, and the data signal line driver circuit applies, to the respective data signal lines, data voltages corresponding to the pixel data that are to be written in the pixel circuits in the respective columns of the selected row, respectively.

15. The display device according to claim 11, wherein:

when a writing operation for writing the pixel data in the respective pixel circuits arranged in one selected row is performed, the scanning signal line driver circuit applies a prescribed selected row voltage to the scanning signal line of the selected row so as to turn on the third transistor elements arranged in the selected row, and applies a prescribed non-selected row voltage to the scanning signal lines of non-selected rows so as to turn off the third transistor elements arranged in the non-selected rows, the control line driver circuit applies, to the third control line of the selected row, a prescribed select voltage that turns on the fourth transistor element, and applies, to the third control lines of the non-selected rows, a prescribed non-select voltage that turns off the fourth transistor element, and the data signal line driver circuit applies, to the respective data signal lines, data voltages corresponding to the pixel data that are to be written in the pixel circuits in the respective columns of the selected row, respectively.

16. The display device according to claim 7, wherein the internal node of each pixel circuit in the pixel circuit array is configured to be capable of holding one voltage state among a plurality of voltage states that are mutually different to achieve a multi-gradation display, wherein, in a self-refresh operation that activates the second switching circuits and the control circuits in a plurality of pixel circuits so as to simultaneously compensate voltage changes in the internal nodes thereof, the display device performs a refresh operation for the pixel circuits that have the internal node in a voltage state of a target gradation level as follows:

the scanning signal line driver circuit applies a prescribed voltage to the scanning signal lines connected to all of the pixel circuits in the pixel circuit array so as to turn the third transistor elements off;

the data signal line driver circuit applies a refresh input voltage to the data signal lines, the refresh input voltage being a sum of a refresh target voltage and a prescribed first adjusting voltage, the refresh target voltage corresponding to a voltage state of a target gradation level for which the refresh operation is performed, the prescribed first adjusting voltage corresponding to a turn-on voltage of the second switching circuit; and the control line driver circuit applies a boost voltage of a prescribed amplitude to the second control line while applying a refresh reference voltage to the first control line so as to change a voltage of the output node by capacitance-coupling through the first capacitance element, the refresh reference voltage being a sum of a refresh isolation voltage and a prescribed second adjusting voltage, the refresh isolation voltage being defined by an intermediate voltage between a voltage state that is one level lower than the target gradation level and a voltage state of the target gradation level, the prescribed second adjusting voltage corresponding to a threshold voltage of the control circuit between the first control line and the internal node, so that:

when the voltage state of the internal node is higher than the refresh target voltage, the diode element becomes reverse-biased in a direction from the data signal line to the internal node, thereby breaking electrical continuity between the data signal line and the internal node, when the voltage state of the internal node is lower than the refresh isolation voltage, the potential change of the output node by the application of the boost voltage is suppressed, and the first transistor element is turned off, thereby breaking the electrical continuity between the data signal line and the internal node, and when the voltage state of the internal node is at least the refresh isolation voltage and no more than the refresh target voltage, the diode element becomes forward-biased in a direction from the data signal line to the internal node, and the potential change in the output node is not suppressed, which turns the first transistor element on, thereby providing the refresh target voltage to the internal node.

17. The display device according to claim 9, wherein the internal node of each pixel circuit in the pixel circuit array is configured to be capable of holding one voltage state among a plurality of voltage states that are mutually different to achieve a multi-gradation display, wherein, in a self-refresh operation that activates the second switching circuits and the control circuits in a plurality of pixel circuits so as to simultaneously compensate voltage changes in the internal nodes thereof, the display device performs a refresh operation for the pixel circuits that have the internal node in a voltage state of a target gradation level as follows:

the scanning signal line driver circuit applies a prescribed voltage to the scanning signal lines connected to all of the pixel circuits in the pixel circuit array so as to turn off the third transistor elements;

the data signal line driver circuit applies a refresh input voltage to the data signal lines, the refresh input voltage being a sum of a refresh target voltage and a prescribed first adjusting voltage, the refresh target voltage corresponding to a voltage state of a target gradation level for which the refresh operation is performed, the prescribed first adjusting voltage corresponding to a turn-on voltage of the second switching circuit;

the control line driver circuit applies a boost voltage of a prescribed amplitude to the second control line, while applying a refresh reference voltage to the first control line and applying the a prescribed voltage to the third control line so as to turn on the fourth transistor element, so as to change a voltage of the output node by capacitance-coupling through the first capacitance element, the refresh reference voltage being a sum of a refresh isolation voltage and a prescribed second adjusting voltage, the refresh isolation voltage being defined by an intermediate voltage between a voltage state that is one level lower than the target gradation level and a voltage state of the target gradation level, the prescribed second adjusting voltage corresponding to a threshold voltage of the control circuit between the first control line and the internal node, so that:

when the voltage state of the internal node is higher than the refresh target voltage, the diode element becomes reverse-biased in a direction from the data signal line to the internal node, thereby breaking electrical continuity between the data signal line and the internal node, when the voltage state of the internal node is lower than the refresh isolation voltage, the potential change of the output node by the application of the boost voltage is suppressed, and the first transistor element is turned off, thereby breaking the electrical continuity between the data signal line and the internal node, and when the voltage state of the internal node is at least the refresh isolation voltage and no more than the refresh target voltage, the diode element becomes forward-biased in the direction from the data signal line to the internal node, and the potential change in the output node is not suppressed, which turns the first transistor element on, thereby providing the refresh target voltage to the internal node.

18. The display device according to claim 16, wherein the refresh operation is sequentially performed for the pixel circuits that respectively have the internal nodes in voltage states of different gradation levels by repeatedly conducting the following operation while changing values of the refresh input voltage and the refresh isolation voltage each time:

applying the boost voltage to the second control line while turning the third transistor element off, and applying the refresh input voltage and the refresh reference voltage to the date signal line and the first control line, respectively.

19. The display device according to claim 18, wherein an application of the boost voltage is performed while changing values of the refresh input voltage and the refresh isolation voltage a certain number of times that is one less than the number of gradation levels, the number of gradation levels being the number of voltage states that can be held by the internal node of each pixel circuit in the pixel circuit array.

20. The display device according to claim 18, wherein:
after a completion of a refresh step that includes said operation of repeatedly conducting an operation of turning the third transistor element off, applying the refresh input voltage and the refresh reference voltage to the date signal line and the first control line, respectively, and applying the boost voltage to the second control line, while changing values of the refresh input voltage and the refresh isolation voltage each time, the display device performs a stand-by step in which:
the data signal line driver circuit applies a voltage that corresponds to a smallest value of a voltage state that can be held by the internal node to the data signal line; and
the control line driver circuit applies a voltage that can turn on the second transistor element regardless of the voltage state of the internal node to the first control line at least for a certain period of time, instead of applying the boost voltage to the second control line.

21. The display device according to claim 20, wherein the refresh step is performed again after the stand-by step, the stand-by step being performed for a period of time that is at least ten times as long as the refresh step.

22. The display device according to claim 16, wherein the first adjusting voltage is a turn-on voltage of the diode element.

23. The display device according to claim 16, wherein the second adjusting voltage is a threshold voltage of the second transistor element.

24. The display device according to claim 9, wherein the internal node of each pixel circuit in the pixel circuit array is configured to be capable of holding one voltage state among a plurality of voltage states that are mutually different to achieve a multi-gradation display, wherein, in a self-refresh operation that activates the second switching circuits and the control circuits in a plurality of pixel circuits so as to simultaneously compensate voltage changes in the internal nodes thereof, the display device performs a refresh operation for the pixel circuits that have the internal node in a voltage state of a target gradation level as follows:

the scanning signal line driver circuit applies a prescribed voltage to the scanning signal lines that are connected to all of the pixel circuits in the pixel circuit array so as to turn the third transistor element off;

the data signal line driver circuit applies a refresh input voltage to the data signal line, the refresh input voltage being a sum of a refresh target voltage and a prescribed first adjusting voltage, the refresh target voltage corresponding to a voltage state of a target gradation level for which the refresh operation is performed, the prescribed first adjusting voltage corresponding to a turn-on voltage of the second switching circuit;

the control line driver circuit applies a boost voltage of a prescribed amplitude to the second control line while applying a refresh reference voltage to the first control line so as to change a voltage of the output node by capacitance-coupling through the first capacitance element, the refresh reference voltage being a sum of a refresh isolation voltage and a prescribed second adjusting voltage, the refresh isolation voltage being defined by a voltage intermediate between a voltage state that is one level lower than the target gradation level and a voltage state of the target gradation level, the prescribed second adjusting voltage corresponding to a threshold voltage of the control circuit between the first control line and the internal node; and the control line driver circuit thereafter applies a prescribed voltage that turns on the fourth transistor element to the third control line, so that:

when the voltage state of the internal node is higher than the refresh target voltage, the diode element becomes reverse-biased in a direction from the data signal line to the internal node, thereby breaking electrical continuity between the data signal line and the internal node, when the voltage state of the internal node is lower than the refresh isolation voltage, the potential change of the output node by the application of the boost voltage is suppressed, and the first transistor element is turned off, thereby breaking electrical continuity between the data signal line and the internal node, and when the voltage state of the internal node is at least the refresh isolation voltage and no more than the refresh target voltage, the diode element becomes forward-biased in a direction from the data signal line to the internal node, and the potential change in the output node is not suppressed, which turns the first transistor element on, thereby providing the refresh target voltage to the internal node.

25. The display device according to claim 16, wherein, in the self-refresh operation, a refresh operation is sequentially performed for the pixel circuits that include the internal nodes in voltage states of different gradation levels as follows:

setting a first gradation level as the target gradation and applying the boost voltage to the second control line while applying the refresh input voltage and the refresh reference voltage to the data signal line and the first control line, respectively; and while continuously applying the boost voltage, setting a second gradation level that is one level higher than the first gradation level as the target gradation level, changing the refresh reference voltage applied to the first control line, and thereafter changing the refresh input voltage applied to the data signal line.

26. The display device according to claim 25, wherein:
when there exists a gradation level that is higher than the second gradation level,
after a completion of the refresh operation for the second gradation level,
the display device repeats the refresh operation for the higher gradation level by performing, while continuously applying the boost voltage, setting the target gradation level to a gradation level that is one level higher than the second gradation level, changing the refresh reference voltage applied to the first control line, and thereafter changing the refresh input voltage applied to the data signal line.

27. The display device according to claim 17, wherein, in the self-refresh operation, a refresh operation is sequentially performed for the pixel circuits that include the internal nodes in voltage states of different gradation levels as follows:
setting a first gradation level as the target gradation level, and while applying the refresh input voltage and the refresh reference voltage to the data signal line and the first control line, respectively, applying the boost voltage to the second control line and a prescribed voltage that turns on the fourth transistor element to the third control line, respectively; and
while continuously applying the boost voltage and the prescribed voltage that turns on the fourth transistor element, setting the target gradation level to a second gradation level that is one level higher than the first gradation level, changing the refresh reference voltage applied to the first control line, and thereafter changing the refresh input voltage applied to the data signal line.

28. The display device according to claim 27, wherein:
when there exists a gradation level that is even higher than the second gradation level,
after a completion of the refresh operation for the second gradation level,
the display device repeats the refresh operation for the higher gradation level by performing, while continuously applying the boost voltage and the prescribed voltage that turns the fourth transistor element on, setting the target gradation level to a gradation level that is one level higher than the second gradation level, changing the refresh reference voltage applied to the first control line, and thereafter changing the refresh input voltage applied to the data signal line.

* * * * *